US010605102B2

(12) United States Patent
Matsuo et al.

(10) Patent No.: US 10,605,102 B2
(45) Date of Patent: Mar. 31, 2020

(54) FLOW PATH FORMING PLATE, VANE INCLUDING THIS FLOW PATH FORMING PLATE, GAS TURBINE INCLUDING THIS VANE, AND MANUFACTURING METHOD OF FLOW PATH FORMING PLATE

(71) Applicant: Mitsubishi Hitachi Power Systems, Ltd., Kanagawa (JP)

(72) Inventors: Saki Matsuo, Yokohama (JP); Satoshi Hada, Yokohama (JP); Tomoko Morikawa, Yokohama (JP); Kunihiko Waki, Yokohama (JP); Kenichi Arase, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 49 days.

(21) Appl. No.: 16/074,943

(22) PCT Filed: Mar. 3, 2017

(86) PCT No.: PCT/JP2017/008548
§ 371 (c)(1),
(2) Date: Aug. 2, 2018

(87) PCT Pub. No.: WO2017/154785
PCT Pub. Date: Sep. 14, 2017

(65) Prior Publication Data
US 2019/0032499 A1    Jan. 31, 2019

(30) Foreign Application Priority Data

Mar. 11, 2016    (JP) .................................. 2016-048765

(51) Int. Cl.
*F01D 25/12*    (2006.01)
*F01D 9/02*    (2006.01)
(Continued)

(52) U.S. Cl.
CPC ............. *F01D 9/023* (2013.01); *F01D 5/081* (2013.01); *F01D 5/147* (2013.01); *F01D 5/187* (2013.01);
(Continued)

(58) Field of Classification Search
None
See application file for complete search history.

(56) References Cited

U.S. PATENT DOCUMENTS 4,571,935 A * 2/1986 Rice ........................ F01D 5/185
60/39.182
5,197,852 A    3/1993 Walker et al.
(Continued)

FOREIGN PATENT DOCUMENTS

JP    4-231605    8/1992
JP    09-228803    9/1997
(Continued)

OTHER PUBLICATIONS

International Search Report dated May 9, 2017 in International (PCT) Application No. PCT/JP2017/008548.
(Continued)

*Primary Examiner* — Michael Lebentritt
(74) *Attorney, Agent, or Firm* — Wenderoth, Lind & Ponack, L.L.P.

(57) ABSTRACT

Provided is a flow path forming plate having a gas path surface that comes in contact with combustion gas, end surfaces formed at peripheral edges of the gas path surface, a first side passage, and a plurality of end surface blow-out passages. The first side passage extends in a direction along a first end surface that is one of the end surfaces, and cooling air flows through the first side passage. A plurality of passage forming surfaces forming the first side passage includes a first forming surface that faces an opposite-flow- (Continued)

path side and extends gradually farther away from the gas path surface while extending toward the first end surface. The end surface blow-out passages open in the first forming surface of the first side passage and in the first end surface.

22 Claims, 24 Drawing Sheets

(51) Int. Cl.
    *F02C 7/18*     (2006.01)
    *F01D 5/18*     (2006.01)
    *F02C 7/00*     (2006.01)
    *F01D 5/08*     (2006.01)
    *F01D 5/14*     (2006.01)

(52) U.S. Cl.
    CPC .............. *F01D 9/02* (2013.01); *F01D 25/12* (2013.01); *F02C 7/00* (2013.01); *F02C 7/18* (2013.01); *F05D 2230/21* (2013.01); *F05D 2240/11* (2013.01); *F05D 2240/304* (2013.01); *F05D 2240/81* (2013.01)

(56) References Cited

U.S. PATENT DOCUMENTS

| | | | |
|---|---|---|---|
| 6,382,906 B1 * | 5/2002 | Brassfield | F01D 5/18 415/115 |
| 8,388,304 B2 | 3/2013 | Liang et al. | |
| 2003/0012647 A1 | 1/2003 | Shiozaki et al. | |
| 2004/0018082 A1 | 1/2004 | Soechting et al. | |
| 2005/0123388 A1 | 6/2005 | Chan et al. | |
| 2009/0165301 A1 | 7/2009 | Broomer et al. | |
| 2010/0089021 A1 * | 4/2010 | Barton | F23L 7/00 60/39.53 |
| 2010/0092896 A1 * | 4/2010 | Barton | F23R 3/04 431/2 |
| 2011/0044805 A1 * | 2/2011 | Koyabu | F01D 11/08 415/177 |
| 2011/0182724 A1 | 7/2011 | Koyabu et al. | |
| 2011/0255989 A1 * | 10/2011 | Koyabu | F01D 11/24 416/97 R |
| 2012/0121415 A1 | 5/2012 | Brittingham et al. | |
| 2013/0255278 A1 * | 10/2013 | Razzell | F02C 7/12 60/806 |
| 2014/0064945 A1 * | 3/2014 | Hudson | F01D 9/042 415/191 |
| 2015/0007581 A1 | 1/2015 | Sezer et al. | |
| 2015/0192020 A1 | 7/2015 | Singh et al. | |
| 2016/0084109 A1 * | 3/2016 | Pula | F01D 11/08 60/39.83 |
| 2016/0177751 A1 * | 6/2016 | Otomo | F01D 5/02 60/805 |
| 2017/0138211 A1 * | 5/2017 | Fukui | F01D 11/24 |
| 2018/0045060 A1 * | 2/2018 | Matsuo | F01D 9/02 |
| 2018/0149024 A1 * | 5/2018 | Takamura | F02C 7/18 |
| 2018/0291763 A1 * | 10/2018 | Pitt | F01D 9/02 |
| 2019/0010809 A1 * | 1/2019 | Matsuo | F01D 5/18 |
| 2019/0063224 A1 * | 2/2019 | Hashimoto | F01D 5/08 |

FOREIGN PATENT DOCUMENTS

| | | |
|---|---|---|
| JP | 2003-027902 | 1/2003 |
| JP | 2005-163791 | 6/2005 |
| JP | 3978143 | 9/2007 |
| JP | 2009-162227 | 7/2009 |
| JP | 2009-299601 | 12/2009 |
| JP | 2011-153540 | 8/2011 |
| JP | 2012-107620 | 6/2012 |
| JP | 2015-017607 | 1/2015 |

OTHER PUBLICATIONS

Written Opinion of the International Searching Authority dated May 9, 2017 in International (PCT) Application No. PCT/JP2017/008548.

* cited by examiner

FLOW PATH FORMING PLATE, VANE INCLUDING THIS FLOW PATH FORMING PLATE, GAS TURBINE INCLUDING THIS VANE, AND MANUFACTURING METHOD OF FLOW PATH FORMING PLATE

TECHNICAL FIELD

The present invention relates to a flow path forming plate that defines a combustion gas flow path through which combustion gas flows, a vane including this flow path forming plate, a gas turbine including this vane, and a manufacturing method of a flow path forming plate.

The present application claims priority based on Japanese Patent Application No. 2016-048765 filed in Japan on Mar. 11, 2016, the contents of which are incorporated herein by reference.

BACKGROUND ART

A gas turbine includes a rotor that rotates around an axis and a casing that covers this rotor. The rotor has a rotor shaft and a plurality of rotor vanes mounted on the rotor shaft. In addition, a plurality of stator vanes is provided on the inner side of the casing.

The rotor vane has a vane body extending in a radial direction based on the axis, a platform provided on the radially inner side of the vane body, and a vane root provided on the radially inner side of the platform. The vane body of the rotor vane is disposed inside a combustion gas flow path through which combustion gas passes. The platform defines a perimeter of the combustion gas flow path on the radially inner side. The vane root is fixed to the rotor shaft. The stator vane has a vane body extending in the radial direction based on the axis, an inner shroud provided on the radially inner side of the vane body, and an outer shroud provided on the radially outer side of the vane body. The vane body of the stator vane is disposed inside the combustion gas flow path through which the combustion gas passes. The inner shroud defines the perimeter of the combustion gas flow path on the radially inner side. The outer shroud defines the perimeter of the combustion gas flow path on the radially outer side. The casing has ring segments that face the rotor vanes in the radial direction based on the axis. These ring segments define the perimeter of the combustion gas flow path on the radially outer side.

Thus, each of the platform of the rotor vane, the outer shroud and the inner shroud of the stator vane, and the ring segment constitutes a flow path forming plate that defines the combustion gas flow path. These flow path forming plates are exposed to the high-temperature combustion gas. Therefore, the flow path forming plates are typically cooled with air etc.

For example, Patent Literature 1 below discloses an inner shroud of a stator vane that is one type of flow path forming plate. This inner shroud has a back-side passage extending along a back end surface, and a plurality of back end surface blow-out passages. The back-side passage communicate with the back end surface passage and open in the back end surface. In this inner shroud, cooling air flows into the back-side passage. This cooling air flows from the back-side passage into the back end surface blow-out passages. The cooling air having flowed into the back end surface blow-out passages flows out from openings of the back end surface blow-out passages in the back end surface.

CITATION LIST

Patent Literature

Patent Literature 1: Japanese Patent No. 3978143

SUMMARY OF INVENTION

Technical Problem

It is desirable to efficiently cool a gas path surface of a flow path forming plate that comes in contact with combustion gas.

An object of the present invention is therefore to provide a flow path forming plate of which a gas path surface can be efficiently cooled, a vane including this flow path forming plate, a gas turbine including this vane, and a manufacturing method of a flow path forming plate.

Solution to Problem

A flow path forming plate as an aspect according to the present invention to achieve the above object is a flow path forming plate that defines a combustion gas flow path through which combustion gas flows. The flow path forming plate includes: a gas path surface that comes in contact with the combustion gas; an opposite-gas-path surface that faces the opposite side from the gas path surface; end surfaces that are formed at peripheral edges of the gas path surface; a first side passage which is formed between the gas path surface and the opposite-gas-path surface and extends in a direction along a first end surface that is one of the end surfaces, and through which cooling air flows; and a plurality of end surface blow-out passages that communicates with the first side passage and opens in the first end surface. The passage cross-sectional area of the end surface blow-out passage is smaller than the passage cross-sectional area of the first side passage. The first side passage is defined by a plurality of passage forming surfaces. Of the passage forming surfaces, a first forming surface faces an opposite-flow-path side that is the opposite side from a flow path side that is the side of the gas path surface with the opposite-gas-path surface as a reference point, and extends gradually farther away from the gas path surface while extending toward an end surface side that is the side toward the first end surface. The end surface blow-out passages open in the first forming surface.

In this flow path forming plate, a part of the flow path forming plate on the end surface side is cooled in the process of cooling air flowing through the first side passage. This cooling air flows from the first side passage into the end surface blow-out passages. In the process of flowing through the end surface blow-out passages, the cooling air performs convective cooling on the part of the flow path forming plate on the end surface side. In this flow path forming plate, the passage cross-sectional area of the end surface blow-out passage is smaller than the passage cross-sectional area of the first side passage. In other words, the passage cross-sectional area of the first side passage is larger than the passage cross-sectional area of the end surface blow-out passage. Thus, the flow velocity of cooling air flowing through the first side passage can be restricted. As a result, in this flow path forming plate, a pressure loss of cooling air in the process of flowing through the first side passage can be reduced. Moreover, in this flow path forming plate, cooling air flowing through the end surface blow-out passage has a higher cooling effect per unit passage cross-sectional area than cooling air flowing through the first side passage.

The end surface blow-out passages open in the first forming surface, among the passage forming surfaces forming the first side passage, that faces the opposite-flow-path side and extends gradually farther away from the gas path surface while extending toward the end surface side. Accordingly, the ends of the end surface blow-out passages on the opposite-end-surface side open at positions farther on the opposite-end-surface side than a part closest to the end surface side in the passage forming surface forming the first side passage. As a result, in this flow path forming plate, the end surface blow-out passages having a high cooling effect have a long passage length. In this flow path forming plate, there is a part where the first side passage and the end surface blow-out passages overlap each other as seen in a direction from the gas path surface toward the opposite-gas-path surface. Thus, in this flow path forming plate, it is possible to effectively cool the part of the gas path surface on the end surface side without increasing the flow rate of cooling air. In the case where the combustion gas flow path has an annular shape around the axis, the "direction from the gas path surface toward the opposite-gas-path surface" is a radial direction that is a direction intersecting this axis.

In the above flow path forming plate, at least one edge of a plurality of edges forming the passage cross-section of the first side passage may be a straight line.

In any one of the above flow path forming plates, the internal angle of each corner formed by adjacent edges of a plurality of edges forming the passage cross-section of the first side passage may be not larger than 180°.

In this flow path forming plate, it is possible to avoid reducing the passage cross-sectional area of the first side passage, and thereby to reduce the pressure loss of cooling air in the process of flowing through the first side passage.

In any one of the above flow path forming plates, of the passage forming surfaces, a second forming surface may face the opposite-flow-path side, and may spread from the border of the first forming surface on an opposite-end-surface side that is the opposite side from the end surface side, toward the opposite-end-surface side, and the second forming surface may be substantially parallel to the gas path surface.

In any one of the above flow path forming plates, of the passage forming surfaces, a third forming surface may face the flow path side and spread along the opposite-gas-path surface.

Here, that the third forming surface spreads along the opposite-gas-path surface means that the third forming surface is substantially parallel to the opposite-gas-path surface. For the distance between the third forming surface and the opposite-gas-path surface, an allowable distance is determined in view of the strength of the flow path forming plate, the ease of production in the process of manufacturing the flow path forming plate, etc. In this flow path forming plate, the third forming surface is formed along the opposite-gas-path surface, which makes it possible to secure a large passage cross-sectional area of the first side passage while keeping the third forming surface and the opposite-gas-path surface at the allowable distance or farther away from each other.

Any one of the above flow path forming plates may further include a plurality of first gas path surface blow-out passages that communicates with the first side passage and opens in the gas path surface.

In this flow path forming plate, the gas path surface can be further cooled with cooling air flowing through the first gas path surface blow-out passages.

The above flow path forming plate having the second forming surface may further include a plurality of first gas path surface blow-out passages that communicates with the first side passage and opens in the gas path surface, and the first gas path surface blow-out passages may open in the second forming surface.

Also in this flow path forming plate, the gas path surface can be further cooled with cooling air flowing through the first gas path surface blow-out passages. Moreover, in this flow path forming plate, the first gas path surface blow-out passages can be easily formed without interfering with the end surface blow-out passages.

In the above flow path forming plate having the first gas path surface blow-out passages, the first gas path surface blow-out passages may extend gradually toward the flow path side while extending toward the end surface side.

In this flow path forming plate, the gas path surface can be film-cooled with cooling air from the first gas path surface blow-out passages.

Any one of the above flow path forming plate may further include a peripheral wall that is provided along the end surfaces and protrudes from the opposite-gas-path surface toward the opposite-flow-path side, and a recess which is recessed toward the flow path side and into which cooling air flows may be formed by the opposite-gas-path surface and the peripheral wall.

The above flow path forming plate having the recess formed therein may further include a plurality of second gas path surface blow-out passages that communicates with a space inside the recess and opens in the gas path surface.

In this flow path forming plate, the gas path surface can be further cooled with cooling air flowing through the second gas path surface blow-out passages.

In the above flow path forming plate including the second gas path surface blow-out passages, the second gas path surface blow-out passages may extend gradually toward the flow path side while extending toward the end surface side.

In this flow path forming plate, the gas path surface can be film-cooled with cooling air from the second gas path surface blow-out passages.

Any one of the above flow path forming plates having the recess formed therein may further include a communication passage that communicates with a space inside the recess and with the first side passage.

In the above flow path forming plate including the communication passage, the peripheral wall may have a first wall that is provided along the first end surface, and the communication passage may open in a surface of the first wall that defines the space or in a bottom surface of the recess.

In any one of the above flow path forming plates, the end surfaces include a second end surface that extends in a direction intersecting the first end surface, from a first end of the first end surface in an extension direction of the first side passage, and a third end surface that extends in a direction intersecting the first end surface, from a second end of the first end surface on the opposite side from the first end in the extension direction of the first side passage. The flow path forming plate further includes a second side passage which is formed between the gas path surface and the opposite-gas-path surface and extends in a direction along the second end surface, and through which cooling air flows, and a third side passage which is formed between the gas path surface and the opposite-gas-path surface and extends in a direction along the third end surface, and through which cooling air flows. The first side passage may communicate with the second side passage and the third side passage.

A vane as an aspect according to the present invention to achieve the above object includes any one of the above flow path forming plates, and a vane body that forms an airfoil and extends from the gas path surface of the flow path forming plate toward the flow path side.

In the above vane, the first end surface may be a back end surface facing a downstream side in an axial direction in which the combustion gas flows.

A vane as another aspect according to the present invention to achieve the above object includes any one of the above flow path forming plates that include the first gas path surface blow-out passages, and a vane body that forms an airfoil and extends from the gas path surface of the flow path forming plate toward the flow path side. The first end surface is a back end surface facing a downstream side in an axial direction in which the combustion gas flows. Openings of the first gas path surface blow-out passages in the gas path surface are located farther on the downstream side in the axial direction than the vane body.

In any one of the above vanes, the end surfaces of the flow path forming plate include a pressure-side end surface that extends in a direction intersecting the back end surface, from a first end of the back end surface in a first direction in which the first side passage extends, and a suction-side end surface that extends in a direction intersecting the back end surface, from a second end of the back end surface on the opposite side from the first end in the first direction. Openings of the end surface blow-out passages are formed so as to be arrayed in the first direction in each of a middle region of the back end surface that does not include the border with the suction-side end surface and the border with the pressure-side end surface, a suction-side region of the back end surface that includes the border with the suction-side end surface and adjoins the middle region in the first direction, and a pressure-side region of the back end surface that includes the border with the pressure-side end surface and adjoins the middle region in the first direction. The density of the openings of the end surface blow-out passages is higher in the middle region than in at least one of the suction-side region and the pressure-side region. The density of the openings is a ratio of the length of wetted perimeter of the end surface blow-out passages to the interval of the openings of the end surface blow-out passages.

In a part of the gas path surface farther on the axially downstream side than the vane body, the middle region is more easily heated by the combustion gas and less easily cooled with cooling air flowing through the first side passage than the pressure-side region and the suction-side region. In this vane, the density of the openings of the end surface blow-out passages is higher in the middle region of the back end surface than in at least one of the suction-side region and the pressure-side region of the back end surface. Thus, in this vane, the middle region of the part of the gas path surface farther on the axially downstream side than the vane body can be effectively cooled.

In the above vane in which the density of the openings of the end surface blow-out passages is higher in the middle region, at least three openings of the end surface blow-out passages arrayed in the first direction may be formed in each of the suction-side region and the pressure-side region.

A gas turbine as an aspect according to the present invention to achieve the above object includes any one of the above flow path forming plates and a combustor that generates the combustion gas.

A gas turbine as another aspect according to the present invention to achieve the above object includes any one of the vanes and a combustor that generates the combustion gas.

A manufacturing method of a flow path forming plate as an aspect according to the present invention to achieve the above object is a manufacturing method of a flow path forming plate that defines a combustion gas flow path through which combustion gas flows. The manufacturing method includes: an outer shape forming step of forming a gas path surface that comes in contact with the combustion gas, an opposite-gas-path surface that faces the opposite side from the gas path surface, and end surfaces that are formed at peripheral edges of the gas path surface; a side passage forming step of forming, between the gas path surface and the opposite-gas-path surface, a first side passage which extends along a first end surface that is one of the end surfaces and through which cooling air flows; and a blow-out passage forming step of forming a plurality of end surface blow-out passages that communicates with the first side passage and opens in the first end surface. In the side passage forming step, a plurality of passage forming surfaces defining the first side passage is formed. Of the passage forming surfaces, a first forming surface faces the side of the opposite-gas-path surface with the gas path surface as a reference point and extends gradually farther away from the gas path surface while extending toward the first end surface. In the blow-out passage forming step, the end surface blow-out passages are formed such that the passage cross-sectional area of the end surface blow-out passage is smaller than the passage cross-sectional area of the first side passage, and openings of the end surface blow-out passages are formed in the first forming surface.

Advantageous Effects of Invention

According to an aspect of the present invention, a part of a gas path surface of a flow path forming plate on the side of a first end surface can be effectively cooled.

DESCRIPTION OF EMBODIMENTS

An embodiment of the present invention and modified examples thereof will be described below in detail with reference to the drawings.

Embodiment of Gas Turbine

An embodiment of a gas turbine according to the present invention will be described with reference to FIG. 1 and FIG. 2.

Figure 1:
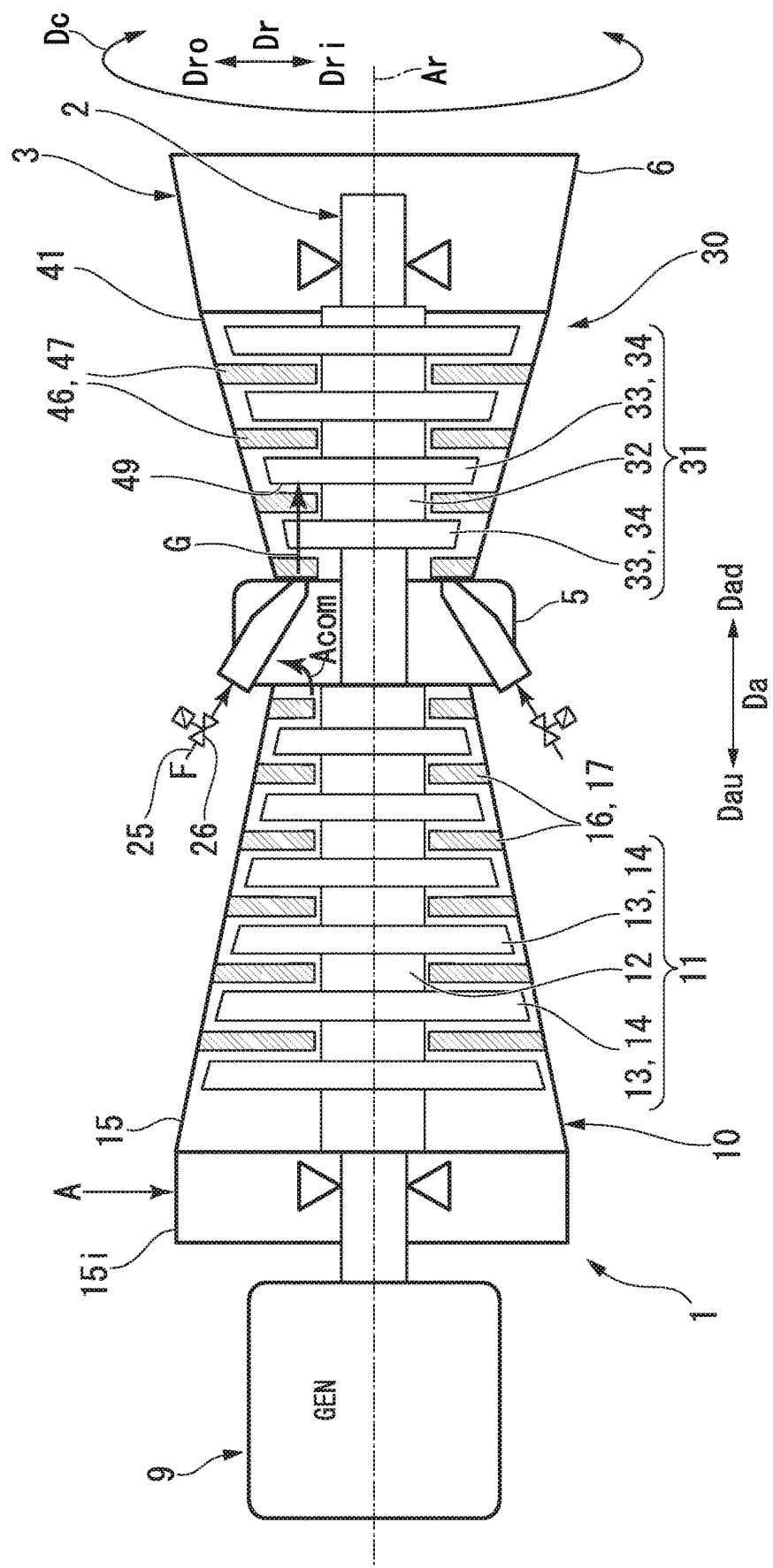
FIG. 1 is a schematic sectional view of a gas turbine in an embodiment according to the present invention.

As shown in FIG. 1, a gas turbine 1 of this embodiment includes a compressor 10 that generates compressed air Acom by compressing outside air A, combustors 20 that generate combustion gas G by combusting fuel F from a fuel supply source in the compressed air Acom, and a turbine 30 that is driven by the combustion gas G.

The compressor 10 has a compressor rotor 11 that rotates around an axis Ar, and a cylindrical compressor casing 15 that covers the compressor rotor 11. Hereinafter, the direction in which the axis Ar extends will be referred to as an axial direction Da. One side in the axial direction Da will be referred to as an axially upstream side Dau, and the other side in the axial direction Da will be referred to as an axially downstream side Dad. The radial direction based on the axis Ar will be referred to simply as a radial direction Dr. The side in the radial direction Dr away from the axis Ar will be referred to as a radially outer side Dro, and the side in the radial direction Dr toward the axis Ar will be referred to as a radially inner side Dri.

The compressor casing 15 has an opening formed on the upstream side. This opening constitutes an air intake opening 15i through which the outside air A is taken into the compressor 10 from the outside. A plurality of stator vane rows 16 is fixed on the radially inner side Dri of the compressor casing 15. The stator vane rows 16 are arrayed at intervals in the axial direction Da. Each stator vane row 16 is composed of a plurality of stator vanes 17 that is arrayed in a circumferential direction Dc based on the axis Ar. The compressor rotor 11 has a rotor shaft 12 that extends in the axial direction Da around the axis Ar, and a plurality of rotor vane rows 13 that is foxed on the outer circumference of the rotor shaft 12. Each rotor vane row 13 is disposed on the axially upstream side Dau of one stator vane row 16. Each rotor vane row 13 is composed of a plurality of rotor vanes 14 that is arrayed in the circumferential direction Dc.

The turbine 30 is disposed on the axially downstream side Dad of the compressor 10. The turbine 30 has a turbine rotor 31 that rotates around the axis Ar, and a cylindrical turbine casing 41 that covers the turbine rotor 31. A plurality of stator vane rows 46 is fixed on the radially inner side Dri of the turbine casing 41. The stator vane rows 46 are arrayed at intervals in the axial direction Da. Each stator vane row 46 is composed of a plurality of stator vanes 47 that is arrayed in the circumferential direction Dc. The turbine rotor 31 has a rotor shaft 32 that extends in the axial direction Da around the axis Ar, and a plurality of rotor vane rows 33 that is fixed on the outer circumference of the rotor shaft 32.

Each rotor vane row 33 is disposed on the axially downstream side Dad of one stator vane row 46. Each rotor vane row 33 is composed of a plurality of rotor vanes 34 that is arrayed in the circumferential direction Dc.

The gas turbine 1 of this embodiment further includes an intermediate casing 5 and an exhaust chamber 6.

The intermediate casing 5 is disposed between the compressor casing 15 and the turbine casing 41 in the axial direction Da. The exhaust chamber 6 is disposed on the axially downstream side Dad of the turbine casing 41. The compressor casing 15, the intermediate casing 5, the turbine casing 41, and the exhaust chamber 6 are coupled to one another to form a gas turbine casing 3. The compressor rotor 11 and the turbine rotor 31 rotate integrally around the same axis Ar. The compressor rotor 11 and the turbine rotor 31 form a gas turbine rotor 2. The gas turbine rotor 2 is supported by a bearing at each end thereof in the axial direction Da. For example, a rotor of a generator 9 is connected to the gas turbine rotor 2.

The combustors 20 are fixed to the intermediate casing 5. A fuel line 25 through which the fuel F is supplied to the combustor 20 is connected to the combustor 20. A fuel regulation valve 26 that regulates the flow rate of the fuel is provided in the fuel line 25.

Figure 2:
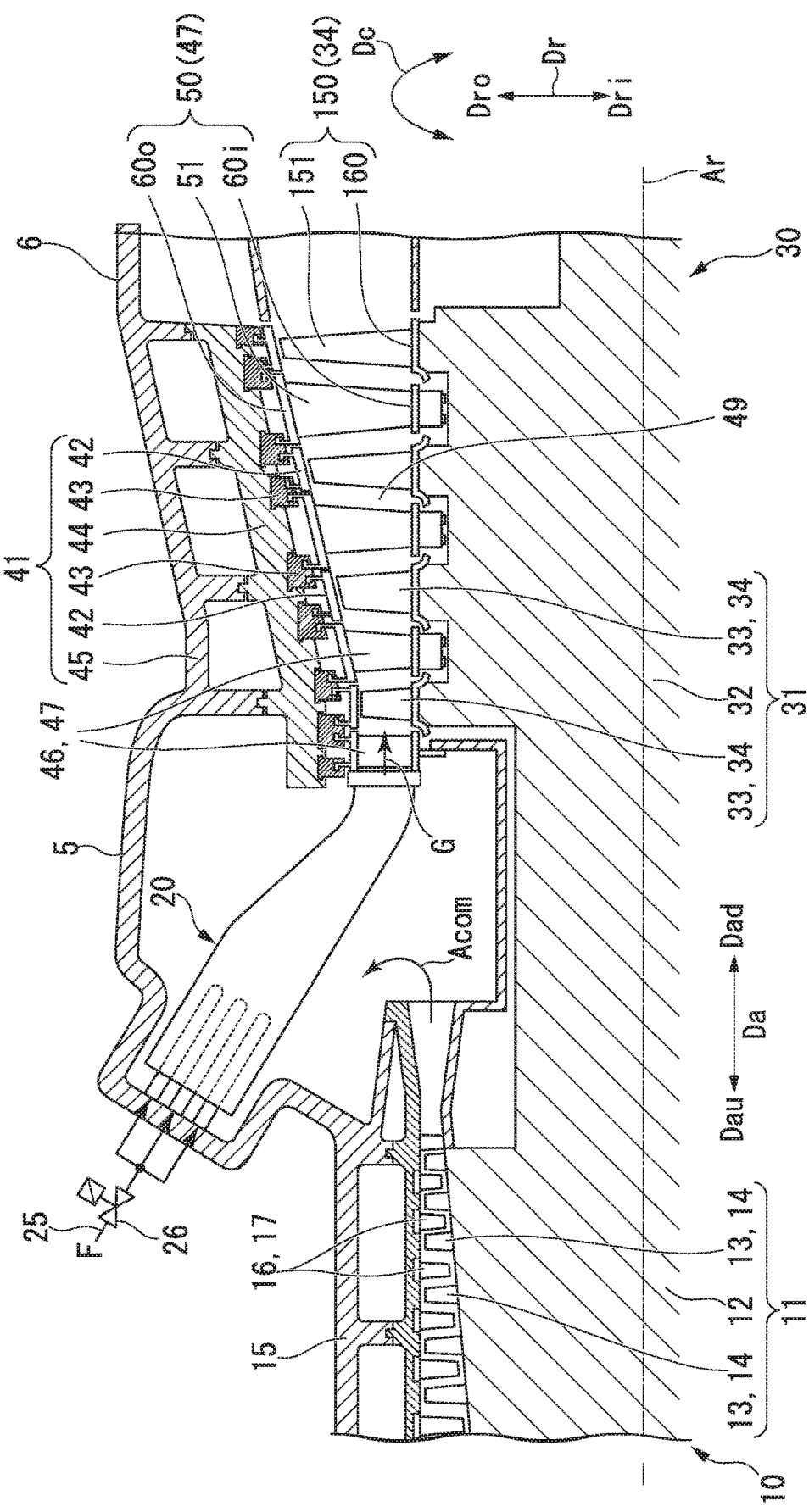
FIG. 2 is a sectional view of main parts of the gas turbine in the embodiment according to the present invention.

As shown in FIG. 2, the turbine casing 41 has a plurality of ring segments 42, a plurality of isolation rings 43, a vane ring 44, and a casing body 45. The ring segments 42 are located on the radially outer side Dro of the rotor vane row 33 and face the rotor vane row 33 in the radial direction Dr. The vane ring 44 has an annular shape around the axis Ar and is located on the radially outer side Dro of the ring segments 42. The isolation ring 43 is located between the ring segments 42 and the stator vanes 47 on one side and the vane ring 44 on the other side in the radial direction Dr, and connects the ring segments 42 and the stator vanes 47 to the vane ring 44. Thus, the ring segments 42 and the stator vanes 47 are supported from the radially outer side Dro by the vane ring 44 through the isolation ring 43. The casing body 45 has an annular shape around the axis Ar and is located on the radially outer side Dro of the vane ring 44. The casing body 45 supports the vane ring 44 from the radially outer side Dro. The intermediate casing 5 is connected on the axially upstream side Dau of the casing body 45. The exhaust chamber 6 is connected on the axially downstream side Dad of the casing body 45.

An annular space between the radially outer side Dro of the rotor shaft 32 and the radially inner side Dri of the turbine casing 41 forms a combustion gas flow path 49 through which the combustion gas G from the combustors 20 flows. The rotor shaft 32 has a cooling air passage formed therein through which cooling air passes. Cooling air having passed through this cooling air passage is introduced into the rotor vanes 34 and used to cool the rotor vanes 34. The turbine casing 41 has a cooling air passage formed therein through which cooling air passes. Cooling air having passed through this cooling air passage is introduced into the stator vanes 47 and the ring segments 42 and used to cool the stator vanes 47 and the ring segments 42. For some stator vane rows 46, air inside the intermediate casing 5 is supplied as cooling air to the stator vanes 47 composing these stator vane rows 46 without passing through the cooling air passage of the casing.

Embodiment of Stator Vane and Modified Examples Thereof

An embodiment of a stator vane according to the present invention and various modified examples thereof will be described below with reference to FIG. 3 to FIG. 15. Each stator vane to be described below is a specific example of the stator vane described above in "Embodiment of Gas Turbine."

Figure 3:
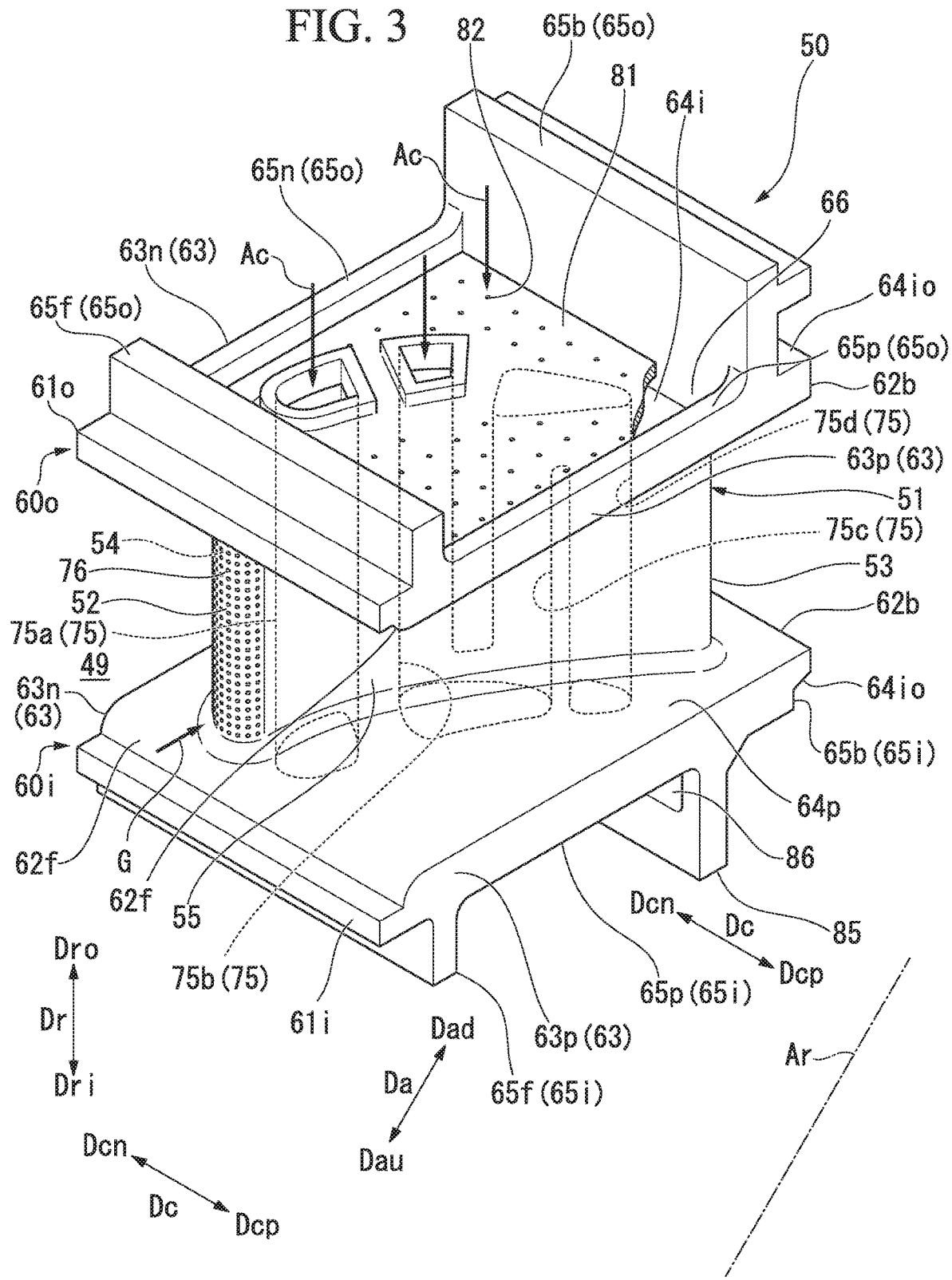
FIG. 3 is a perspective view of a stator vane in the embodiment according to the present invention.

As shown in FIG. 3, a stator vane 50 of this embodiment has a vane body 51 extending in the radial direction Dr, an inner shroud 60i formed on the radially inner side Dri of the vane body 51, and an outer shroud 60o formed on the radially outer side Dro of the vane body 51. The vane body 51 is disposed inside the combustion gas flow path 49 (see FIG. 2) through which the combustion gas G passes. The inner shroud 60i defines the perimeter of the annular combustion gas flow path 49 on the radially inner side Dri. The outer shroud 60o defines the perimeter of the annular combustion gas flow path 49 on the radially outer side Dro. Thus, each of the inner shroud 60i and the outer shroud 60o is a flow path forming plate that defines a part of the combustion gas flow path 49.

Figure 4:
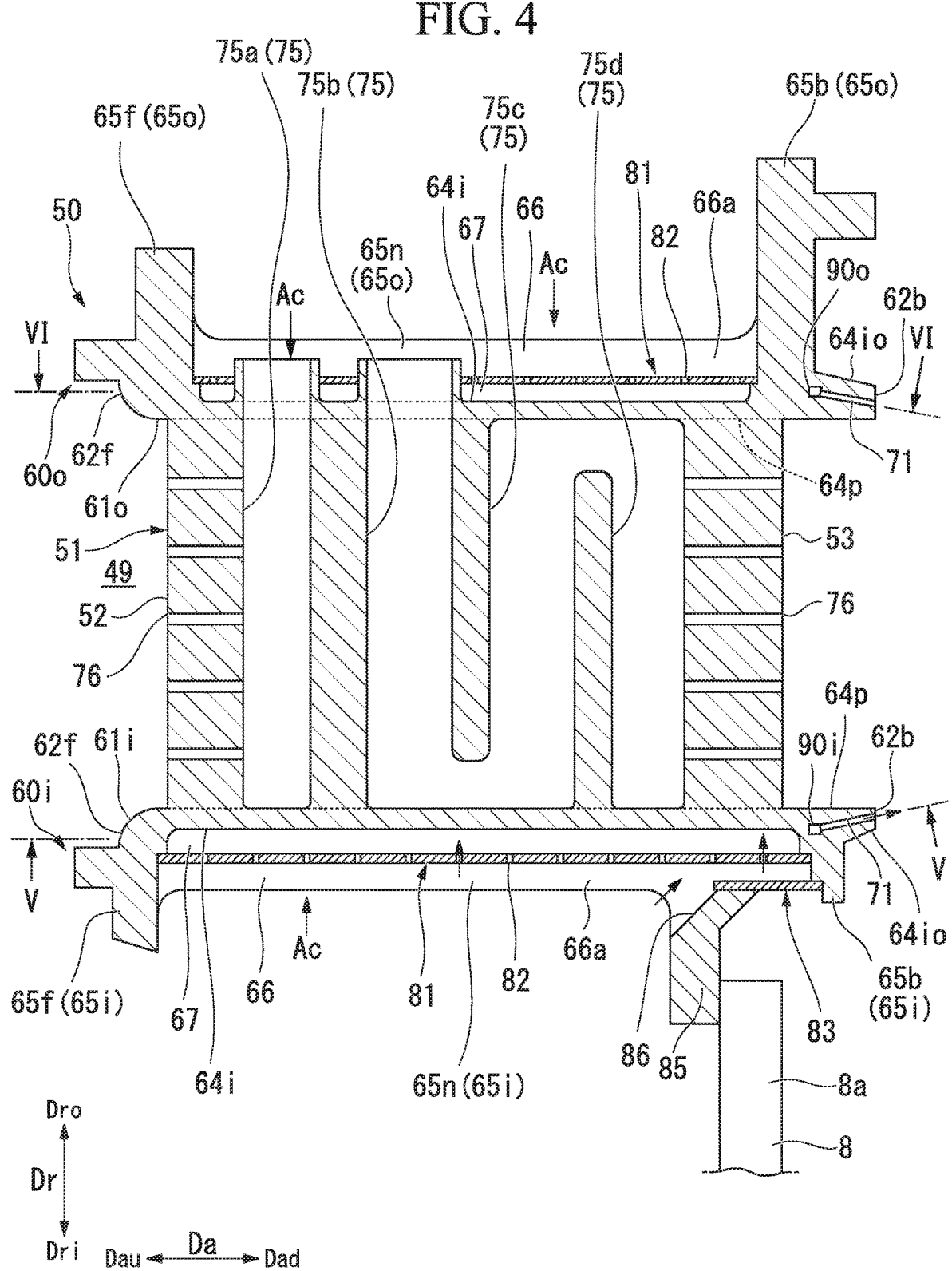
FIG. 4 is a sectional view, taken along the mean line, of the stator vane in the embodiment according to the present invention.
Figure 5:
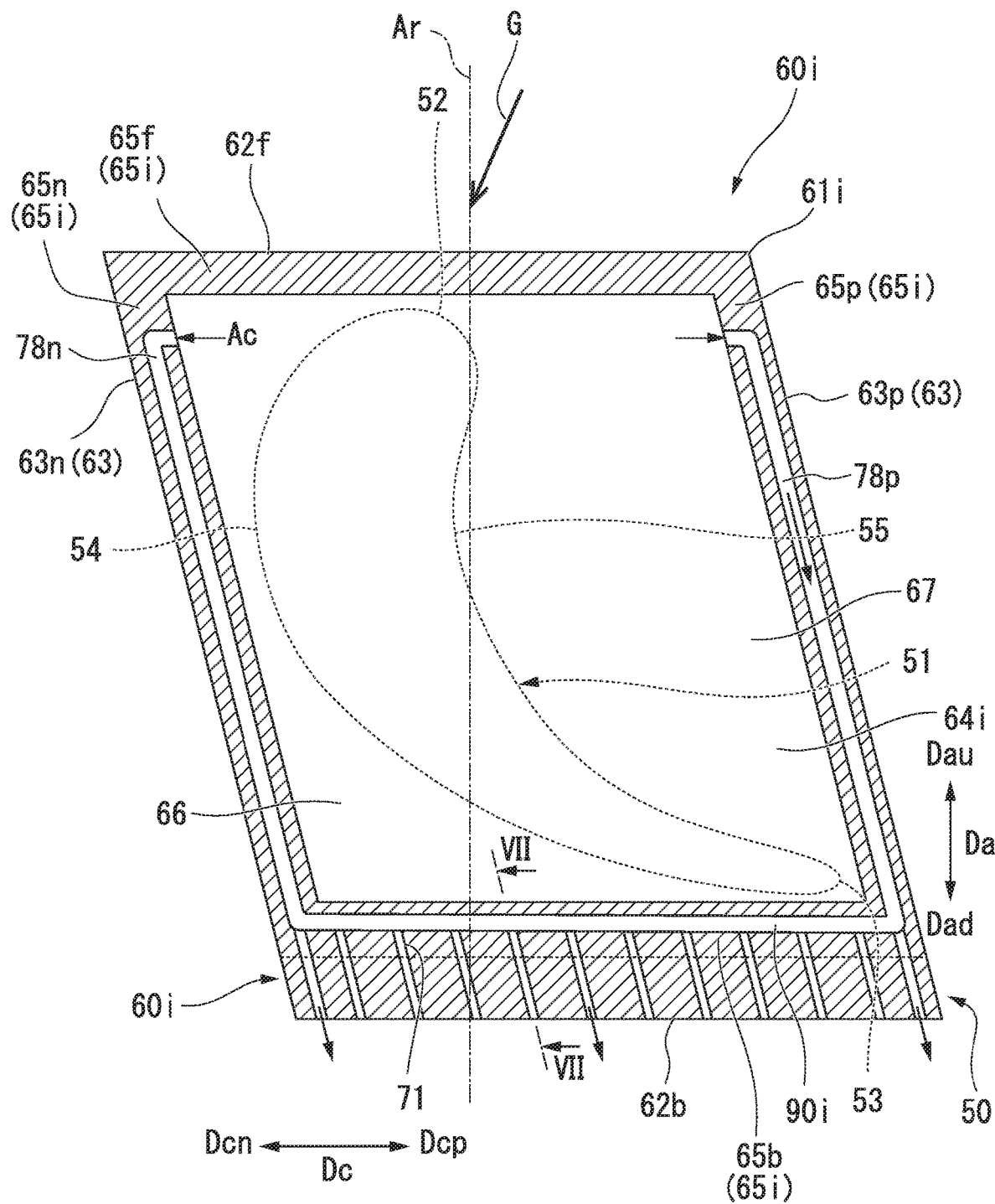
FIG. 5 is a sectional view taken along line V-V in FIG. 4.

As shown in FIG. 3 to FIG. 5, the vane body 51 forms an airfoil. The end of the vane body 51 on the axially upstream side Dau forms a leading edge 52, and the end thereof on the axially downstream side Dad forms a trailing edge 53. Of the surfaces of the vane body 51 facing the circumferential direction Dc, the convex surface forms a suction-side surface 54 (=negative pressure surface) and a concave surface forms a pressure-side surface 55 (=positive pressure surface). For the convenience of the following description, the pressure side (=positive pressure surface side) of the vane body 51 in the circumferential direction Dc will be referred to as a circumferential pressure side Dcp, and the suction side (=negative pressure surface side) of the vane body 51 will be referred to as a circumferential suction side Dcn.

As shown in FIG. 3 to FIG. 5, the inner shroud 60i that is a flow path forming plate has an inner shroud body 61i and a peripheral wall 65i. The inner shroud body 61i has a front end surface 62f that is an end surface on the axially upstream side Dau, a back end surface 62b that is an end surface on the axially downstream side Dad, a pair of circumferential end surfaces 63 facing opposite sides in the circumferential direction Dc, a gas path surface 64p facing the radially outer side Dro, and an opposite-gas-path surface 64i facing the radially inner side Dri. Of the pair of circumferential end surfaces 63, the end surface on the circumferential pressure side Dcp forms a pressure-side end surface 63p, and the end surface on the circumferential suction side Dcn forms a suction-side end surface 63n. The front end surface 62f and the back end surface 62b are roughly parallel to each other. The pressure-side end surface 63p and the suction-side end surface 63n are roughly parallel to each other. Thus, as shown in FIG. 5, the inner shroud body 61i has a parallelogram shape when seen from the radial direction Dr.

The peripheral wall 65i protrudes from the opposite-gas-path surface 64i of the inner shroud body 61i toward the radially inner side Dri (opposite-flow-path side). The peripheral wall 65i is provided along the end surfaces of the inner shroud body 61i. The peripheral wall 65i has a front wall 65f and a back wall 65b facing each other in the axial direction Da, and a pair of side walls 65p, 65n facing each other in the circumferential direction Dc. Of the pair of side walls 65p, 65n, the side wall on the circumferential pressure side Dcp forms a pressure-side wall 65p, and the side wall on the circumferential suction side Dcn forms a suction-side wall 65n. Each of the front wall 65f and the back wall 65b protrudes relative to the inner shroud body 61i, farther toward the radially inner side Dri than the pair of side walls 65p, 65n. The inner shroud 60i has a recess 66 (see FIG. 4 and FIG. 5) that is formed by the inner shroud body 61i and the peripheral wall 65i and recessed toward the radially outer side Dro. The surface of the pressure-side wall 65p on the circumferential pressure side Dcp and the surface of the inner shroud body 61i on the circumferential pressure side Dcp are flush with each other. The surface of the suction-side wall 65n on the circumferential suction side Dcn and the surface of the inner shroud body 61i on the circumferential suction side Dcn are flush with each other. The back wall 65b is formed along the back end surface 62b of the inner shroud body 61i, but is formed farther on the axially upstream side Dau than the back end surface 62b. Thus, of the opposite-gas-path surface 64i of the inner shroud body 61i, the surface on the axially upstream side Dau with the back wall 65b as a reference point forms the bottom surface of the recess 66. Of the opposite-gas-path surface 64i of the inner shroud body 61i, the surface on the axially downstream side Dad with the back wall 65b as a reference point does not form the bottom surface of the recess 66 but forms an outer opposite-gas-path surface 64io. The outer opposite-gas-path surface 64io of the inner shroud 60i is formed so as to extend gradually closer to the gas path surface 64p while extending toward the axially downstream side Dad. Here, the opposite-flow-path side refers to the side in the radial direction Dr away from the combustion gas flow path 49 or the gas path surface 64p, and the flow path side refers to the side in the radial direction Dr toward the combustion gas flow path 49 or the gas path surface 64p. In the case of the inner shroud 60i, therefore, the flow path side coincides with the radially outer side Dro and the opposite-flow-path side coincides with the radially inner side Dri. In the case of the outer shroud 60o, the flow path side coincides with the radially inner side Dri and the opposite-flow-path side coincides with the radially outer side Dro.

The stator vanes 50 composing one of the stator vane rows 46 are each provided with a retainer 85 that protrudes from the pair of side walls 65p, 65n of the inner shroud 60i toward the radially inner side Dri. The retainer 85 is located between the front wall 65f and the back wall 65b in the axial direction Da, and is formed across the pressure-side end surface 63p and the suction-side end surface 63n. The pressure-side end surface of the retainer 85 is flush with the pressure-side end surface 63p of the inner shroud body 61i. Although this is not shown, the suction-side end surface of the retainer 85 is flush with the suction-side end surface 63n of the inner shroud body 61i. The retainer 85 comes in contact with a radially outer end 8a (see FIG. 4) on the downstream side of an inner cover 8 that is fixed to the gas turbine casing 3, and thus serves to support a part of the stator vane 50 on the radially inner side Dri onto the radially outer end 8a of the inner cover 8. The retainer 85 has an opening 86 (hereinafter referred to as a retainer opening 86) that is formed therethrough in the axial direction Da. A space formed by the retainer opening 86 communicates with a space formed by the recess 66 of the inner shroud 60i.

As shown in FIG. 4, the stator vane 50 further includes an impingement plate 81. The stator vane 50 provided with the retainer 85 further includes an impingement plate 81 and a seal plate 83. The impingement plate 81 partitions the space inside the recess 66 of the inner shroud 60i into an outer cavity 66a that is a region on the radially inner side Dri and an inner cavity 67 that is a region on the radially outer side Dro. The impingement plate 81 has a plurality of through-holes 82 that is formed therethrough in the radial direction Dr. Part of cooling air Ac present on the radially inner side Dri of the stator vane 50 flows into the inner cavity 67 through the through-holes 82 of the impingement plate 81. In this process, the cooling air Ac impinges on the bottom surface of the recess 66 and performs impingement cooling on this bottom surface. The seal plate 83 closes a part of the opening of the recess 66 farther on the axially downstream side Dad than the retainer 85. The seal plate 83 is located farther on the downstream side Dad than the retainer 85 and farther on the radially inner side Dri than the impingement plate 81.

Figure 6:
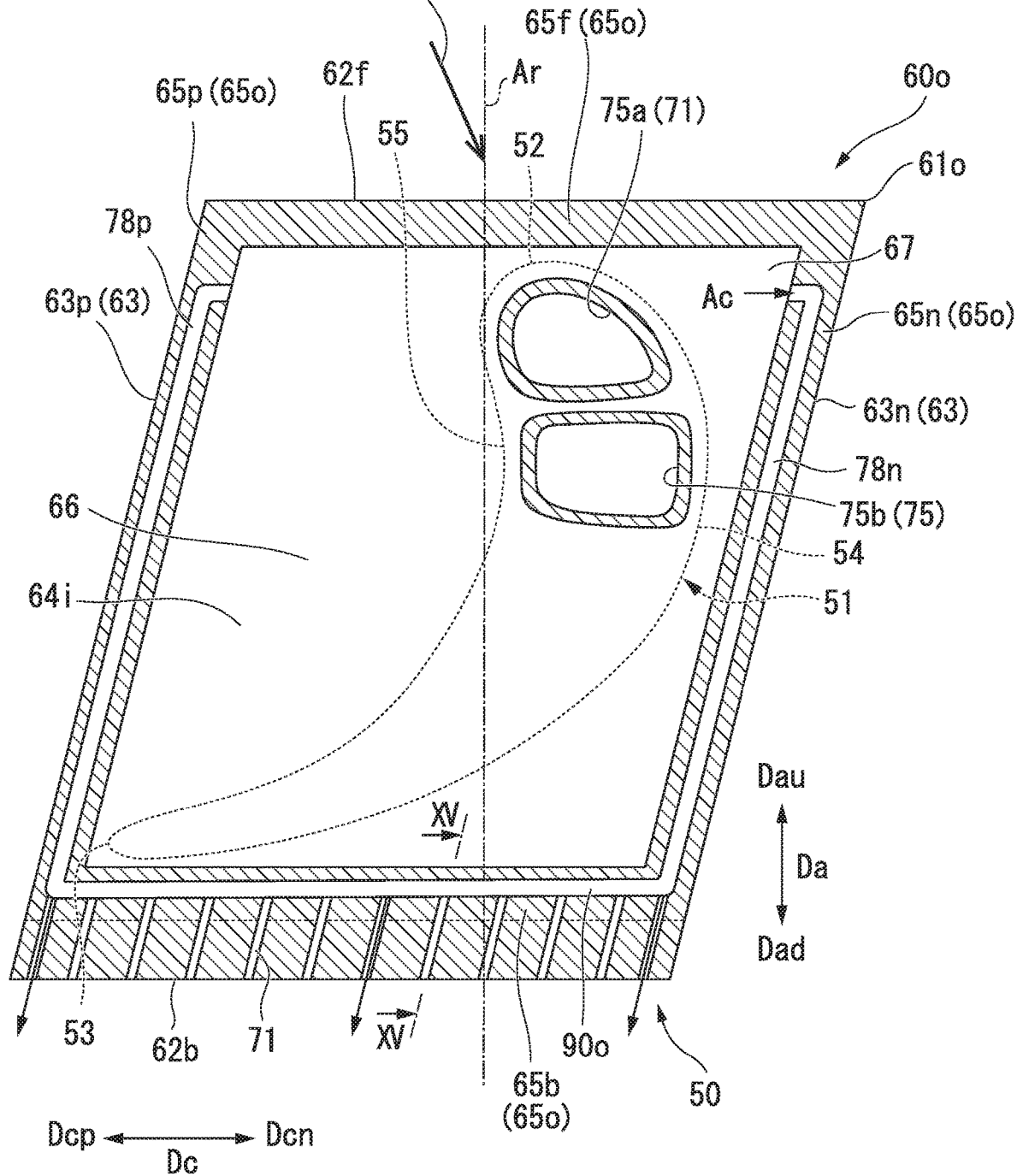
FIG. 6 is a sectional view taken along line VI-VI in FIG. 4.

As shown in FIG. 3, FIG. 4, and FIG. 6, the outer shroud 60o that is a flow path forming plate has an outer shroud body 61o and a peripheral wall 65o. Like the inner shroud body 61i, the outer shroud body 61o has a front end surface 62f, a back end surface 62b, a pair of circumferential end surfaces 63, a gas path surface 64p, and an opposite-gas-path surface 64i. Of the pair of circumferential end surfaces 63, the end surface on the circumferential pressure side Dcp forms a pressure-side end surface 63p, and the end surface on the circumferential suction side Dcn forms a suction-side end surface 63n. Like the inner shroud body 61i, the outer shroud body 61o has a parallelogram shape when seen from the radial direction Dr. The gas path surface 64p of the inner shroud body 61i faces the radially outer side Dro, while the gas path surface 64p of the outer shroud body 61o faces the radially inner side Dri.

The peripheral wall 65o has a front wall 65f and a back wall 65b facing each other in the axial direction Da, and a pair of side walls 65p, 65n facing each other in the circumferential direction Dc. Of the pair of side walls 65p, 65n, the side wall on the circumferential pressure side Dcp forms a pressure-side wall 65p, and the side wall on the circumferential suction side Dcn forms a suction-side wall 65n. Each of the front wall 65f and the back wall 65b protrudes relative to the outer shroud body 61o, farther toward the radially outer side Dro than the pair of side walls 65p, 65n and forms a hook. The front wall 65f and the back wall 65b forming the hooks serve to mount the stator vane 50 onto the inner circumferential side of the turbine casing 41. Specifically, the front wall 65f and the back wall 65b forming the hooks are mounted on the isolation ring 43 (see FIG. 2) that forms a part of the turbine casing 41. The outer shroud 60o has a recess 66 that is formed by the outer shroud body 61o and the peripheral wall 65o and recessed toward the radially inner side Dri. The surface of the pressure-side wall 65p on the circumferential pressure side Dcp and the surface of the outer shroud body 61o on the circumferential pressure side Dcp are flush with each other. The surface of the suction-side wall 65n on the circumferential suction side Dcn and the surface of the outer shroud body 61o on the circumferential suction side Dcn are flush with each other. The back wall 65b is formed along the back end surface 62b of the outer shroud body 61o, but is formed farther on the axially upstream side Dau than the back end surface 62b. Thus, of the opposite-gas-path surface 64i of the outer shroud body 61o, the surface on the axially upstream side Dau with the back wall 65b as a reference point forms the bottom surface of the recess 66. Of the opposite-gas-path surface 64i of the outer shroud body 61o, the surface on the axially downstream side Dad with the back wall 65b as a reference point does not form the bottom surface of the recess 66 but forms an outer opposite-gas-path surface 64io. The outer opposite-gas-path surface 64io of the outer shroud 60o is formed so as to extend gradually closer to the gas path surface 64p while extending toward the axially downstream side Dad.

As shown in FIG. 4, the stator vane 50 further includes an impingement plate 81 that partitions a space inside the recess 66 of the outer shroud 60o into a region on the radially outer side Dro and an inner cavity 67 that is a region on the radially inner side Dri. The impingement plate 81 has a plurality of through-holes 82 that is formed therethrough in the radial direction Dr. Part of the cooling air Ac present on the radially outer side Dro of the stator vane 50 flows into the inner cavity 67 through the through-holes 82 of the impingement plate 81.

As shown in FIG. 3 and FIG. 4, a plurality of vane air passages 75 extending in the radial direction Dr is formed inside the vane body 51, the outer shroud 60o, and the inner shroud 60i. Each vane air passage 75 extends continuously from the outer shroud 60o through the vane body 51 to the inner shroud 60i. The vane air passages 75 are arrayed along the mean line of the vane body 51. Some of the vane air passages 75 that are adjacent to each other communicate with each other at a part on the radially outer side Dro or at a part on the radially inner side Dri. Moreover, one of the vane air passages 75 is open on the radially outer side Dro.

Here, in this embodiment, an example where there are four vane air passages 75 is presented. Of the four vane air passages 75, the vane air passage 75 located farthest on the axially upstream side Dau is a first vane air passage 75a. Subsequently, a second vane air passage 75b, a third vane air passage 75c, and a fourth vane air passage 75d are arrayed in this order on the axially downstream side Dad with the first vane air passage 75a as a reference point. The second vane air passage 75b communicates at a part on the radially inner side Dri with a part of the third vane air passage 75c on the radially inner side Dri. The third vane air passage 75c communicates at a part on the radially outer side Dro with a part of the fourth vane air passage 75d on the radially outer side Dro.

The ends of the first vane air passage 75a and the second vane air passage 75b on the radially outer side Dro protrude from the impingement plate 81 of the outer shroud 60o toward the radially outer side Dro. The ends of the first vane air passage 75a and the second vane air passage 75b on the radially outer side Dro open in the opposite-gas-path surface 64i of the outer shroud 60o. Thus, the first vane air passage 75a and the second vane air passage 75b communicate with the space inside the recess 66 of the outer shroud 60o. The cooling air Ac flows into the first vane air passage 75a and the second vane air passage 75b through these openings. The ends of the third vane air passage 75c and the fourth vane air passage 75d on the radially outer side Dro are closed. The ends of the first vane air passage 75a, the second vane air passage 75b, the third vane air passage 75c, and the fourth vane air passage 75d on the radially inner side Dri are closed.

Each of the leading edge 52 and the trailing edge 53 of the vane body 51 has a plurality of vane surface blow-out passages 76 that is formed therethrough from the vane air passage 75 to the combustion gas flow path 49. The vane body 51 is cooled in the process of the cooling air Ac flowing through the vane air passages 75. The cooling air Ac having flowed into the vane air passages 75 flows out from the vane surface blow-out passages 76 into the combustion gas flow path 49. Thus, the leading edge 52 and the trailing edge 53 of the vane body 51 are cooled in the process of the cooling air Ac flowing out from the vane surface blow-out passages 76. Moreover, part of the cooling air Ac having flowed out from the vane surface blow-out passages 76 to the combustion gas flow path 49 serves as film cooling air by partially covering the surface of the vane body 51.

As shown in FIG. 5, the pressure-side wall 65p of the inner shroud 60i has a pressure-side passage 78p that extends along the pressure-side end surface 63p in a direction having a component of the axial direction Da. The suction-side wall 65n has a suction-side passage 78n that extends along the suction-side end surface 63n in a direction having a component of the axial direction Da. Each of the pressure-side passage 78p and the suction-side passage 78n communicates at the end thereof on the axially upstream side Dau with the inner cavity 67. The inner shroud body 61i has a back-side passage 90i that extends along the back end surface 62b in the circumferential direction Dc. The end of the back-side passage (first side passage) 90i on the circumferential pressure side Dcp communicates with the end of the pressure-side passage (second side passage) 78p on the axially downstream side Dad. The end of the back-side passage (first side passage) 90i on the circumferential suction side Dcn communicates with the end of the suction-side passage (third side passage) 78n on the axially downstream side Dad. The position of the back-side passage 90i in the axial direction Da overlaps a region which is located farther on the axially downstream side Dad than the trailing edge 53 of the vane body 51 and in which the back wall 65b is formed (see FIG. 4). A plurality of back end surface blow-out passages 71 communicates with the back-side passage 90i. Each back end surface blow-out passage 71 extends from the back-side passage 90i toward the axially downstream side Dad and opens in the back end surface 62b of the inner shroud body 61i. Thus, air having passed through the back end surface blow-out passages 71 flows out into the combustion gas flow path 49 through these openings. The back end surface blow-out passages 71 are arrayed in the circumferential direction Dc.

As shown in FIG. 6, like the pressure-side wall 65p of the inner shroud 60i, the pressure-side wall 65p of the outer shroud 60o has a pressure-side passage 78p that extends along the pressure-side end surface 63p in a direction having a component of the axial direction Da. Like the suction-side wall 65n of the inner shroud 60i, the suction-side wall 65n of the outer shroud 60o has a suction-side passage 78n that extends along the suction-side end surface 63n in a direction having a component of the axial direction Da. Each of the pressure-side passage 78p and the suction-side passage 78n communicates at the end thereof on the axially upstream side Dau with the inner cavity 67. The outer shroud body 61o has a back-side passage 90o that extends along the back end surface 62b in the circumferential direction Dc. The end of the back-side passage (first side passage) 90o on the circumferential pressure side Dcp communicates with the end of the pressure-side passage (second side passage) 78p on the axially downstream side Dad. The end of the back-side passage (first side passage) 90o on the circumferential suction side Dcn communicates with the end of the suction-side passage (third side passage) 78n on the axially downstream side Dad. The position of the back-side passage 90o in the axial direction Da overlaps a region in which the back wall 65b is formed (see FIG. 4). A plurality of back end surface blow-out passages 71 communicates with the back-side passage 90o. Each back end surface blow-out passage 71 extends from the back-side passage 90o toward the axially downstream side Dad and opens in the back end surface 62b of the outer shroud body 61o. Thus, air having passed through the back end surface blow-out passages 71 flows out into the combustion gas flow path 49 through these openings. The back end surface blow-out passages 71 are arrayed in the circumferential direction Dc.

Figure 7:
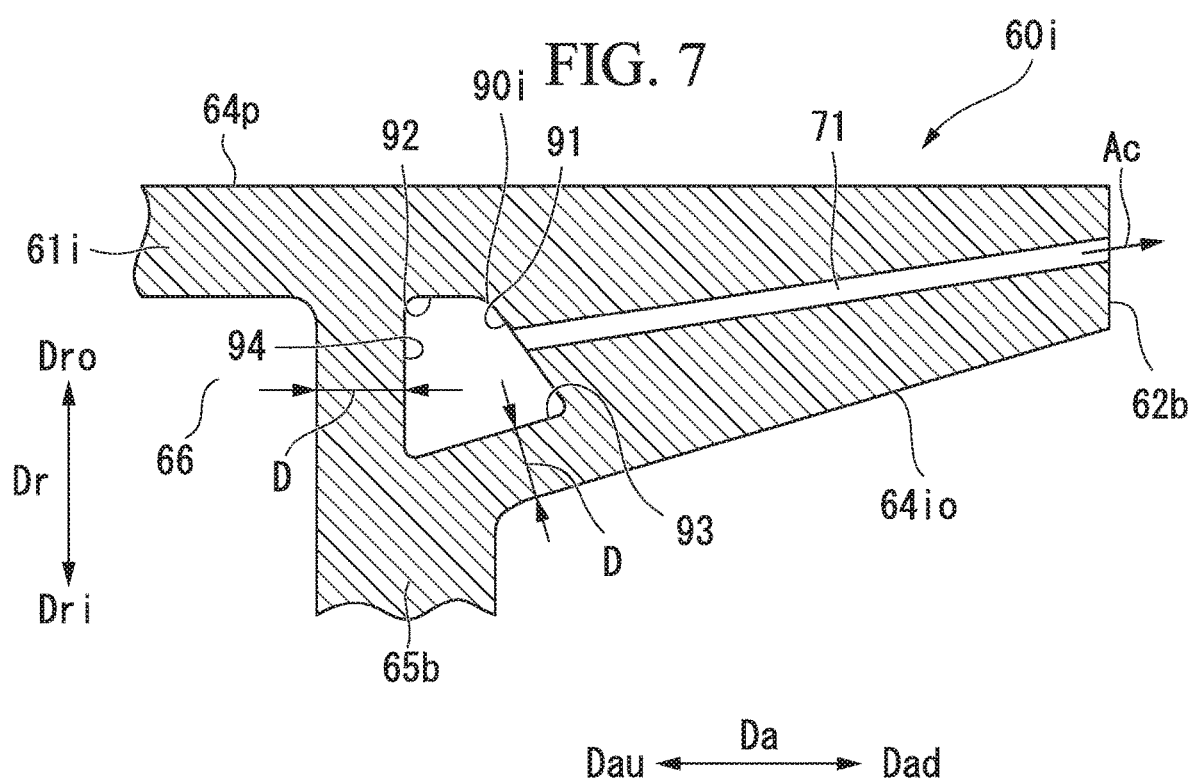
FIG. 7 is a sectional view taken along line VII-VII in FIG. 5.

As shown in FIG. 7, the cross-section of the back-side passage 90i in the inner shroud 60i has an irregular quadrangular shape. Thus, the back-side passage 90i is defined by a plurality of passage forming surfaces including a first forming surface 91, a second forming surface 92, a third forming surface 93, and a fourth forming surface 94. Of the plurality of edges forming the passage cross-section of the back-side passage 90i, the edge included in the first forming surface 91, the edge included in the second forming surface 92, the edge included in the third forming surface 93, and the edge included in the fourth forming surface 94 are all substantially straight lines. The first forming surface 91, the second forming surface 92, the third forming surface 93, and the fourth forming surface 94 are all curved surfaces that extend in the circumferential direction Dc and curve gradually as they extend in the circumferential direction Dc. The first forming surface 91 faces the radially inner side Dri (opposite-flow-path side) and extends gradually farther away from the gas path surface 64p while extending toward the axially downstream side Dad (end surface side). In other words, the first forming surface 91 faces the opposite-flow-path side and extends gradually farther away from the gas path surface 64p while extending toward the end surface side that is the side toward the back end surface 62b being the first end surface. The second forming surface 92 faces the radially inner side Dri (opposite-flow-path side) and extends from the end of the first forming surface 91 on the axially upstream side Dau (opposite-end-surface side) toward the axially upstream side Dau (opposite-end-surface side). In other words, the second forming surface 92 faces the radially inner side Dri (opposite-flow-path side) and extends from the end of the first forming surface 91 closest to the gas path surface 64*p* toward the opposite-end-surface side that is the side away from the back end surface 62*b* being the first end surface. The second forming surface 92 is substantially parallel to the gas path surface 64*p*. The fourth forming surface 94 extends from the end of the second forming surface 92 on the axially upstream side Dau toward the radially inner side Dri. The fourth forming surface 94 is substantially parallel to the surface of the back wall 65*b* that is the inner surface thereof facing the recess 66. The third forming surface 93 faces the radially outer side Dro and extends gradually closer to the gas path surface 64*p* while extending toward the axially downstream side Dad. The end of the third forming surface 93 on the axially upstream side Dau joins the end of the fourth forming surface 94 on the radially inner side Dri. The end of the third forming surface 93 on the axially downstream side Dad joins the end of the first forming surface 91 on the axially downstream side Dad. The third forming surface 93 is substantially parallel to the outer opposite-gas-path surface 64*io*.

Each back end surface blow-out passage 71 opens in the first forming surface 91. The cooling air Ac flows into the back-side passage 90*i* from the pressure-side passage 78*p* and the suction-side passage 78*n*. In the process of flowing through the back-side passage 90*i*, the cooling air Ac performs convective cooling on a part of the inner shroud body 61*i* on the axially downstream side Dad. The cooling air Ac having flowed into the back-side passage 90*i* flows into the back end surface blow-out passages 71. In the process of flowing through the back end surface blow-out passages 71, the cooling air Ac performs convective cooling on the part of the inner shroud body 61*i* on the axially downstream side Dad. The cooling air Ac flows out from the openings in the back end surface 62*b*. The passage cross-sectional area of the back-side passage 90*i* is larger than the passage cross-sectional area of the back end surface blow-out passage 71. This is to restrict the flow velocity of the cooling air Ac flowing through the back-side passage 90*i*, and thereby to reduce the pressure loss of the cooling air Ac in the process of flowing through the back-side passage 90*i*. Accordingly, the cooling air Ac flowing through the back end surface blow-out passage 71 has a higher effect of convective cooling per unit passage cross-sectional area than the cooling air Ac flowing through the back-side passage 90*i*. The passage cross-sectional area here refers to the passage area in the cross-section perpendicular to the longitudinal direction of the passage.

The ends of the back end surface blow-out passages 71 on the axially upstream side Dau open in the first forming surface 91 that extends gradually farther away from the gas path surface 64*p* while extending toward the axially downstream side Dad. Thus, the ends of the back end surface blow-out passages 71 on the axially upstream side Dau open at positions farther on the axially upstream side Dau than a part located farthest on the axially downstream side Dad in the passage cross-section of the back-side passage 90*i*. As a result, in this embodiment, the back end surface blow-out passages 71 having a high cooling effect have a long passage length. Moreover, in this embodiment, there is a part where the back-side passage 90*i* and the back end surface blow-out passages 71 overlap each other as seen from the radial direction Dr. In other words, in this embodiment, there is a part where the back-side passage 90*i* and the back end surface blow-out passages 71 overlap each other in the axial direction Da. Thus, in this embodiment, it is possible to doubly cool the gas path surface 64*p*, without increasing the flow rate of the cooling air Ac, at the part where the back-side passage 90*i* and the back end surface blow-out passages 71 overlap each other. Furthermore, in this embodiment, the gas path surface 64*p* can be cooled along the entire passage length of the back end surface blow-out passages 71 having high cooling efficiency. In a third comparative example shown in FIG. 14(C) to be described later, a part of each back end surface blow-out passage 71 on the axially upstream side Dau overlaps a back-side passage 90*ii* as seen from the radial direction Dr. These back end surface blow-out passages 71 open in a forming surface m, at positions farther on the axially upstream side Dau than a part located farthest on the axially downstream side Dad in the passage cross-section of the back-side passage 90*ii*. However, the forming surface m faces the gas path surface 64*p*, i.e., the flow path side. Accordingly, a part of the back-side passage 90*ii* is present on the flow path side of the back end surface blow-out passages 71. Thus, in the third comparative example, it cannot be said that the gas path surface 64*p* is effectively cooled along the entire passage length of the back end surface blow-out passages 71. In this embodiment, by contrast, the gas path surface 64*p* is effectively cooled as described above along the entire passage length of the back end surface blow out passages 71 having high cooling efficiency. This means that, in this embodiment, the back end surface blow-out passages 71 having high cooling efficiency sufficiently contribute to cooling the gas path surface 64*p* along the entire passage length thereof. Thus, in this embodiment, it is possible to effectively cool the part of the gas path surface 64*p* on the axially downstream aside Dad without increasing the flow rate of the cooling air Ac.

To secure a long passage length of the back end surface blow-out passages 71 and contribute to cooling the gas path surface 64*p* along the entire passage length of the back end surface blow-out passages 71, it is necessary to form, as one of the passage forming surfaces forming the back-side passage 90*i*, the first forming surface 91 that faces the radially inner side Dri and extends gradually farther away from the gas path surface 64*p* while extending toward the axially downstream side Dad as described above. Moreover, it is necessary to form the openings of the back end surface blow-out passages 71 in the first forming surface 91.

As long as the above requirements are met, it is not essential that the cross-section of the back-side passage 90*i* has an irregular quadrangular shape. In the following, various cross-sectional shapes of the back-side passage will be described using FIG. 8 to FIG. 13.

Figure 8:
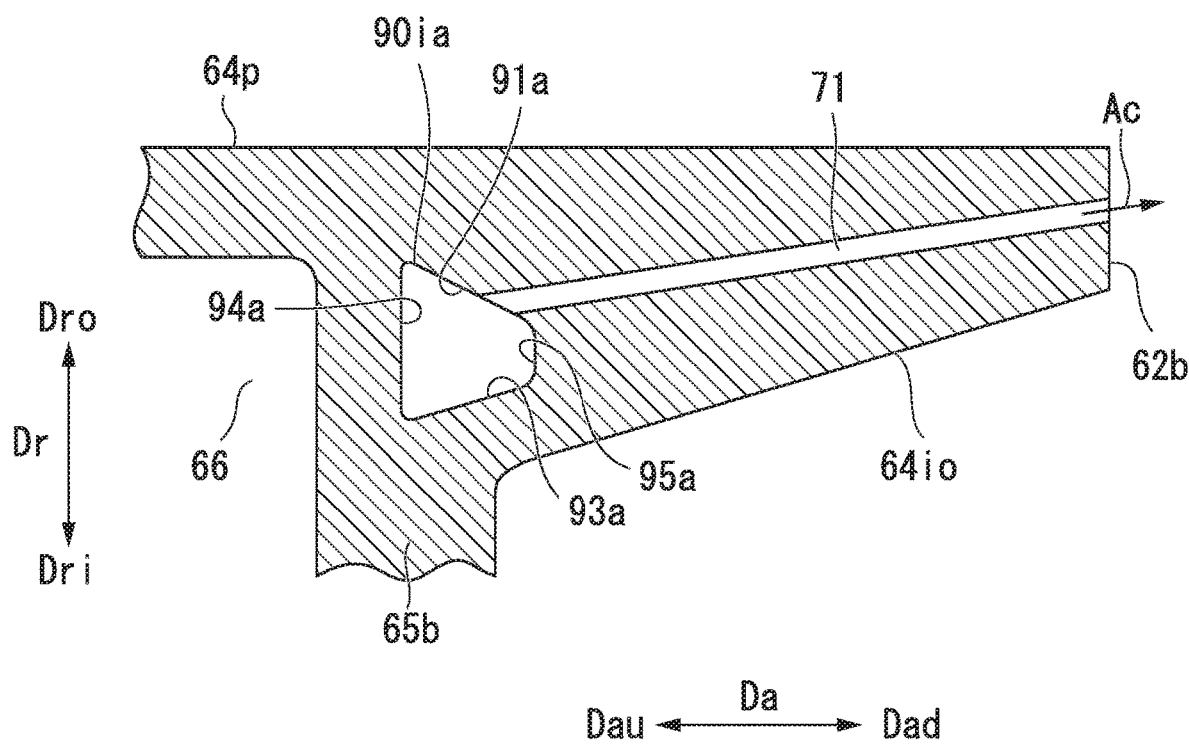
FIG. 8 is a sectional view of a back-side passage of an inner shroud according to the present invention, showing a first modified example of the back-side passage.

First, a first modified example of the back-side passage will be described with reference to FIG. 8.

The cross-section of a back-side passage 90*ia* in this modified example has a substantially isosceles trapezoidal shape. Thus, the back-side passage 90*ia* is defined by a plurality of passage forming surfaces including a first forming surface 91*a*, a third forming surface 93*a*, a fourth forming surface 94*a*, and a fifth forming surface 95*a*. Of the plurality of edges forming the passage cross-section of the back-side passage 90*ia*, the edge included in the first forming surface 91*a*, the edge included in the third forming surface 93*a*, the edge included in the fourth forming surface 94*a*, and the edge included in the fifth forming surface 95*a* are all substantially straight lines. The first forming surface 91*a*, the third forming surface 93*a*, the fourth forming surface 94*a*, and the fifth forming surface 95*a* are all curved surfaces that extend in the circumferential direction Dc and curve gradually as they extend in the circumferential direction Dc. Like the first forming surface 91 of the above embodiment, the first forming surface 91*a* of this modified example faces the radially inner side Dri and extends gradually farther away from the gas path surface 64p while extending toward the axially downstream side Dad. The fourth forming surface 94a faces the axially downstream side Dad and spreads from the end of the first forming surface 91a on the axially upstream side Dau toward the radially inner side Dri. The fourth forming surface 94a is substantially parallel to the surface of the back wall 65b that is the inner surface thereof facing the recess 66. Like the third forming surface 93 of the above embodiment, the third forming surface 93a faces the radially outer side Dro and extends gradually closer to the gas path surface 64p while extending toward the axially downstream side Dad. The third forming surface 93a is substantially parallel to the outer opposite-gas-path surface 64io. The end of the third forming surface 93a on the axially upstream side Dau joins the end of the fourth forming surface 94a on the radially inner side Dri. The fifth forming surface 95a faces the axially upstream side Dau and spreads from the end of the third forming surface 93a on the axially downstream side Dad toward the radially outer side Dro. The fifth forming surface 95a is substantially parallel to the fourth forming surface 94a. The end of the fifth forming surface 95a on the radially outer side Dro joins the end of the first forming surface 91a on the axially downstream side Dad. Thus, in this modified example, the first forming surface 91a and the fourth forming surface 94a directly join each other, which is different from the above embodiment in which there is the second forming surface 92 between the first forming surface 91 and the fourth forming surface 94. On the other hand, in this modified example, unlike the above embodiment, there is the fifth forming surface 95a between the third forming surface 93a and the first forming surface 91a.

Also in this modified example, the back end surface blow-out passages 71 open in the first forming surface 91a that faces the radially inner side Dri (opposite-flow-path side) and extends gradually farther away from the gas path surface 64p while extending toward the axially downstream side Dad. Thus, also in this modified example, it is possible to effectively cool the part of the gas path surface 64p on the axially downstream side Dad without increasing the flow rate of the cooling air Ac.

Figure 9:
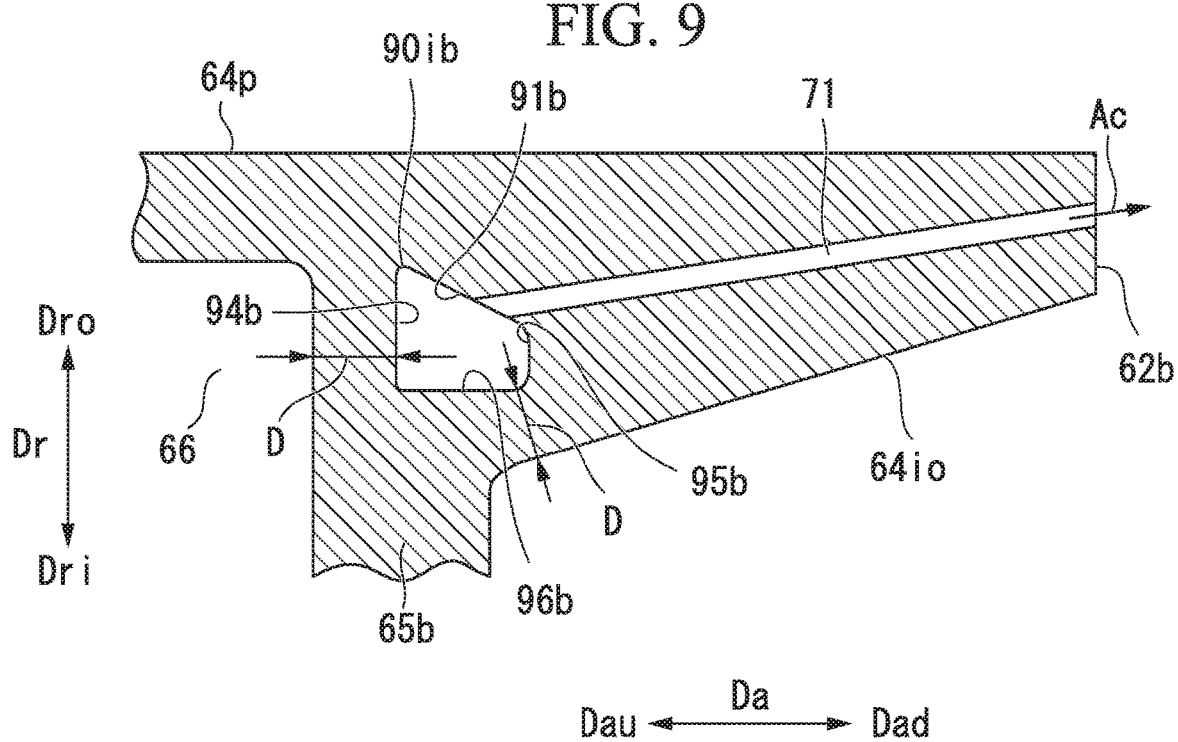
FIG. 9 is a sectional view of a back-side passage of the inner shroud according to the present invention, showing a second modified example of the back-side passage.

A second modified example of the back-side passage will be described with reference to FIG. 9.

The cross-section of a back-side passage 90ib of this modified example has a substantially trapezoidal shape. Thus, the back-side passage 90ib is defined by a plurality of passage forming surfaces including a first forming surface 91b, a fourth forming surface 94b, a fifth forming surface 95b, and a sixth forming surface 96b. Of the plurality of edges forming the passage cross-section of the back-side passage 90ib, the edge included in the first forming surface 91b, the edge included in the fourth forming surface 94b, the edge included in the fifth forming surface 95b, and the edge included in the sixth forming surface 96b are all substantially straight lines. The first forming surface 91b, the fourth forming surface 94b, the fifth forming surface 95b, and the sixth forming surface 96b are all curved surfaces that extend in the circumferential direction Dc and curve gradually as they extend in the circumferential direction Dc. Like the first forming surface 91 of the above embodiment, the first forming surface 91b of this modified example faces the radially inner side Dri and extends gradually farther away from the gas path surface 64p while extending toward the axially downstream side Dad. The fourth forming surface 94b faces the axially downstream side Dad and spreads from the end of the first forming surface 91b on the axially upstream side Dau toward the radially inner side Dri. The fourth forming surface 94b is substantially parallel to the surface of the back wall 65b that is the inner surface thereof facing the recess 66. The sixth forming surface 96b faces the radially outer side Dro and is substantially parallel to the gas path surface 64p. The end of the sixth forming surface 96b on the axially upstream side Dau joins the end of the fourth forming surface 94b on the radially inner side Dri. The fifth forming surface 95b faces the axially upstream side Dau and spreads from the end of the sixth forming surface 96b on the axially downstream side Dad toward the radially outer side Dro. The fifth forming surface 95b is substantially parallel to the fourth forming surface 94b. The end of the fifth forming surface 95b on the radially outer side Dro joins the end of the first forming surface 91b on the axially downstream side Dad.

Also in this modified example, the back end surface blow-out passages 71 open in the first forming surface 91b that faces the radially inner side Dri (opposite-flow-path side) and extends gradually farther away from the gas path surface 64p while extending toward the axially downstream side Dad. Thus, also in this modified example, it is possible to effectively cool the part of the gas path surface 64p on the axially downstream side Dad without increasing the flow rate of the cooling air Ac.

For the distance between the passage forming surfaces forming the back-side passage 90ib and the surfaces present on the outer side of the back-side passage 90ib, an allowable distance D is determined in view of the strength of the flow path forming plate, the ease of production in the process of manufacturing the flow path forming plate, etc. Accordingly, the passage forming surfaces of the back-side passage 90ib are required to be at the allowable distance D or farther away from the surfaces present on the outer side of the back-side passage 90ib. On the other hand, the back-side passage 90ib is required to have a large passage cross-sectional area in order to reduce the pressure loss of the cooling air Ac in the process of flowing through the back-side passage 90ib. Therefore, in the back-side passages 90i, 90ia of the above embodiment and the first modified example, the fourth forming surfaces 94, 94a are formed so as to be substantially parallel to the surface of the back wall 65b that is the inner surface thereof facing the recess 66, and the third forming surfaces 93, 93a are formed so as to be substantially parallel to the outer opposite-gas-path surface 64io. As a result, in the above embodiment and the first modified example, it is possible to secure a large passage cross-sectional area of the back-side passage 90i while keeping the passage forming surfaces of the back-side passage 90i at the allowable distance D or farther away from the surfaces present on the outer side of the back-side passage 90i.

In this modified example, the fourth forming surface 94b is substantially parallel to the surface of the back wall 65b that is the inner surface thereof facing the recess 66. However, the sixth forming surface 96b that is closest to the outer opposite-gas-path surface 64io is not parallel to the outer opposite-gas-path surface 64io. Accordingly, when the distance from the outer opposite-gas-path surface 64io to the position of the end of the sixth forming surface 96b on the axially downstream side Dad is set to the allowable distance D, the rest of the sixth forming surface 96b is distanced from the outer opposite-gas-path surface 64io more than necessary, reducing the passage cross-sectional area of the back-side passage 90ib. Thus, the above embodiment and the first modified example are more advantageous than this modified example in terms of securing a large passage cross-sectional area of the back-side passage.

Figure 10:
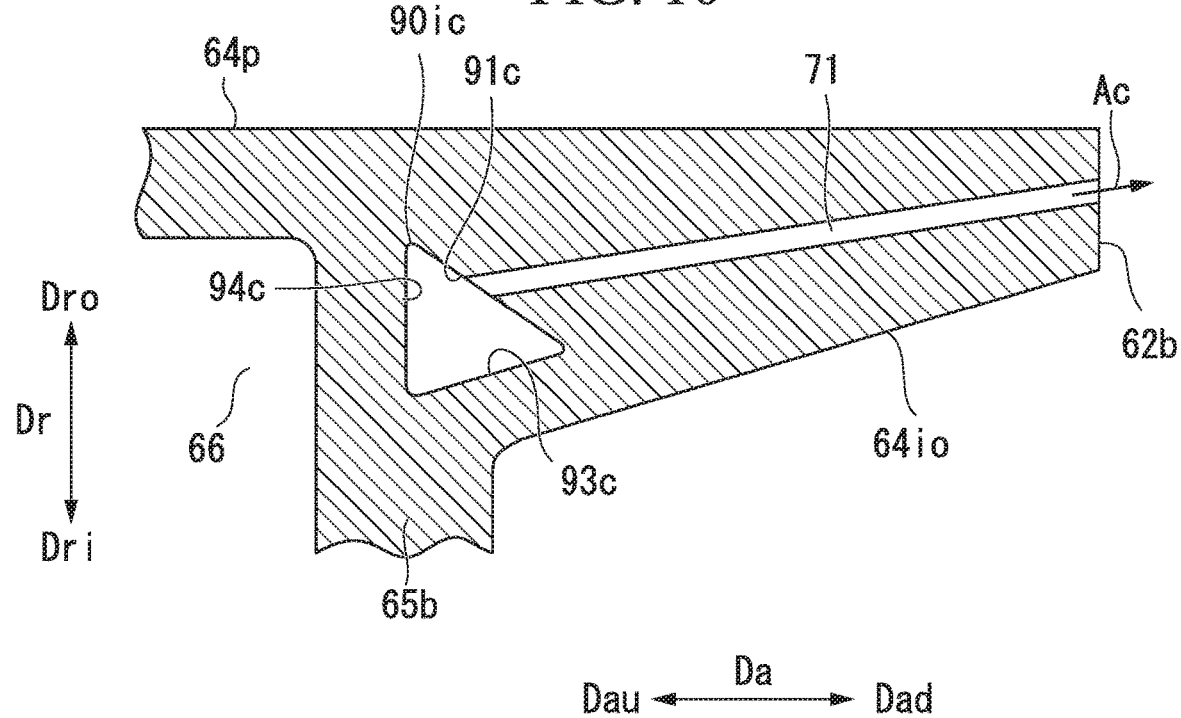
FIG. 10 is a sectional view of a back-side passage of the inner shroud according to the present invention, showing a third modified example of the back-side passage.

A third modified example of the back-side passage will be described with reference to FIG. 10.

The cross-section of a back-side passage 90ic of this modified example has a substantially regular triangular shape.

Thus, the back-side passage 90ic is defined by a plurality of passage forming surfaces including a first forming surface 91c, a third forming surface 93c, and a fourth forming surface 94c. Of the plurality of edges forming the passage cross-section of the back-side passage 90ic, the edge included in the first forming surface 91c, the edge included in the third forming surface 93c, and the edge included in the fourth forming surface 94c are all substantially straight lines. The first forming surface 91c, the third forming surface 93c, and the fourth forming surface 94c are all curved surfaces that extend in the circumferential direction Dc and curve gradually as they extend in the circumferential direction Dc. Like the first forming surface 91 of the above embodiment, the first forming surface 91c of this modified example faces the radially inner side Dri and extends gradually farther away from the gas path surface 64p while extending toward the axially downstream side Dad. The fourth forming surface 94c faces the axially downstream side Dad and spreads from the end of the first forming surface 91c on the axially upstream side Dau toward the radially inner side Dri. The fourth forming surface 94c is substantially parallel to the surface of the back wall 65b that is the inner surface thereof facing the recess 66. Like the third forming surface 93 of the above embodiment, the third forming surface 93c faces the radially outer side Dro and extends gradually closer to the gas path surface 64p while extending toward the axially downstream side Dad. The third forming surface 93c is substantially parallel to the outer opposite-gas-path surface 64io. The end of the third forming surface 93c on the axially upstream side Dau joins the end of the fourth forming surface 94c on the radially inner side Dri. The end of the third forming surface 93c on the axially downstream side Dad joins the end of the first forming surface 91c on the axially downstream side Dad. Thus, in this modified example, the first forming surface 91c and the fourth forming surface 94c directly join each other, which is different from the above embodiment in which there is the second forming surface 92 between the first forming surface 91 and the fourth forming surface 94.

Also in this modified example, the back end surface blow-out passages 71 open in the first forming surface 91c that faces the radially inner side Dri (opposite-flow-path side) and extends gradually farther away from the gas path surface 64p while extending toward the axially downstream side Dad. Thus, also in this modified example, it is possible to effectively cool the part of the gas path surface 64p on the axially downstream side Dad without increasing the flow rate of the cooling air Ac. Therefore, the cross-section of the back-side passage need not have a quadrangular shape as in the above examples, and the same effects as those of the above embodiment can be achieved even when the back-side passage has a triangular cross-sectional shape.

In this modified example, the corner formed by the first forming surface 91c and the fourth forming surface 94c, the corner formed by the fourth forming surface 94c and the third forming surface 93c, and the corner formed by the third forming surface 93c and the first forming surface 91c each have an acute angle. When the corners formed by the adjacent forming surfaces thus each have an acute angle, an uneven flow of the cooling air Ac occurs near the corners, which results in a flow velocity distribution of the cooling air Ac within the passage cross-section of the back-side passage 90ic. Specifically, the flow velocity of the cooling air Ac is higher near the opening of the back end surface blow-out passage 71 in the passage cross-section of the back-side passage 90ic, and thus a flow velocity distribution of the cooling air Ac occurs along the first forming surface 91 within the passage cross-section of the back-side passage 90ic. For this reason, the flow rate of the cooling air Ac flowing from the back-side passage 90ic into the back end surface blow-out passages 71 is restricted compared with that in the above embodiment. It is therefore preferable that the number of corners having an acute angle be as small as possible when there is a plurality of corners formed by the adjacent forming surfaces.

Figure 11:
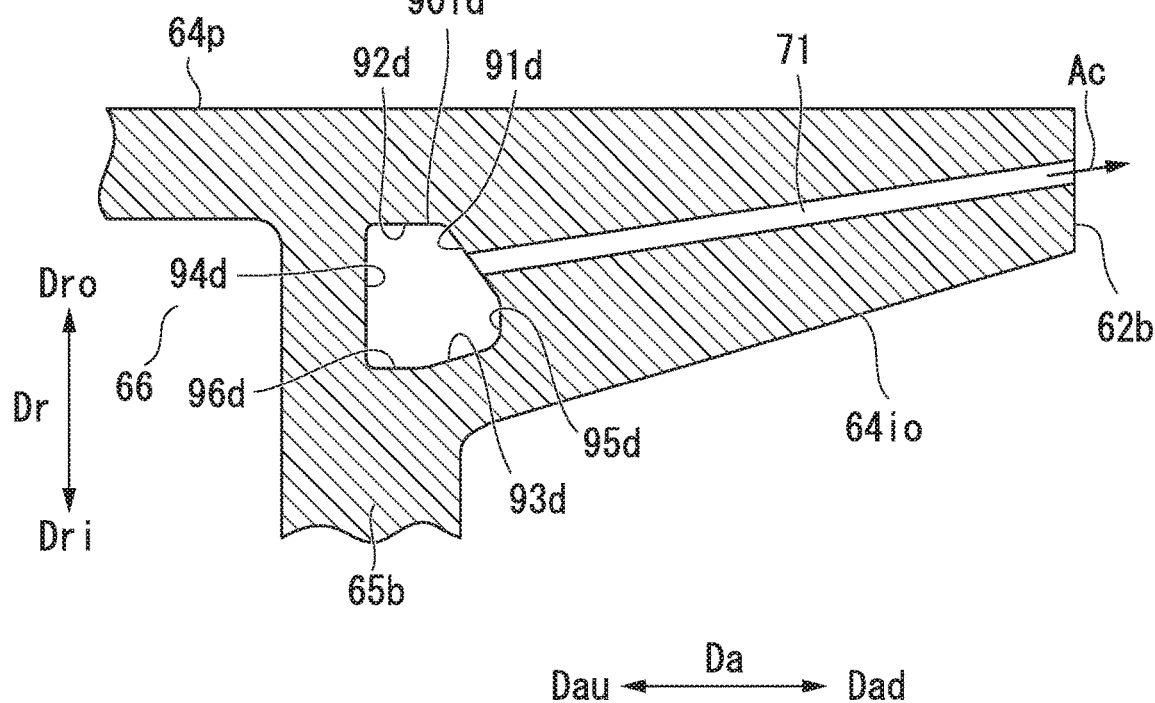
FIG. 11 is a sectional view of a back-side passage of the inner shroud according to the present invention, showing a fourth modified example of the back-side passage.

A fourth modified example of the back-side passage will be described with reference to FIG. 11.

The cross-section of a back-side passage 90id of this modified example has an irregular hexagonal shape. The back-side passage 90id is defined by a plurality of passage forming surfaces including a first forming surface 91d, a second forming surface 92d, a third forming surface 93d, a fourth forming surface 94d, a fifth forming surface 95d, and a sixth forming surface 96d. Of the plurality of edges forming the passage cross-section of the back-side passage 90id, the edge included in the first forming surface 91c, the edge included in the second forming surface 92d, the edge included in the third forming surface 93d, the edge included in the fourth forming surface 94c, the edge included in the fifth forming surface 95d, and the edge included in the sixth forming surface 96d are all substantially straight lines. The first forming surface 91d, the second forming surface 92d, the third forming surface 93d, the fourth forming surface 94d, the fifth forming surface 95d, and the sixth forming surface 96d are all curved surfaces that extend in the circumferential direction Dc and curve gradually as they extend in the circumferential direction Dc. Like the first forming surface 91 of the above embodiment, the first forming surface 91d of this modified example faces the radially inner side Dri and extends gradually farther away from the gas path surface 64p while extending toward the axially downstream side Dad. The second forming surface 92d faces the radially inner side Dri and spreads from the end of the first forming surface 91d on the axially upstream side Dau toward the axially upstream side Dau. The second forming surface 92d is substantially parallel to the gas path surface 64p. The fourth forming surface 94d faces the axially downstream side Dad and spreads from the end of the second forming surface 92d on the axially upstream side Dau toward the radially inner side Dri. The fourth forming surface 94d is substantially parallel to the surface of the back wall 65b that is the inner surface thereof facing the recess 66. The sixth forming surface 96d faces the radially outer side Dro and is substantially parallel to the gas path surface 64p and the second forming surface 92d. The end of the sixth forming surface 96d on the axially upstream side Dau joins the end of the fourth forming surface 94d on the radially inner side Dri. The third forming surface 93d faces the radially outer side Dro and extends gradually closer to the gas path surface 64p while extending toward the axially downstream side Dad. The end of the third forming surface 93d on the axially upstream side Dau joins the end of the sixth forming surface 96d on the axially downstream side Dad. The fifth forming surface 95d faces the axially upstream side Dau and spreads from the end of the third forming surface 93d on the axially downstream side Dad toward the radially outer side Dro. The fifth forming surface 95d is substantially parallel to the fourth forming surface 94d. The end of the fifth forming surface 95d on the radially outer side Dro joins the end of the first forming surface 91*d* on the axially downstream side Dad.

Also in this modified example, the back end surface blow-out passages 71 open in the first forming surface 91*d* that faces the radially inner side Dri (opposite-flow-path side) and extends gradually farther away from the gas path surface 64*p* while extending toward the axially downstream side Dad. Thus, also in this modified example, it is possible to effectively cool the part of the gas path surface 64*p* on the axially downstream side Dad without increasing the flow rate of the cooling air Ac. Therefore, the cross-section of the back-side passage need not have a quadrangular shape as in the above examples, and the same effects as those of the above embodiment can be achieved even when the back-side passage has a polygonal shape with a larger number of edges than a quadrangle.

As in the above embodiment and the first modified example, so in this modified example, the fourth forming surface 94*d* is substantially parallel to the surface of the back wall 65*b* that is the inner surface thereof facing the recess 66, and the third forming surface 93*d* is substantially parallel to the outer opposite-gas-path surface 64*io*. Thus, also in this modified example, it is possible to secure a large passage cross-sectional area of the back-side passage 90*id* while keeping the passage forming surfaces of the back-side passage 90*id* at the allowable distance D or farther away from the surfaces present on the outer side of the back-side passage 90*id*. Moreover, in this modified example, the corners formed by the adjacent forming surfaces each have an obtuse angle. Accordingly, in this modified example, the problem of an uneven flow of the cooling air Ac attributable to the corners formed by the adjacent forming surfaces having acute angles does not arise. In other words, in this modified example, it is possible to avoid a decrease in the flow rate of the cooling air Ac flowing from the back-side passage 90*id* into the back end surface blow-out passages 71 in the process of the cooling air Ac flowing through the back-side passage 90*id*.

Figure 12:
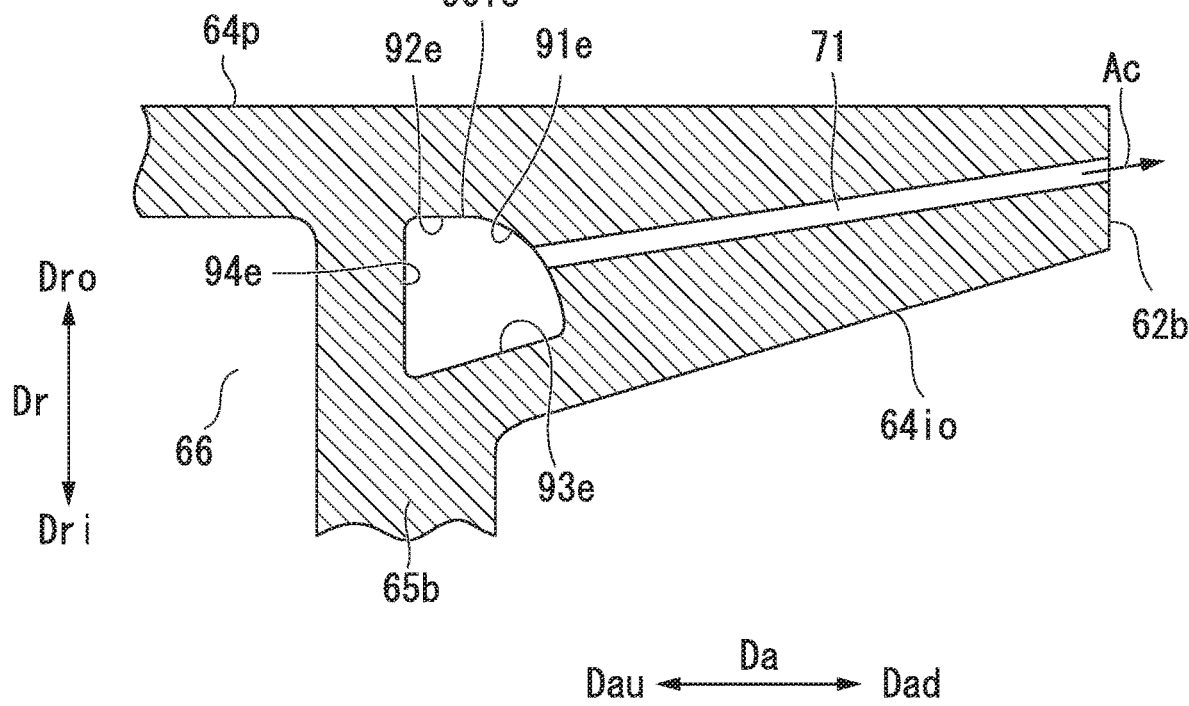
FIG. 12 is a sectional view of a back-side passage of the inner shroud according to the present invention, showing a fifth modified example of the back-side passage.

A fifth modified example of the back-side passage will be described with reference to FIG. 12.

As in the above embodiment, a back-side passage 90*ie* in this modified example is defined by a plurality of passage forming surfaces including a first forming surface 91*e*, a second forming surface 92*e*, a third forming surface 93*e*, and a fourth forming surface 94*e*. Of the plurality of edges forming the passage cross-section of the back-side passage 90*ie*, the edge included in the second forming surface 92*e*, the edge included in the third forming surface 93*e*, and the edge included in the fourth forming surface 94*e* are all substantially straight lines. The second forming surface 92*e*, the third forming surface 93*e*, and the fourth forming surface 94*e* are all curved surfaces that extend in the circumferential direction Dc and curve gradually as they extend in the circumferential direction Dc. Like the first forming surface 91 of the above embodiment, the first forming surface 91*e* of this modified example faces the radially inner side Dri and extends gradually farther away from the gas path surface 64*p* while extending toward the axially downstream side Dad. However, of the edges forming the passage cross-section of the back-side passage 90*ie*, the edge included in the first forming surface 91*e* is a smoothly curved line that protrudes from the inner side of the back-side passage 90*ie* toward the outer side. Like the other forming surfaces 92*e*, 93*e*, 94*e*, the first forming surface 91*e* is a curved surface that extends in the circumferential direction Dc and curves gradually as it extends in the circumferential direction Dc.

Also in this modified example, the second forming surface 92*e* is substantially parallel to the gas path surface 64*p*.

Also in this modified example, the back end surface blow-out passages 71 open in the first forming surface 91*e* that faces the radially inner side Dri (opposite-flow-path side) and extends gradually farther away from the gas path surface 64*p* while extending toward the axially downstream side Dad. Thus, also in this modified example, it is possible to effectively cool the part of the gas path surface 64*p* on the axially downstream side Dad without increasing the flow rate of the cooling air Ac. Therefore, the same effects as those of the above embodiment can be achieved, even when the first forming surface 91*e*, among the passage forming surfaces forming the back-side passage 90*ie*, in which the back end surface blow-out passages 71 open is a cured surface.

Figure 13:
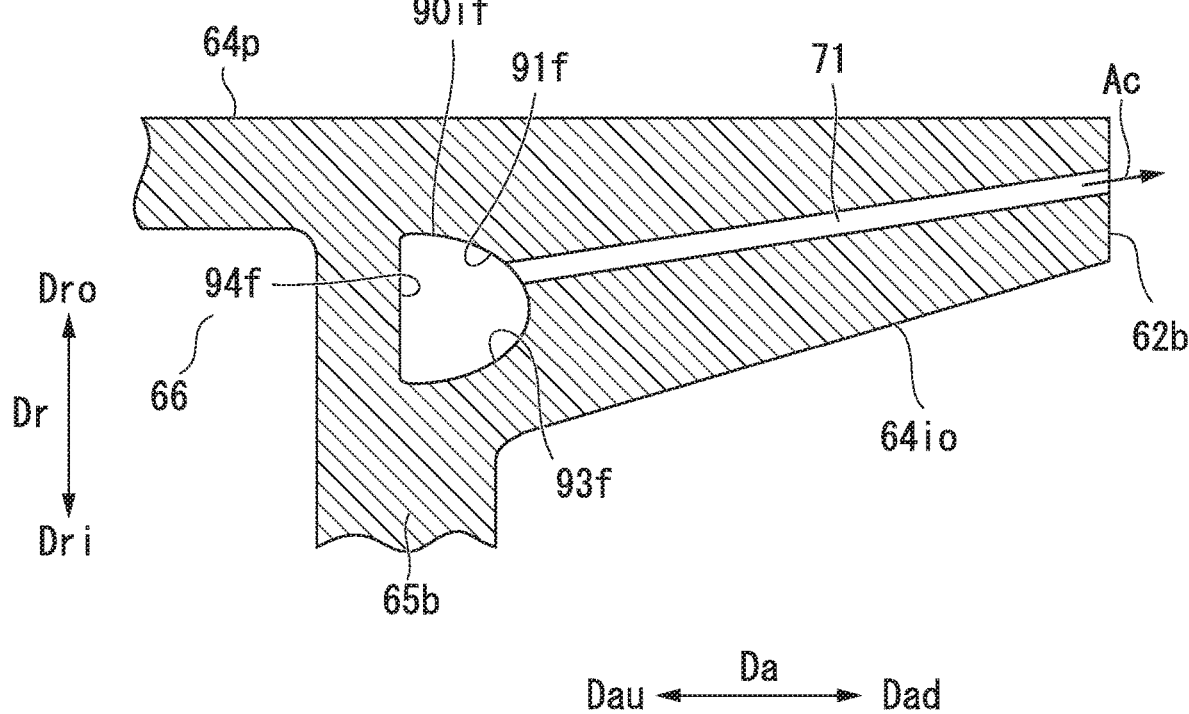
FIG. 13 is a sectional view of a back-side passage of the inner shroud according to the present invention, showing a sixth modified example of the back-side passage.

A sixth modified example of the back-side passage will be described with reference to FIG. 13.

A back-side passage 90*if* of this modified example is defined by a plurality of passage forming surfaces including a first forming surface 91*f*, a fourth forming surface 94*f*, and a third forming surface 93*f*. Like the first forming surface 91*e* of the fifth modified example, the first forming surface 91*f* of this modified example faces the radially inner side Dri and extends gradually farther away from the gas path surface 64*p* while extending toward the axially downstream side Dad. However, the first forming surface 91*f* is a smoothly curved surface that protrudes from the inner side of the back-side passage 90*if* toward the outer side. The fourth forming surface 94*f* faces the axially downstream side Dad and spreads from the end of the first forming surface 91*f* on the axially downstream side Dad toward the radially inner side Dri. The fourth forming surface 94*f* is a flat surface that is substantially parallel to the surface of the back wall 65*b* that is the inner surface thereof facing the recess 66. Like the third forming surface 93 of the above embodiment, the third forming surface 93*f* faces the radially outer side Dro and extends gradually closer to the gas path surface 64*p* while extending toward the axially downstream side Dad. However, the third forming surface 93*f* is a smoothly curved surface that protrudes from the inner side of the back-side passage 90*if* toward the outer side. The first forming surface 91*f* and the third forming surface 93*f* are smoothly continuous with each other. Thus, the first forming surface 91*f* and the third forming surface 93*f* constitute one forming surface. Accordingly, in this modified example, of the edges forming the passage cross-section of the back-side passage 90*if*, both the edges included in the forming surfaces 91*f*, 93*f* other than the fourth forming surface 94*f* are curved lines.

Also in this modified example, the back end surface blow-out passages 71 open in the first forming surface 91*f* that faces the radially inner side Dri (opposite-flow-path side) and extends gradually farther away from the gas path surface 64*p* while extending toward the axially downstream side Dad. Thus, also in this modified example, it is possible to effectively cool the part of the gas path surface 64*p* on the axially downstream side Dad without increasing the flow rate of the cooling air Ac. Therefore, the same effects as those of the above embodiment can be achieved, even when the edge included in one forming surface among the edges forming the passage cross-section of the back-side passage 90*if* is a straight line and all the edges included in the other forming surfaces are curved lines.

Figure 14A:
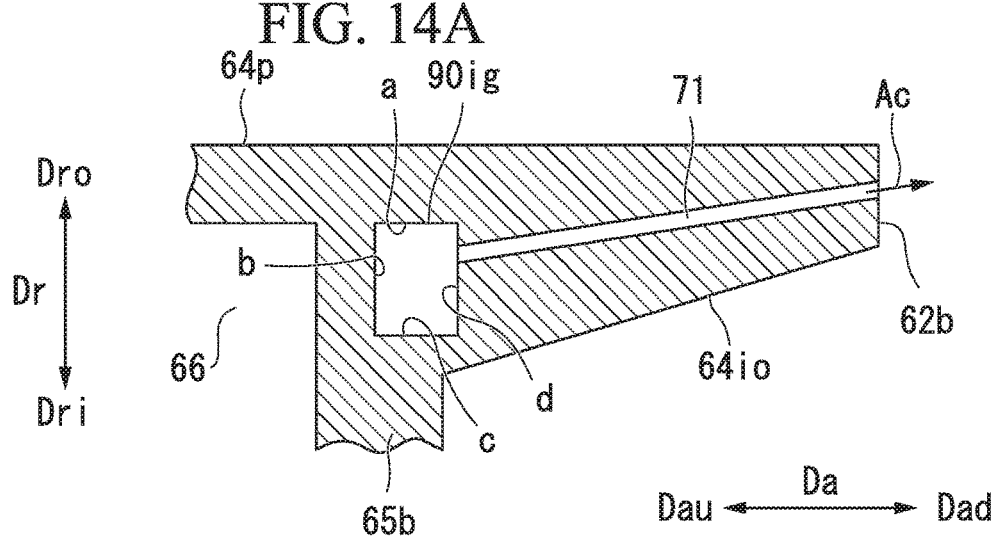
FIG. 14(A) is a sectional view of a back-side passage of an inner shroud in a first comparative example.
Figure 14B:
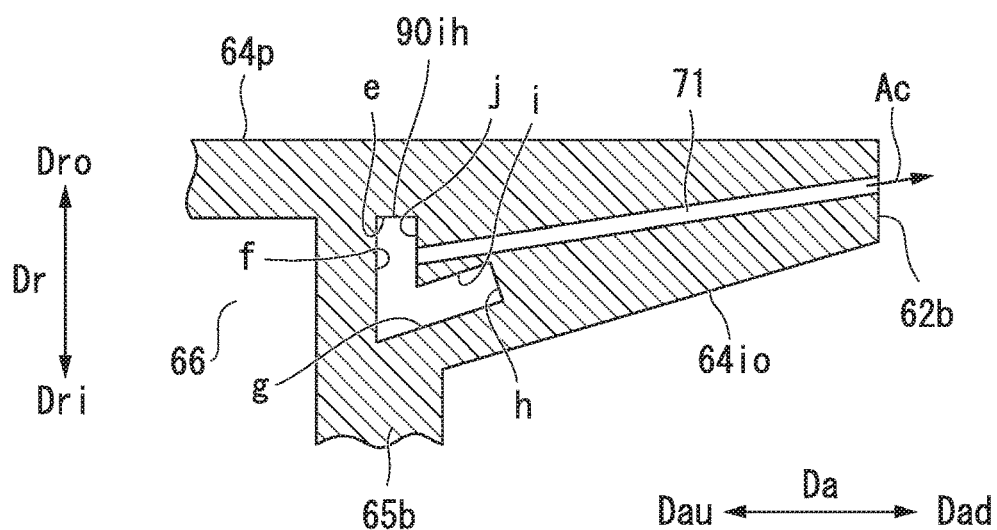
FIG. 14(B) is a sectional view of a back-side passage of an inner shroud in a second comparative example.
Figure 14C:
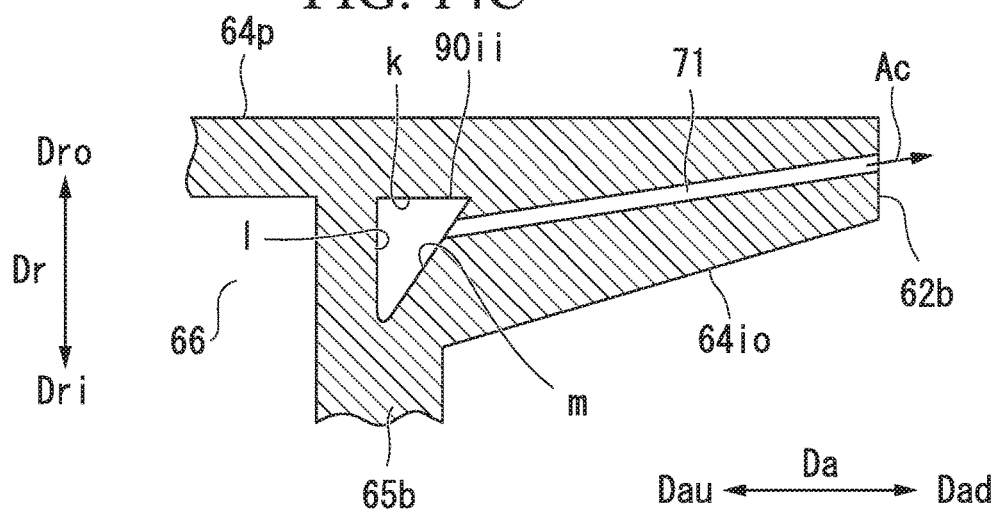
FIG. 14(C) is a sectional view of a back-side passage of an inner shroud in a third comparative example.

Next, comparative examples of the back-side passage will be described with reference to FIG. 14(A) to FIG. 14(C).

First, a back-side passage of a first comparative example will be described with reference to FIG. 14(A).

The cross-section of a back-side passage 90*ig* of the first comparative example has a substantially square shape or a rectangular shape. Thus, the back-side passage 90*ig* is defined by four passage forming surfaces that are a forming surface a, a forming surface b, a forming surface c, and a forming surface d. Of the plurality of edges forming the passage cross-section of the back-side passage 90*ig*, the edge included in the forming surface a, the edge included in the forming surface b, the edge included in the forming surface c, and the edge included in the forming surface d are all substantially straight lines. The forming surface a, the forming surface b, the forming surface c, and the forming surface d are all curved surfaces that extend in the circumferential direction Dc and curve gradually as they extend in the circumferential direction Dc. The forming surface a faces the radially inner side Dri and is substantially parallel to the gas path surface 64*p*. The forming surface b spreads from the end of the forming surface a on the axially upstream side Dau toward the radially inner side Dri. The forming surface b is substantially perpendicular to the forming surface a and substantially parallel to the surface of the back wall 65*b* that is the inner surface thereof facing the recess 66. The forming surface c faces the radially outer side Dro and spreads from the end of the forming surface b on the radially inner side Dri toward the axially downstream side Dad. The forming surface c is substantially perpendicular to the forming surface b and substantially parallel to the gas path surface 64*p* and the forming surface a. The forming surface d spreads from the end of the forming surface c on the axially downstream side Dad toward the radially outer side Dro. The end of the forming surface d on the radially outer side Dro joins the end of the forming surface a on the axially downstream side Dad. The forming surface d is substantially perpendicular to the forming surface a and the forming surface c and substantially parallel to the forming surface b.

The passage forming surfaces defining the back-side passage 90*ig* of the first comparative example do not include a forming surface that faces the radially inner side Dri and extends gradually farther away from the gas path surface 64*p* while extending toward the axially downstream side Dad. In the first comparative example, the back end surface blow-out passages 71 open in the forming surface d. Accordingly, in the first comparative example, the ends of the back end surface blow-out passages 71 on the axially upstream side Dau open at a part located farthest on the axially downstream side Dad in the passage forming surface forming the back-side passage 90*ig*. As a result, in the first comparative example, the passage length of the back end surface blow-out passages 71 having a high cooling effect is shorter than that in the above embodiment and modified examples. Moreover, in the first comparative example, there is no part where the back-side passage 90*ig* and the back end surface blow-out passages 71 overlap each other as seen from the radial direction Dr. In the first comparative example, therefore, the part of the gas path surface 64*p* on the axially downstream side Dad cannot be cooled as effectively as in the above embodiment and modified examples.

Next, a back-side passage of a second comparative example will be described with reference to FIG. 14(B).

The cross-section of a back-side passage 90*ih* of the second comparative example has a shape of two rectangles intersecting each other. Thus, the back-side passage 90*ih* is defined by six passage forming surfaces that are a forming surface e, a forming surface f, a forming surface g, a forming surface h, a forming surface i, and a forming surface j. Of the plurality of edges forming the passage cross-section of the back-side passage 90*ih*, the edge included in the forming surface e, the edge included in the forming surface f, the edge included in the forming surface g, the edge included in the forming surface h, the edge included in the forming surface i, and the edge included in the forming surface j are all substantially straight lines. The forming surface e, the forming surface f, the forming surface g, the forming surface h, the forming surface i, and the forming surface j are all curved surfaces that extend in the circumferential direction Dc and curve gradually as they extend in the circumferential direction Dc. The forming surface e faces the radially inner side Dri and is substantially parallel to the gas path surface 64*p*. The forming surface f spreads from the end of the forming surface e on the axially upstream side Dau toward the radially inner side Dri. The forming surface f is substantially perpendicular to the forming surface e and substantially parallel to the surface of the back wall 65*b* that is the inner surface thereof facing the recess 66. The forming surface g faces the radially outer side Dro and extends gradually closer to the gas path surface 64*p* while extending toward the axially downstream side Dad. The end of the forming surface g on the axially upstream side Dau joins the end of the forming surface f on the radially inner side Dri. The forming surface h spreads from the end of the forming surface g on the axially downstream side Dad toward the radially outer side Dro. The forming surface h is substantially perpendicular to the forming surface g. The forming surface i faces the radially inner side Dri and extends gradually closer to the gas path surface 64*p* while extending toward the axially downstream side Dad. The forming surface i is substantially parallel to the forming surface g. The end of the forming surface i on the axially downstream side Dad joins the end of the forming surface h on the radially outer side Dro. The forming surface j spreads from the end of the forming surface i on the axially upstream side Dau toward the radially outer side Dro and is substantially parallel to the forming surface f. The end of the forming surface j on the radially outer side Dro joins the end of the forming surface e on the axially downstream side Dad.

In the second comparative example, the back end surface blow-out passages 71 open in the forming surface j that is located farther on the axially upstream side Dau than a part located farthest on the axially downstream side Dad in the back-side passage 90*ih*. Thus, in the second comparative example, a long passage length of the back end surface blow-out passages 71 having a high cooling effect can be secured as in the above embodiment and modified examples. Moreover, in the second comparative example, there is a part where the back-side passage 90*ih* and the back end surface blow-out passages 71 overlap each other as seen from the radial direction Dr. In the second comparative example, however, there is no forming surface that faces the radially inner side Dri and extends gradually farther away from the gas path surface 64*p* while extending toward the axially downstream side Dad. Moreover, in the second comparative example, unlike the above embodiment, all the internal angles of the corners formed by the adjacent forming surfaces are not equal to or smaller than 180°, but the internal angle of the corner formed between the forming surface i and the forming surface j is larger than 180°. Here, the internal angle refers to the angle of the angles formed by the adjacent forming surfaces that is on the inner side of the passage. When the internal angle formed by the adjacent forming surfaces is thus larger than 180°, the vertex of this corner protrudes to the inner side of the passage. As a result, the passage cross-sectional area of the back-side passage 90$ih$ is reduced, so that the pressure loss of the cooling air Ac in the process of flowing through the back-side passage 90$ih$ increases.

Next, the back-side passage of the third comparative example will be described with reference to FIG. 14(C).

The cross-section of the back-side passage 90$ii$ of the third comparative example has a triangular shape. Thus, the back-side passage 90$ii$ is defined by three passage forming surfaces that are a forming surface k, a forming surface 1, and the forming surface m. Of the plurality of edges forming the passage cross-section of the back-side passage 90$ii$, the edge included in the forming surface k, the edge included in the forming surface 1, and the edge included in the forming surface m are all substantially straight lines. The forming surface k, the forming surface 1, and the forming surface m are all curved surfaces that extend in the circumferential direction Dc and curve gradually as they extend in the circumferential direction Dc. The forming surface k faces the radially inner side Dri and is substantially parallel to the gas path surface 64$p$. The forming surface 1 spreads from the end of the forming surface k on the axially upstream side Dau toward the radially inner side Dri. The forming surface 1 is substantially perpendicular to the forming surface k and substantially parallel to the surface of the back wall 65$b$ that is the inner surface thereof facing the recess 66. The forming surface m faces the radially outer side Dro and extends gradually closer to the gas path surface 64$p$ while extending toward the axially downstream side Dad. The end of the forming surface m on the axially upstream side Dau joins the end of the forming surface 1 on the radially inner side Dri. The end of the forming surface m on the axially downstream side Dad joins the end of the forming surface k on the axially downstream side Dad.

In the third comparative example, the back end surface blow-out passages 71 open in the forming surface m that faces the radially outer side Dro and extends gradually closer to the gas path surface 64$p$ while extending toward the axially downstream side Dad. Thus, in the third comparative example, the back end surface blow-out passages 71 open at a part of the back-side passage 90$ii$ located farther on the axially upstream side Dau than a part thereof located farthest on the axially downstream side Dad. Accordingly, in the third comparative example, a long passage length of the back end surface blow-out passages 71 having a high cooling effect can be secured as in the above embodiment and modified examples. Moreover, in the third comparative example, there is a part where the back-side passage 90$ii$ and the back end surface blow-out passages 71 overlap each other as seen from the radial direction Dr. In the third comparative example, however, the back end surface blow-out passages 71 open in the forming surface m facing the radially outer side Dro. Accordingly, in the third comparative example, the parts of the back end surface blow-out passages 71 that overlap the back-side passage 90$ii$ are located on the opposite side from the gas path surface 64$p$ with the back-side passage 90$ii$ as a reference point.

Thus, as described above, in the third comparative example, the gas path surface 64$p$ cannot be effectively cooled along the entire passage length of the back end surface blow-out passages 71 having high cooling efficiency.

Figure 15:
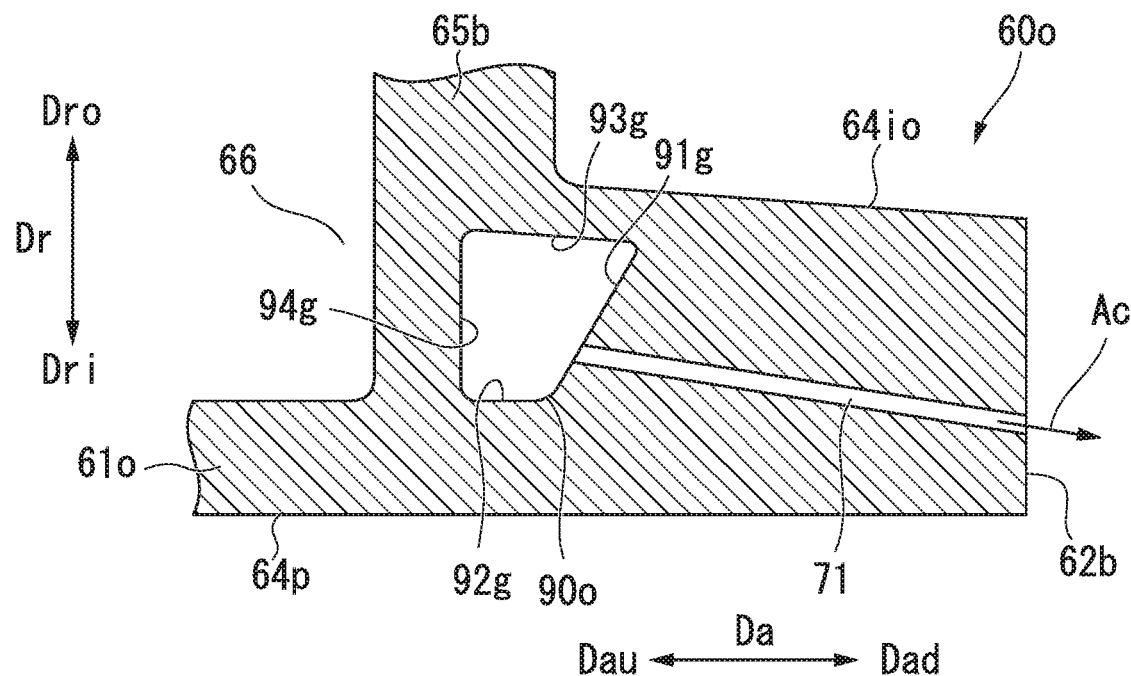
FIG. 15 is a sectional view taken along line XV-XV in FIG. 6.

The cross-sectional shape of the back-side passage 90$o$ in the outer shroud 60$o$ of the embodiment will be described with reference to FIG. 15.

The cross-section of the back-side passage 90$o$ in the outer shroud 60$o$ of the embodiment has an irregular quadrangular shape. The cross-sectional shape of the back-side passage 90$o$ is substantially the same as the cross-sectional shape of the back-side passage 90$i$ in the inner shroud 60$i$ inverted in the radial direction Dr. The back-side passage 90$o$ is defined by a plurality of passage forming surfaces including a first forming surface 91$g$, a second forming surface 92$g$, a third forming surface 93$g$, and a fourth forming surface 94$g$. Of the plurality of edges forming the passage cross-section of the back-side passage 90$o$, the edge included in the first forming surface 91$g$, the edge included in the second forming surface 92$g$, the edge included in the third forming surface 93$g$, and the edge included in the fourth forming surface 94$g$ are all substantially straight lines. The first forming surface 91$g$, the second forming surface 92$g$, the third forming surface 93$g$, and the fourth forming surface 94$g$ are all curved surfaces that extend in the circumferential direction Dc and curve gradually as they extend in the circumferential direction Dc. The first forming surface 91$g$ faces the radially outer side Dro (opposite-flow-path side) and extends gradually farther away from the gas path surface 64$p$ while extending toward the axially downstream side Dad. The second forming surface 92$g$ faces the radially outer side Dro (opposite-flow-path side) and spreads from the end of the first forming surface 91$g$ on the axially upstream side Dau toward the axially upstream side Dau. The second forming surface 92$g$ is substantially parallel to the gas path surface 64$p$. The fourth forming surface 94$g$ spreads from the end of the second forming surface 92$g$ on the axially upstream side Dau toward the radially outer side Dro. The fourth forming surface 94$g$ is substantially parallel to the surface of the back wall 65$b$ that is the inner surface thereof facing the recess 66. The third forming surface 93$g$ faces the radially inner side Dri and is substantially parallel to the outer opposite-gas-path surface 64$io$. The end of the third forming surface 93$g$ on the axially upstream side Dau joins the end of the fourth forming surface 94$g$ on the radially outer side Dro. The end of the third forming surface 93$g$ on the axially downstream side Dad joins the end of the first forming surface 91$g$ on the axially downstream side Dad.

Each back end surface blow-out passages 71 opens in the first forming surface 91$g$. Thus, as in the inner shroud 60$i$, so in the outer shroud 60$o$, it is possible to effectively cool the part of the gas path surface 64$p$ on the axially downstream side Dad without increasing the flow rate of the cooling air Ac.

The cross-section of the back-side passage 90$o$ in the outer shroud 60$o$ need not have an irregular quadrangular shape as in the above example. In the following, various cross-sectional shapes of the back-side passage in the outer shroud 60$o$ will be described using FIG. 16 and FIG. 17.

Figure 16:
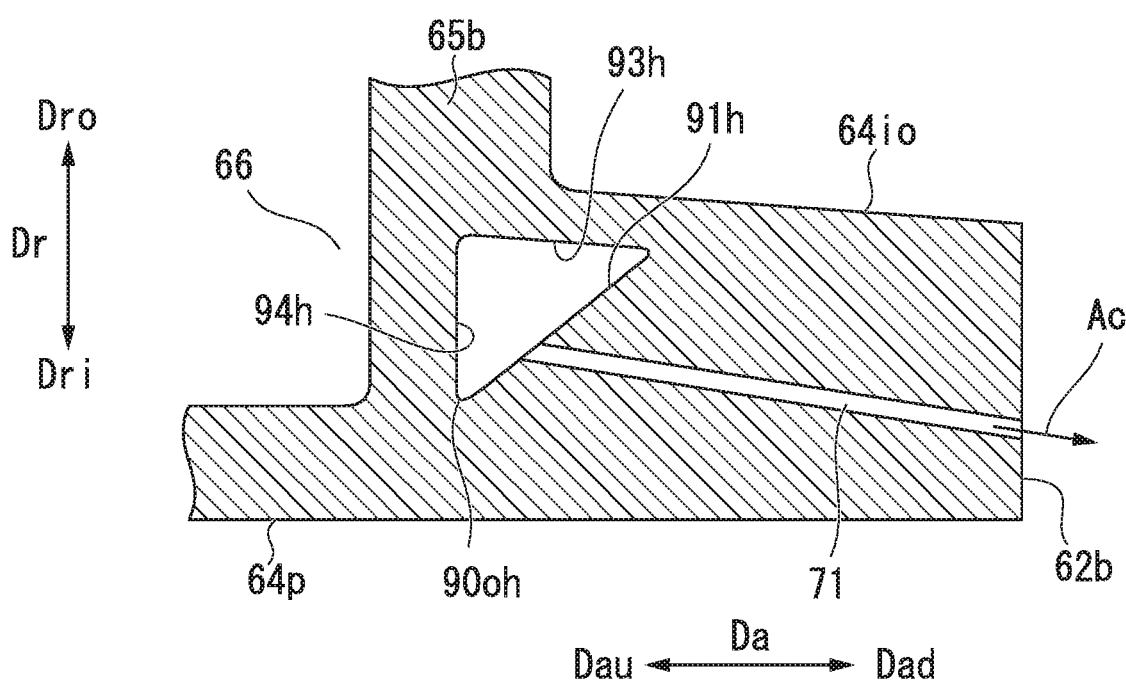
FIG. 16 is a sectional view of a back-side passage of an outer shroud according to the present invention, showing a first modified example of the back-side passage.

First, a first modified example of the back-side passage in the outer shroud 60$o$ will be described with reference to FIG. 16.

The cross-section of a back-side passage 90$oh$ of this modified example has a triangular shape. Thus, the back-side passage 90$oh$ is defined by a plurality of passage forming surfaces including a first forming surface 91$h$, a third forming surface 93$h$, and a fourth forming surface 94$h$. Of the plurality of edges forming the passage cross-section of the back-side passage 90$oh$, the edge included in the first forming surface 91$h$, the edge included in the third forming surface 93$h$, and the edge included in the fourth forming surface 94$h$ are all substantially straight lines. The first forming surface 91$h$, the third forming surface 93$h$, and the fourth forming surface 94$h$ are all curved surfaces that extend in the circumferential direction Dc and curve gradually as they extend in the circumferential direction Dc. The first forming surface 91$h$ of this modified example faces the radially outer side Dro (opposite-flow-path side) and extends gradually farther away from the gas path surface 64p while extending toward the axially downstream side Dad. The fourth forming surface 94h spreads form the end of the first forming surface 91h on the axially upstream side Dau toward the radially outer side Dro. The fourth forming surface 94h is substantially parallel to the surface of the back wall 65b that is the inner surface thereof facing the recess 66. The third forming surface 93h faces the radially inner side Dri and is substantially parallel to the opposite-gas-path surface 64i. The end of the third forming surface 93h on the axially upstream side Dau joins the end of the fourth forming surface 94h on the radially outer side Dro. The end of the third forming surface 93h on the axially downstream side Dad joins the end of the first forming surface 91h on the axially downstream side Dad.

Also in this modified example, the back end surface blow-out passages 71 open in the first forming surface 91h that faces the radially outer side Dro (opposite-flow-path side) and extends gradually farther away from the gas path surface 64p while extending toward the axially downstream side Dad. Thus, also in this modified example, it is possible to effectively cool the part of the gas path surface 64p on the axially downstream side Dad without increasing the flow rate of the cooling air Ac. Therefore, the cross-section of the back-side passage 90oh need not have a quadrangular shape as in the above example, and the same effects as those of the above embodiment can be achieved even when the back-side passage has a triangular cross-sectional shape. Moreover, the same effects as those of the above embodiment can be achieved, even when the back-side passage has a polygonal cross-sectional shape with a larger number of edges than a quadrangle like the back-side passage 90id in the inner shroud 60i shown in FIG. 11.

Figure 17:
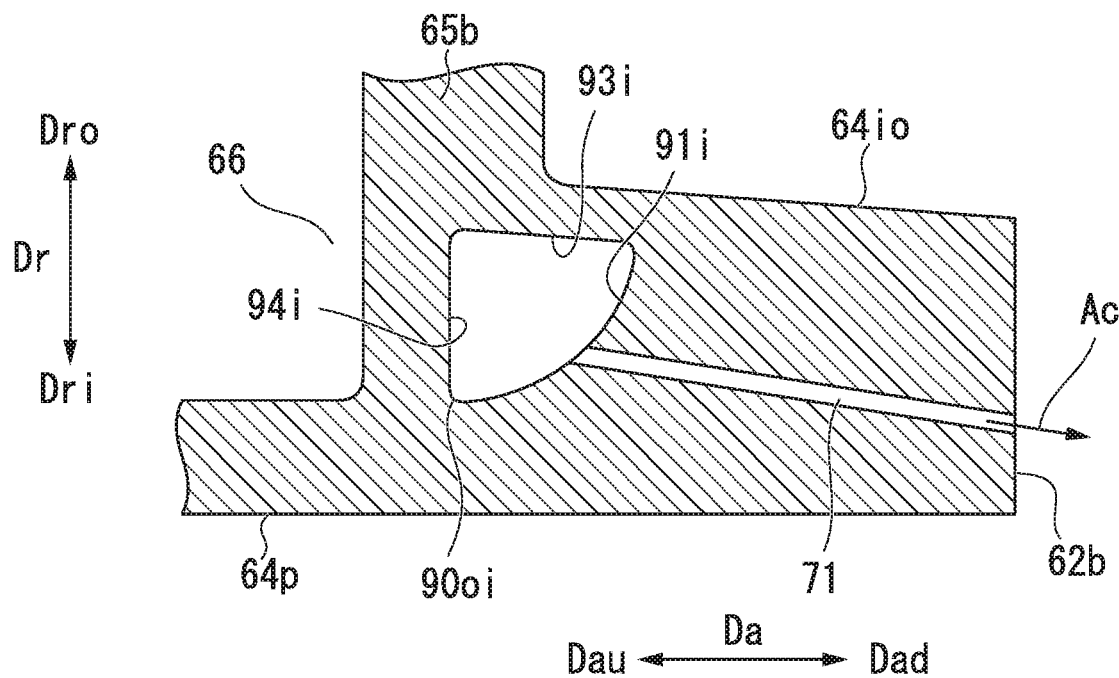
FIG. 17 is a sectional view of a back-side passage of the outer shroud according to the present invention, showing a second modified example of the back-side passage.

Next, a second modified example of the back-side passage in the outer shroud 60o will be described with reference to FIG. 17.

Like the back-side passage 90oh of the first modified example, a back-side passage 90oi of this modified example is also defined by a plurality of passage forming surfaces including a first forming surface 91i, a third forming surface 93i, and a fourth forming surface 94i. Of the plurality of edges forming the passage cross-section of the back-side passage 90oi, the edge included in the third forming surface 93i and the edge included in the fourth forming surface 94i are both substantially straight lines. The third forming surface 93i and the fourth forming surface 94i are both curved surfaces that extend in the circumferential direction Dc and curve gradually as they extend in the circumferential direction Dc. As in the first modified example, the first forming surface 91i of this modified example faces the radially outer side Dro (opposite-flow-path side) and extends gradually farther away from the gas path surface 64p while extending toward the axially downstream side Dad. However, of the edges forming the passage cross-section of the back-side passage 90oi, the edge included in the first forming surface 91i is a smoothly curved line that protrudes from the inner side of the back-side passage 90oi toward the outer side.

Also in this modified example, the back end surface blow-out passages 71 open in the first forming surface 91i that faces the radially outer side Dro (opposite-flow-path side) and extends gradually farther away from the gas path surface 64p while extending toward the axially downstream side Dad. Thus, also in this modified example, it is possible to effectively cool the part of the gas path surface 64p on the axially downstream side Dad without increasing the flow rate of the cooling air Ac. Therefore, the same effects as those of the above embodiment can be achieved, even when the edge included in the first forming surface 91i among the edges forming the passage cross-section of the back-side passage 90oi is a curved line. Moreover, the same effects as those of the above embodiment can be achieved, even when the edge included in one forming surface among the edges forming the passage cross-section of the back-side passage is a straight line and all the edges included in the other forming surfaces are curved lines as with the back-side passage 90if in the inner shroud 60i shown in FIG. 13.

As has been described above, the same various modified example as those of the back-side passage 90i in the inner shroud 60i are conceivable for the back-side passage 90o in the outer shroud 60o of the embodiment.

Figure 18:
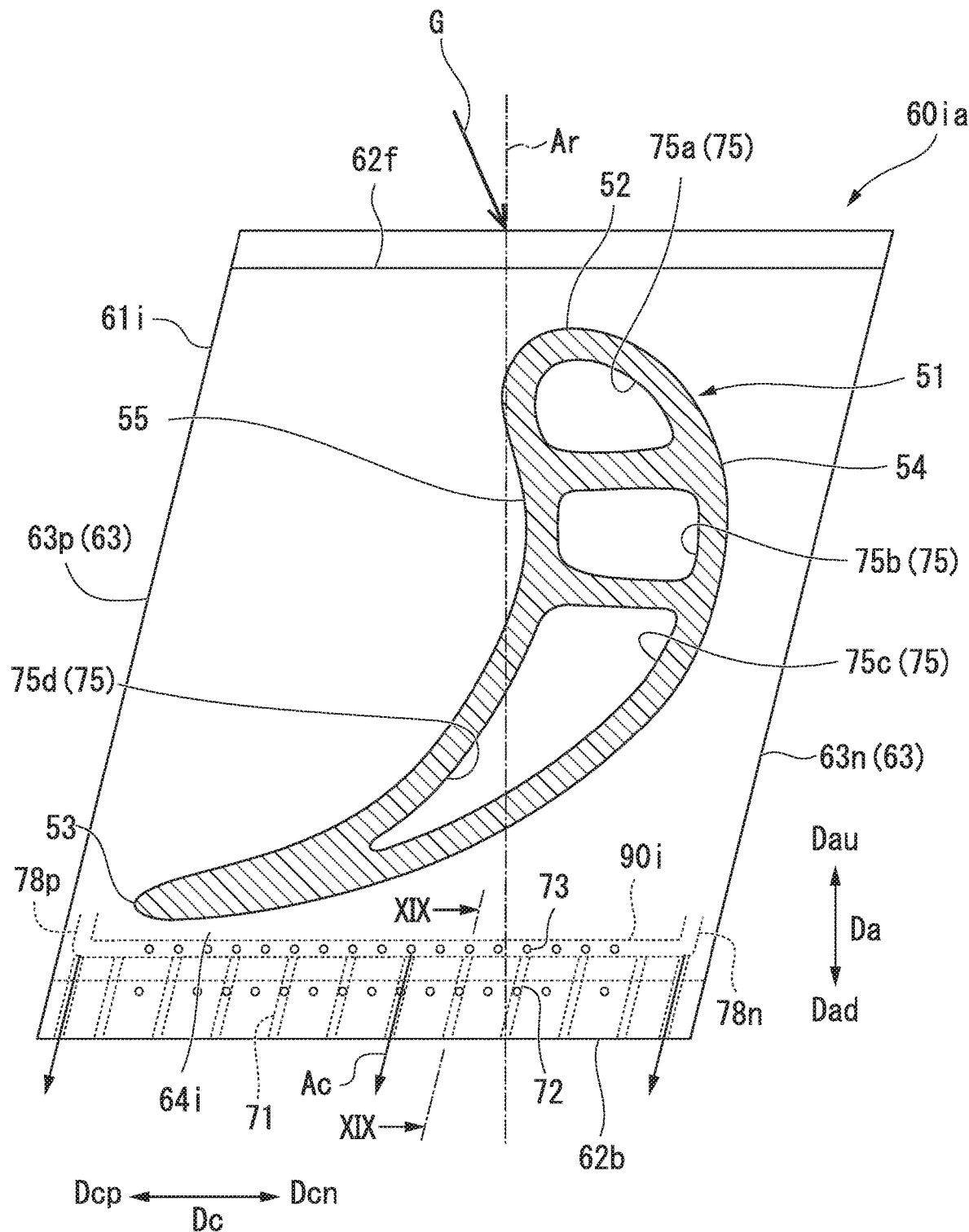
FIG. 18 is a plan view, as seen from a radially outer side, of an inner shroud according to the present invention, showing a first modified example of the inner shroud.
Figure 19:
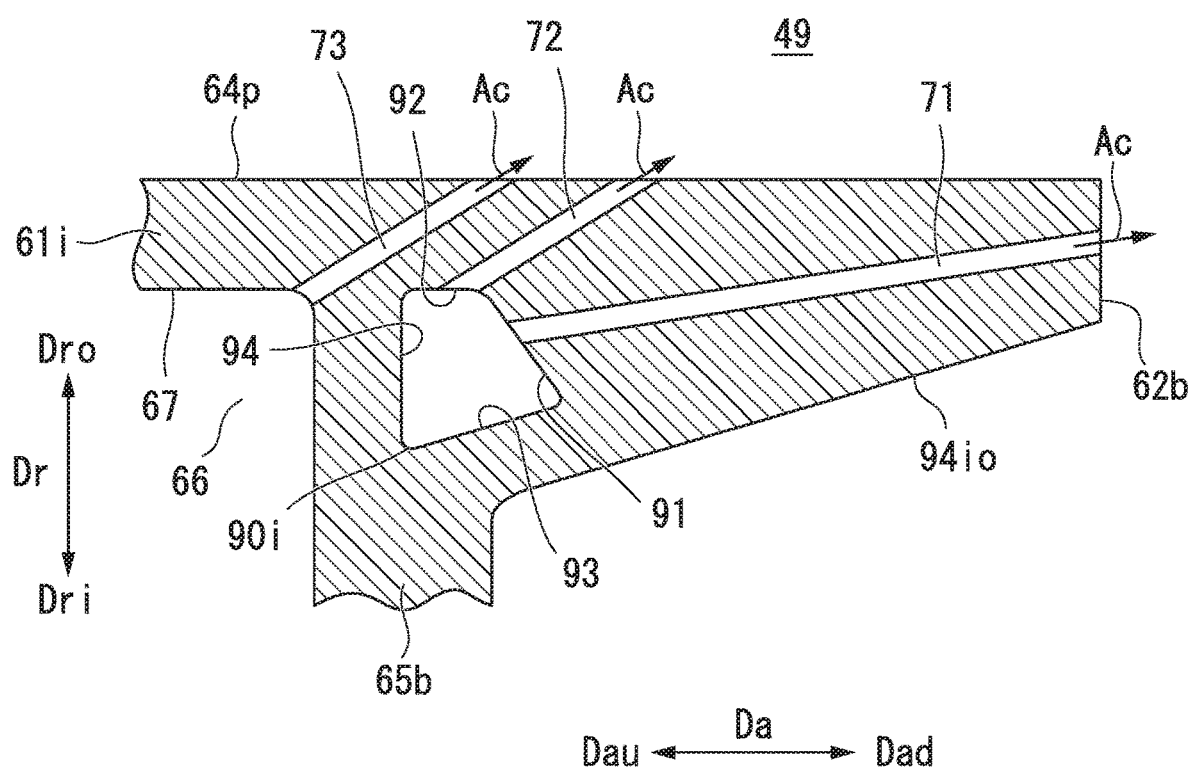
FIG. 19 is a sectional view taken along line XIX-XIX in FIG. 18.

A first modified example of the inner shroud 60i of the above embodiment will be described with reference to FIG. 18 and FIG. 19. FIG. 18 is a plan view of an inner shroud 60ia of this modified example as seen from the radially outer side Dro, and FIG. 19 is a sectional view taken along line XIX-XIX in FIG. 18.

As in the inner shroud 60i of the above embodiment, so in the inner shroud 60ia of this modified example, the back-side passage 90i and the back end surface blow-out passages 71 are formed.

The inner shroud 60ia of this modified example has a plurality of first gas path surface blow-out passages 72 that communicates with the back-side passage 90i and opens in the gas path surface 64p. Each first gas path surface blow-out passage 72 opens in the second forming surface 92 facing the radially inner side Dri (opposite-flow-path side) among the passage forming surfaces forming the back-side passage 90i. Openings of the first gas path surface blow-out passages 72 in the gas path surface 64p are formed in a region farther on the axially downstream side Dad than the trailing edge 53 of the vane body 51 so as to be arrayed in the circumferential direction Dc along the back end surface 62b of the inner shroud body 61i.

The inner shroud 60ia of this modified example further has a plurality of second gas path surface blow-out passages 73 that communicates with the inner cavity 67 and opens in the gas path surface 64p. The second gas path surface blow-out passages 73 open near the corner between the surface of the back wall 65b that is the inner surface thereof facing the recess 66 and the bottom surface of the recess 66. The second gas path surface blow-out passages 73 may open at a part on the bottom surface side in the surface of the back end wall 65b that is the inner surface thereof facing the inner cavity 67 (see FIG. 4) of the recess 66, or at a part on the side of the back wall 65b in the bottom surface of the recess 66. Openings of the second gas path surface blow-out passages 73 in the gas path surface 64p are formed in a region farther on the axially downstream side Dad than the trailing edge 53 of the vane body 51, but farther on the axially upstream side Dau than the openings of the first gas path surface blow-out passages 72 in the gas path surface 64p, so as to be arrayed in the circumferential direction Dc along the back end surface 62b of the inner shroud body 61i.

The openings of the first gas path surface blow-out passages 72 in the gas path surface 64p and the openings of the second gas path surface blow-out passages 73 in the gas path surface 64p are all formed in a middle region of the gas path surface 64p in the circumferential direction Dc, and no openings thereof are formed in a pressure-side region of the gas path surface 64p on the circumferential pressure side Dcp and a suction-side region of the gas path surface 64p on the circumferential suction side Dcn. The first gas path surface blow-out passages 72 and the second gas path surface blow-out passages 73 are all inclined relative to the gas path surface 64p so as to be gradually oriented toward the axially downstream side Dad while extending toward the gas path surface 64p. The significance of the middle region, the pressure-side region, and the suction-side region will be described later.

Part of the cooling air Ac flowing through the back-side passage 90i flows into the first gas path surface blow-out passages 72. The cooling air Ac having flowed into the first gas path surface blow-out passages 72 flows out to the combustion gas flow path 49. In this process, the cooling air Ac flows along the gas path surface 64p and performs film cooling on the gas path surface 64p. Meanwhile, part of the cooling air Ac inside the inner cavity 67 flows into the second gas path surface blow-out passages 73. The cooling air Ac having flowed into the second gas path surface blow-out passages 73 flows out to the combustion gas flow path 49. In this process, the cooling air Ac flows along the gas path surface 64p and performs film cooling on the gas path surface 64p.

The cooling air Ac from the pressure-side passage 78p flows into the back-side passage 90i from the end of the back-side passage 90i on the circumferential pressure side Dcp. The cooling air Ac sequentially flows into the back end surface blow-out passages 71 in the process of flowing through the back-side passage 90i toward the circumferential suction side Dcn. Meanwhile, the cooling air Ac from the suction-side passage 78n flows into the back-side passage 90i from the end of the back-side passage 90i on the circumferential suction side Dcn. The cooling air Ac sequentially flows into the back end surface blow-out passages 71 in the process of flowing through the back-side passage 90i toward the circumferential pressure side Dcp. Accordingly, the flow rate of the cooling air Ac flowing through the middle region of the back-side passage 90i in the circumferential direction Dc is lower than the flow rate of the cooling air Ac flowing through both ends of the back-side passage 90i in the circumferential direction Dc. When the flow rate of the cooling air Ac flowing through the middle region of the back-side passage 90i in the circumferential direction Dc thus becomes low, the flow velocity of the cooling air Ac flowing through the middle region of the back-side passage 90i in the circumferential direction becomes lower than the flow velocity of the cooling air Ac flowing through both ends of the back-side passage 90i in the circumferential direction Dc. Accordingly, the heat transfer coefficient between the cooling air Ac flowing through the back-side passage 90i and the inner shroud body 61i is lower in the middle region of the back-side passage 90i in the circumferential direction Dc than at both ends of the back-side passage 90i in the circumferential direction Dc. Moreover, the cooling air Ac flowing through the back-side passage 90i is gradually heated in the process of flowing from both ends in the circumferential direction Dc toward the middle region in the circumferential direction Dc. As a result, the effect of convective cooling by the cooling air Ac flowing through the back-side passage 90i is lower in the middle region in the circumferential direction Dc than at both ends in the circumferential direction Dc.

The flow path length of the combustion gas G flowing along the suction-side surface 54 of the vane body 51 is longer than the flow path length of the combustion gas G flowing along the pressure-side surface 55 of the vane body 51. Accordingly, the flow velocity of the combustion gas G flowing along the suction-side surface 54 of the vane body 51 is higher than the flow velocity of the combustion gas G flowing along the pressure-side surface 55 of the vane body 51. Moreover, the combustion gas G having flowed along the suction-side surface 54 of the vane body 51 then flows at high flow velocity also through the middle region in the circumferential direction Dc of a part of the gas path surface 64p located closer to the back end surface 62b. Thus, the middle region in the circumferential direction Dc of the part of the gas path surface 64p located closer to the back end surface 62b has a higher heat transfer coefficient between the combustion gas G and the gas path surface 64p and is heated by the combustion gas G more easily than other parts.

As has been described above, the effect of convective cooling by the cooling air Ac flowing through the back-side passage 90i is lower in the middle region in the circumferential direction Dc of the part of the gas path surface 64p located closer to the back end surface 62b, and moreover this middle region is easily heated by the combustion gas G.

In this modified example, therefore, to enhance the cooling performance of the middle region in the circumferential direction Dc of the part of the gas path surface 64p located closer to the back end surface 62b, the first gas path surface blow-out passages 72 and the second gas path surface blow-out passages 73 are provided that open in the middle region in the circumferential direction Dc of the part of the gas path surface 64p located closer to the back end surface 62b.

While the first gas path surface blow-out passages 72 and the second gas path surface blow out passages 73 are provided in this modified example, only either of these gas path surface blow-out passages may instead be provided.

In this modified example, the openings of the first gas path surface blow-out passages 72 in the gas path surface 64p are arrayed in the circumferential direction Dc in one row. However, these openings may be arrayed in the circumferential direction Dc in a plurality of rows. In this modified example, the openings of the second gas path surface blow-out passages 73 in the gas path surface 64p are also arrayed in the circumferential direction Dc in one row. However, these openings may also be arrayed in the circumferential direction Dc in a plurality of rows.

In this modified example, the openings of the first gas paths surface blow-out passages 72 are formed in the second forming surface 92 of the back-side passage 90i. For those back-side passages of the various modified examples shown in FIG. 8 to FIG. 13 that do not have the second forming surface as the passage forming surface, these openings may be formed in a forming surface facing the radially inner side Dri (opposite-flow-path side), at positions farther on the axially upstream side Dau than the positions at which the back end surface blow-out passages 71 communicate with the back-side passage.

Although this modified example is a modified example of the inner shroud 60i, the outer shroud 60o may also be provided with the first gas path surface blow-out passages 72 and/or the second gas path surface blow-out passages 73 as in this modified example.

Figure 20:
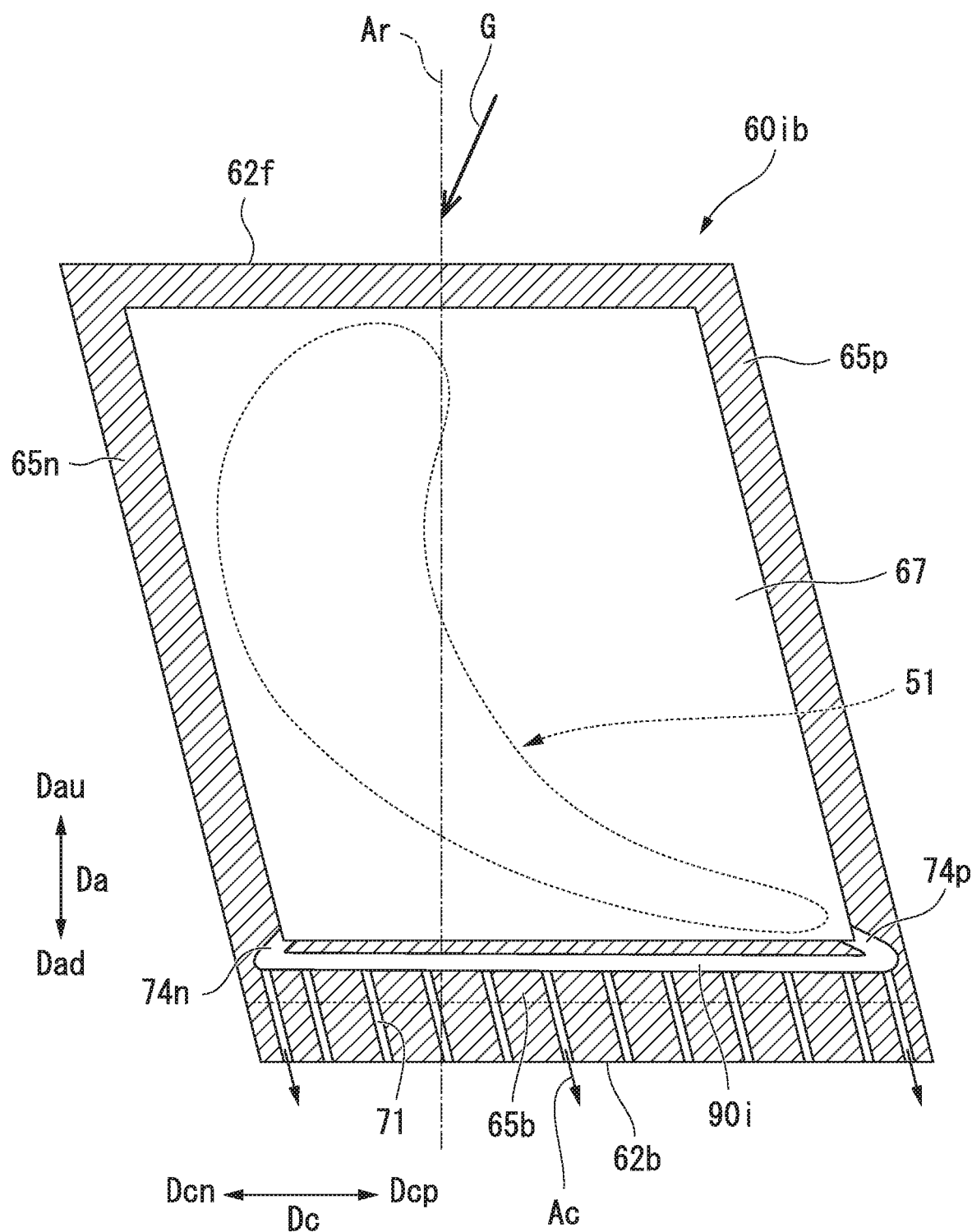
FIG. 20 is a sectional view corresponding to a sectional view taken along line V-V in FIG. 4, showing a second modified example of the inner shroud according to the present invention.

A second modified example of the inner shroud 60i of the above embodiment will be described below with reference to FIG. 20. FIG. 20 is a sectional view corresponding to a sectional view taken along line V-V in FIG. 4 that shows the above embodiment.

As in the inner shroud 60i of the above embodiment, so in an inner shroud 60ib of this modified example, the back-side passage 90i and the back end surface blow-out passages 71 are formed. However, the back-side passage 90i of this modified example communicates with the inner cavity 67 through a pressure-side communication passage 74p and a suction-side communication passage 74n.

The pressure-side communication passage 74p opens to the outer cavity 66a or the inner cavity 67, near the corner between the surface of the back wall 65b facing the recess 66 and the surface of the pressure-side wall 65p facing the recess 66. The pressure-side communication passage 74p joins the end of the back-side passage 90i on the circumferential pressure side Dcp. The suction-side communication passage 74n opens to the outer cavity 66a or the inner cavity 67, near the corner between the surface of the back wall 65b facing the recess 66 and the surface of the suction-side wall 65n facing the recess 66. The suction-side communication passage 74n joins the end of the back-side passage 90i on the circumferential suction side Dcn.

Even when the passage through which the cooling air Ac is supplied to the back-side passage 90i is different from that of the above embodiment as in this modified example, it is possible to effectively cool the part of the gas path surface 64p on the axially downstream side Dad without increasing the flow rate of the cooling air Ac as in the above embodiment.

Like the inner shroud 60ia of the first modified example, the inner shroud 60ib of this modified example may also be provided with the first gas path surface blow-out passages 72 and/or the second gas path surface blow-out passages 73. In this modified example, the pressure of the cooling air Ac having flowed from the outer cavity 66a through the impingement plate 81 into the inner cavity 67 is low. Thus, in some cases, cooling performance may be inadequate due to the insufficient differential pressure of the cooling air Ac that flows from the inner cavity 67 through the suction-side communication passage 74n, the pressure-side communication passage 74p, and the back-side passage 90i into the back end surface blow-out passages 71. In such cases, the suction-side communication passage 74n or the pressure-side communication passage 74p can be connected to the inner surface of the outer cavity 66a where the pressure of the cooling air Ac is higher than in the inner cavity 67, to thereby secure the sufficient differential pressure of the cooling air Ac flowing through the back end surface blow-out passages 71 and eliminate the problem of inadequate cooling performance.

Although this modified example is a modified example of the inner shroud 60i, also in the outer shroud 60o, the cooling air Ac may be supplied from a pressure-side communication passage 74p and a suction-side communication passage 74n to the back-side passage 90o as in this modified example.

Figure 21:
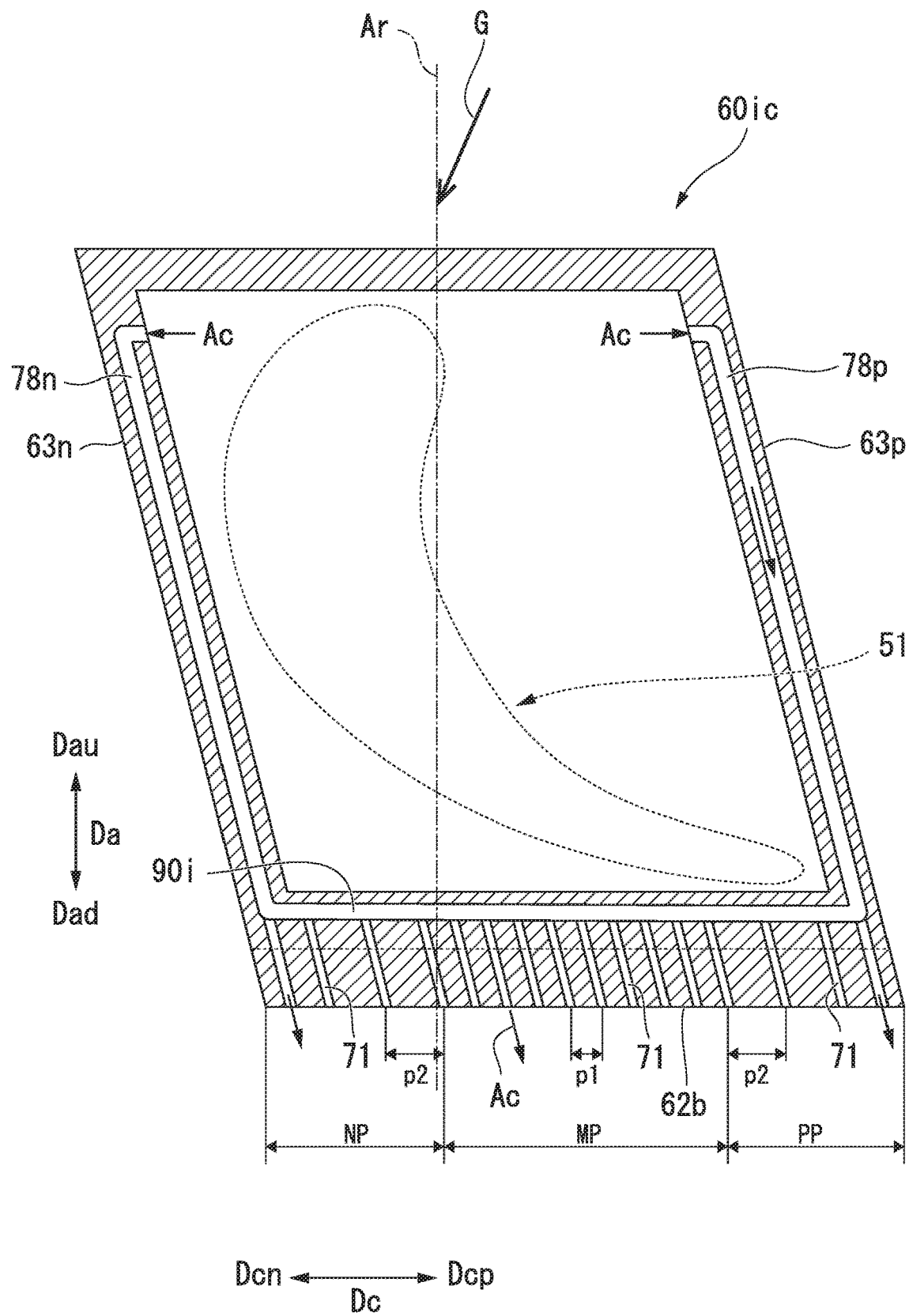
FIG. 21 is a sectional view corresponding to a sectional view taken along line V-V in FIG. 4, showing a third modified example of the inner shroud according to the present invention.

A third modified example of the inner shroud 60i of the above embodiment will be described with reference to FIG. 21. FIG. 21 is a sectional view corresponding to a sectional view taken along line V-V in FIG. 4 that shows the above embodiment.

As in the inner shroud 60i of the above embodiment, so in an inner shroud 60ic of this modified example, the back-side passage 90i (first side passage) and the back end surface blow-out passages 71 are formed.

Here, a region of the back end surface 62b of the inner shroud 61i that does not include the border with the suction-side end surface 63n and the border with the pressure-side end surface 63p will be referred to as a middle region MP. A region of the back end surface 62b that includes the border with the suction-side end surface 63n and adjoins the middle region MP in the circumferential direction Dc (first direction) will be referred to as a suction-side region NP. A region of the back end surface 62b that includes the border with the pressure-side end surface 63p and adjoins the middle region MP in the circumferential direction Dc will be referred to as a pressure-side region PP. Three or more openings of the back end surface blow-out passages 71 arrayed in the circumferential direction Dc may be formed in each of the regions MP, NP, PP. It is assumed that the cross-sections of the back end surface blow-out passages 71 have circular shapes with the same inside diameter. Accordingly, the back end surface blow-out passages have the same length of wetted perimeter s. The length of wetted perimeter s here refers to the length of the wall surface in contact with a fluid in the passage cross-section. For example, when the passage cross-section has a circular shape, the length of wetted perimeter is the circumferential length of this circle.

The interval of the openings of the back end surface blow-out passages 71 in the middle region MP is p1. The interval of the openings of the back end surface blow-out passages 71 in the suction-side region NP and the interval of the openings of the back end surface blow-out passages 71 in the pressure-side region PP is p2. The interval p1 of the openings of the back end surface blow-out passages 71 in the middle region MP is shorter than the interval p2 of the openings of the back end surface blow-out passages 71 in the suction-side region NP and the pressure-side region PP.

Here, the ratio of the length of wetted perimeter s of the back end surface blow-out passages 71 to the interval p of the openings of the back end surface blow-out passages 71 is defined as the density of the openings (s/p). In this case, the density of the openings of the back end surface blow-out passages 71 in the middle region MP is (s/p1). The density of the openings of the back end surface blow-out passages 71 in the pressure-side region PP and the suction-side region NP is (s/p2). Thus, in this modified example, the density of the openings (s/p1) of the back end surface blow-out passages 71 in the middle region MP is higher than the density of the openings (s/p2) of the back end surface blow-out passages 71 in the pressure-side region PP and the suction-side region NP.

As described above, the effect of convective cooling by the cooling air Ac flowing through the back-side passage 90i is lower in the middle region in the circumferential direction of the part of the gas path surface 64p located closer to the back end surface 62b, and moreover this middle region is easily heated by the combustion gas G.

In this modified example, therefore, the density of the openings of the back end surface blow-out passages 71 in the middle region MP is set to be higher than the density of the openings of the back end surface blow-out passages 71 in the pressure-side region PP and the suction-side region NP, such that the cooling effect of the back end surface blow-out passages 71 in the middle region MP becomes higher than the cooling effect of the back end surface blow-out passages 71 in the pressure-side region PP and the suction-side region NP.

Alternatively, the density of the openings of the back end surface blow-out passages 71 in the middle region MP may be higher than the density of the openings of the back end surface blow-out passages 71 in one of the pressure-side region PP and the suction-side region NP and may be equal to the density of openings of the back end surface blow-out passages 71 in the other of the pressure-side region PP and the suction-side region NP.

The density of the openings of the back end surface blow-out passages 71 in the middle region MP may vary inside the middle region MP. Similarly, the density of the openings of the back end surface blow-out passages 71 in the pressure-side region PP may vary inside the pressure-side region PP, and the density of the openings of the back end surface blow-out passages 71 in the suction-side region NP may vary inside the suction-side region NP.

In this modified example, to increase the density of the openings in one region, the interval p of the openings of the back end surface blow-out passages 71 in that region is set to be shorter than the interval p of the openings of the back end surface blow-out passages in the other regions. However, to increase the density of the openings in one region, the length of wetted perimeter s of the back end surface blow-out passages 71 in that region may be set to be longer than the length of wetted perimeter s of the back end surface blow-out passages 71 in the other regions.

Like the inner shroud 60ia of the first modified example, the inner shroud 60ic of this modified example may also be provided with the first gas path surface blow-out passages 72 and/or the second gas path surface blow-out passages 73. Also in the inner shroud 60ic of this modified example, the cooling air Ac may be supplied to the back-side passage 90i from the pressure-side communication passage 74p and the suction-side communication passage 74n as in the inner shroud 60ib of the second modified example.

Although this modified example is a modified example of the inner shroud 60i, also in the outer shroud 60o, the density of the openings of the back end surface blow-out passages 71 in the back end surface 62b may be set as in this modified example.

All the above examples are examples of the case where the back-side passage 90i is provided and the back end surface blow-out passages 71 communicate with the back-side passage 90i. However, the above modifications may be similarly applied to a case where a plurality of side end surface blow-out passages opening in the circumferential end surfaces 63 communicate with the pressure-side passage 78p and the suction-side passage 78n. Specifically, the openings of these side end surface blow-out passages may be formed in the first forming surface, among the passage forming surfaces forming the pressure-side passage 78p or the suction-side passage 78n, that faces the opposite-flow-path side and extends gradually farther away from the opposite-gas-path surface 64i while extending toward the circumferential end surface 63.

Embodiment of Rotor Vane

In the following, an embodiment of a rotor vane according to the present invention and various modified examples thereof will be described with reference to FIG. 22 to FIG. 24. Each rotor vane to be described below is a specific example of the rotor vane described above in "Embodiment of Gas Turbine."

Figure 22:
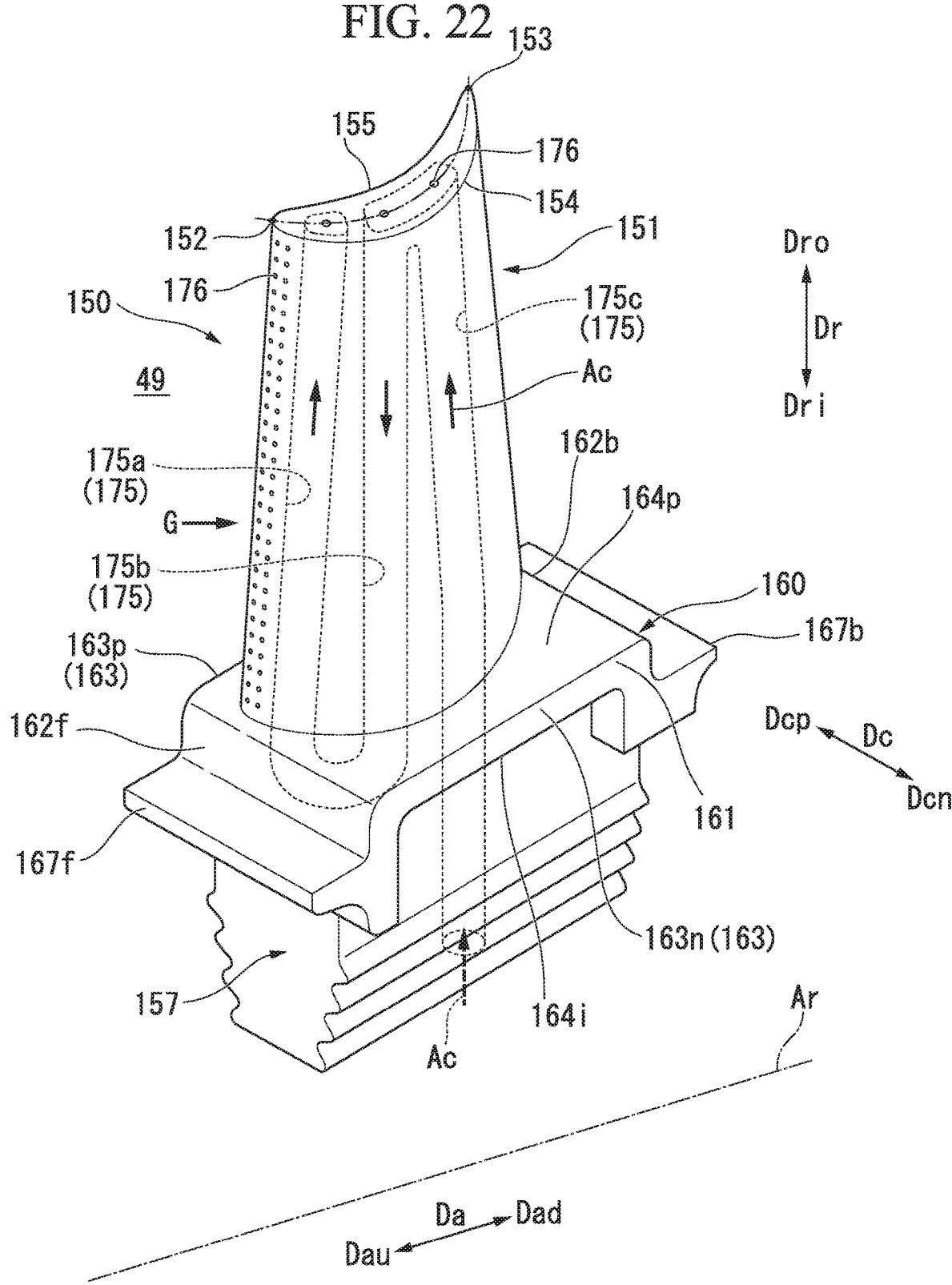
FIG. 22 is a perspective view of a rotor vane in the embodiment according to the present invention.

As shown in FIG. 22, a rotor vane 150 of this embodiment has a vane body 151 extending in the radial direction Dr, a platform 160 formed on the radially inner side Dri of the vane body 151, and a vane root 157 formed on the radially inner side Dri of the platform 160. The vane body 151 is disposed inside the combustion gas flow path 49 (see FIG. 2). The platform 160 defines the position of the annular combustion gas flow path 49 on the radially inner side Dri. Thus, the platform 160 is a flow path forming plate that defines a part of the combustion gas flow path 49.

The vane body 151 forms an airfoil. The end of the vane body 151 on the axially upstream side Dau forms a leading edge 152, and the end thereof on the axially downstream side Dad forms a trailing edge 153. Of the surfaces of the vane body 151 facing the circumferential direction Dc, the convex surface forms a suction-side surface 154 (=negative pressure surface), and the concave surface forms a pressure-side surface 155 (=positive pressure surface). For the convenience of the following description, the pressure side (=positive pressure surface side) of the vane body 151 in the circumferential direction Dc will be referred to as a circumferential pressure side Dcp, and the suction side (=negative pressure surface side) of the vane body 151 will be referred to as a circumferential suction side Dcn. The circumferential suction side Dcn of the rotor vane 150 is the front side in the rotation direction of the rotor shaft 32. On the other hand, the circumferential suction side Dcn of the stator vane 50 is the back side in the rotation direction of the rotor shaft 32. The circumferential suction side Dcn of the rotor vane 150 is the opposite side in the circumferential direction Dc from the circumferential suction side Dcn of the stator vane 50.

The platform 160 has a plate-shaped platform body 161 spreading in the axial direction Da and the circumferential direction Dc, a back protrusion 167b that protrudes from the end of the platform body 161 on the axially downstream side Dad toward the axially downstream side Dad, and a front protrusion 167f that protrudes from the end of the platform body 161 on the axially upstream side Dau toward the axially upstream side Dau.

The platform body 161 has a front end surface 162f that is an end surface on the axially upstream side Dau, a back end surface 162b that is an end surface on the downstream side Dad, a pair of circumferential end surfaces 163 facing opposite sides in the circumferential direction Dc, a gas path surface 164p facing the radially outer side Dro, and an opposite-gas-path surface 164i facing the radially inner side Dri. Of the pair of circumferential end surfaces 163, the end surface on the circumferential pressure side Dcp forms a pressure-side end surface 163p, and the end surface on the circumferential suction side Dcn forms a suction-side end surface 163n. The front end surface 162f and the back end surface 162b are roughly parallel to each other. The pressure-side end surface 163p and the suction-side end surface 163n are roughly parallel to each other. Thus, as shown in FIG. 24, the platform body 161 has a parallelogram shape when seen from the radial direction Dr.

Figure 23:
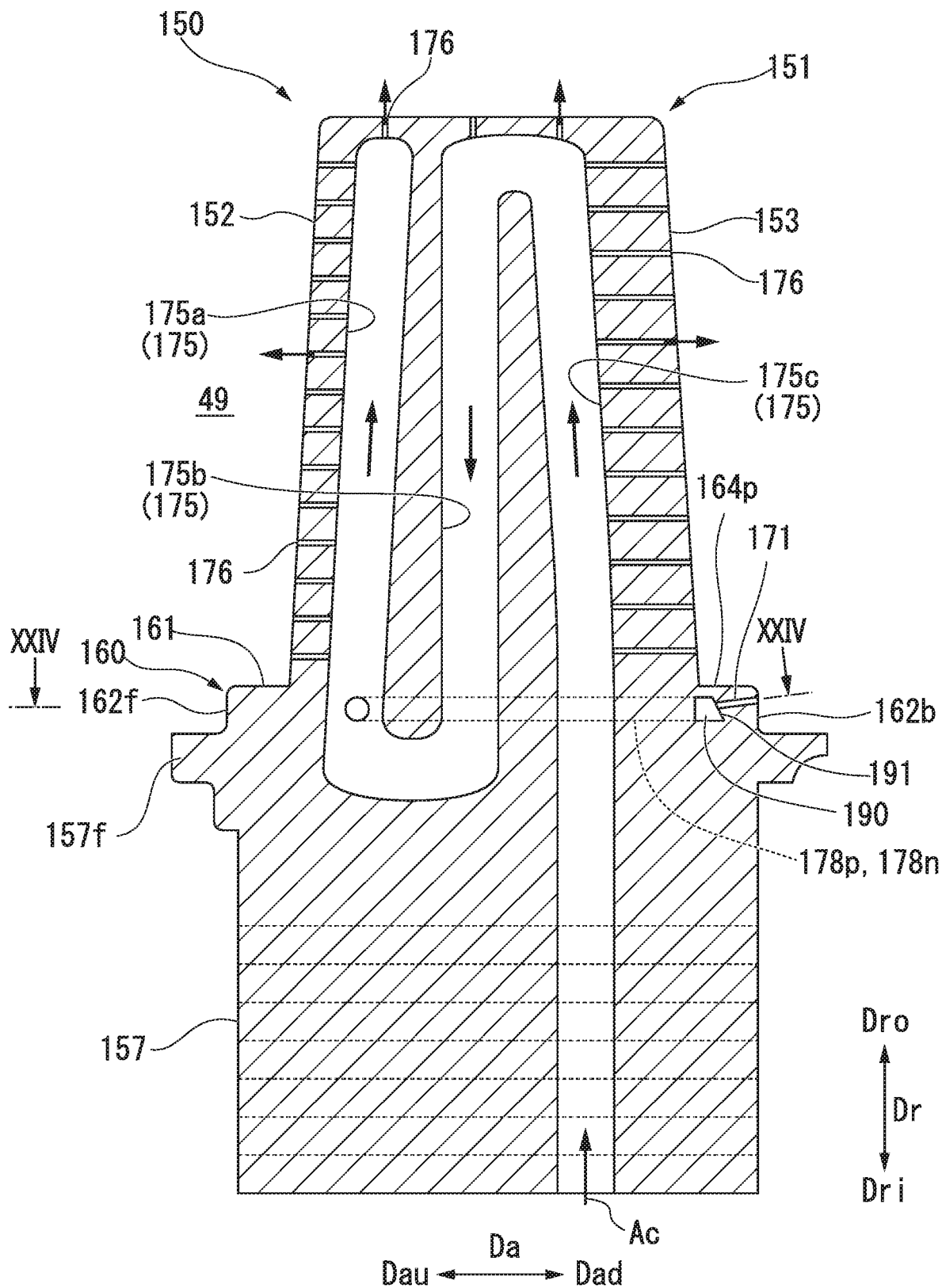
FIG. 23 is a sectional view, taken along the mean line, of the rotor vane in the embodiment according to the present invention.

As shown in FIG. 22 and FIG. 23, the rotor vane 150 has a plurality of vane air passages 175 extending in the radial direction Dr. Each vane air passage 175 is formed continuously at least from the vane body 151 to the platform 160 among the vane body 151, the platform 160, and the vane root 157. The vane air passages 175 are arrayed along the mean line of the vane body 151. Some of the vane air passages 175 that are adjacent to each other communicate with each other at a part inside the vane body 151 on the radially outer side Dro or at a part of the platform 160 on the radially inner side Dri. One of the vane air passages 175 is formed continuously inside the vane body 151, the platform 160, and the vane root 157, and opens at the end of the vane root 157 on the radially inner side Dri. The cooling air Ac from the cooling air passage of the rotor shaft 32 (see FIG. 2) flows into the vane air passage 175 through this opening.

Here, it is assumed that there are three vane air passages 175. Of the three vane air passages 175, the vane air passage 175 located farthest on the axially upstream side Dau will be referred to as a first vane air passage 175a. Subsequently, a second vane air passage 175b and a third vane air passage 175c are disposed in this order on the axially downstream side Dad with the first vane air passage 175a as a reference point. The third vane air passage 175c is formed continuously inside the vane body 151, the platform 160, and the vane root 157, and opens at the end of the vane root 157 on the radially inner side Dri. Both the first vane air passage 175a and the second vane air passage 175b are formed continuously inside the vane body 151 and the platform 160.

The second vane air passage 175b communicates at a part on the radially outer side Dro with a part of the third vane air passage 175c on the radially outer side Dro. The second vane air passage 175b communicates at a part on the radially inner side Dri with a part of the first vane air passage 175a on the radially inner side Dri.

Each of the leading edge 152 and the trailing edge 153 of the vane body 151 has a plurality of vane surface blow-out passages 176 that are formed therethrough from the vane air passage 175 to the combustion gas flow path 49. The vane body 151 is cooled in the process of the cooling air Ac flowing through the vane air passages 175. The cooling air Ac having flowed into the vane air passages 175 flows out from the vane surface blow-out passages 176 into the combustion gas flow path 49. Thus, the leading edge 152 and the trailing edge 153 of the vane body 151 are cooled in the process of the cooling air Ac flowing through the vane surface blow-out passages 176. Moreover, part of the cooling air Ac having flowed out from the vane surface blow-out passages 176 to the combustion gas flow path 49 also serves as film air by partially covering the surface of the vane body 151.

Figure 24:
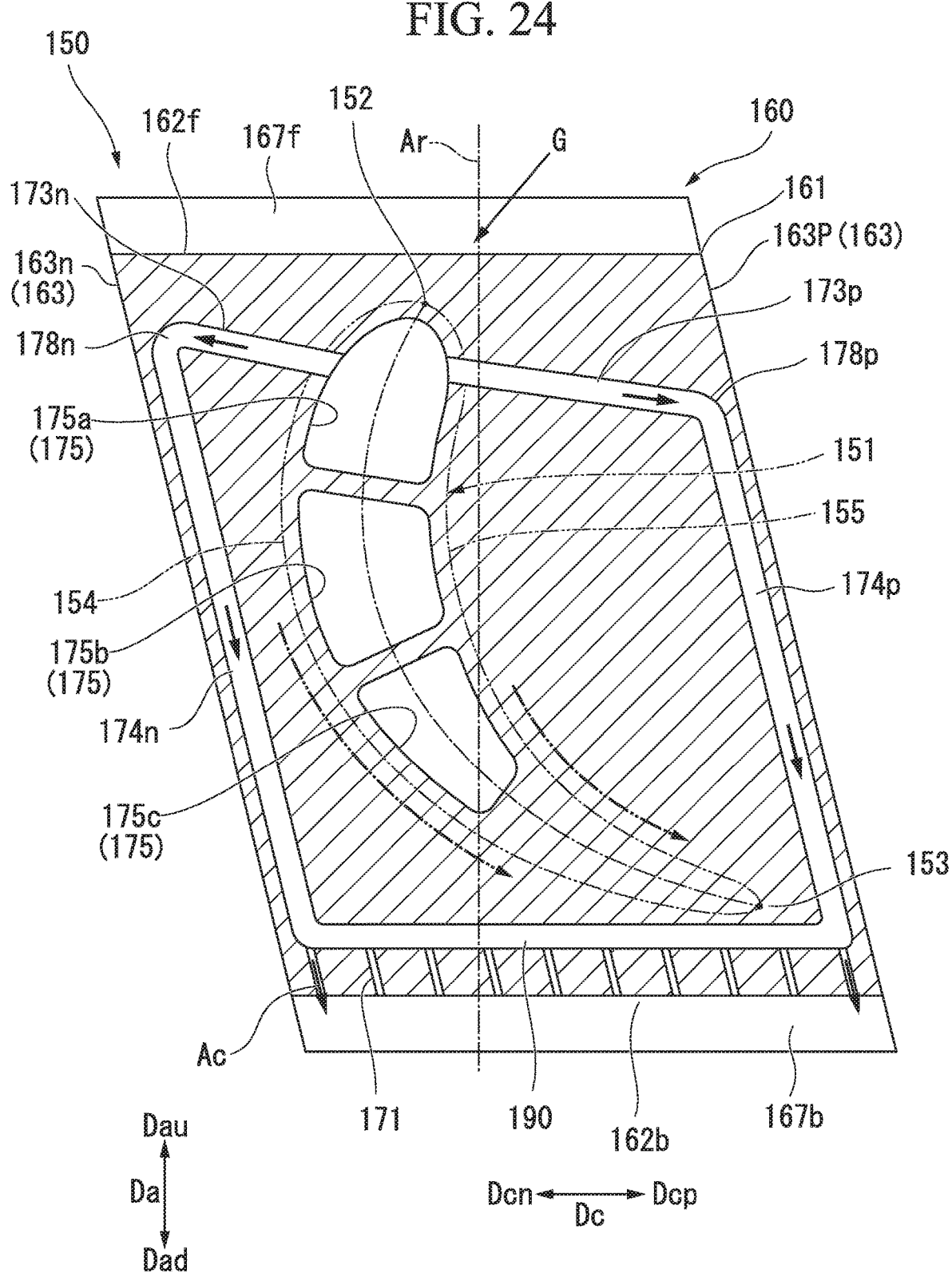
FIG. 24 is a sectional view taken along line XXIV-XXIV in FIG. 23.

As shown in FIG. 24, the platform body 161 has a pressure-side passage 178p, a suction-side passage 178n, a back-side passage 190, and a plurality of back end surface blow-out passages 171. Both the pressure-side passage 178p and the suction-side passage 178n communicate with the first vane air passage 175a located farthest on the axially upstream side Dau of the vane air passages 175. The pressure-side passage 178p has a circumferential passage portion 173p that extends from the first vane air passage 175a toward the circumferential pressure side Dcp, up to a point near the pressure-side end surface 163p, and an axial passage portion 174p that extends from the end of the circumferential passage portion 173p on the circumferential pressure side Dcp along the pressure-side end surface 163p in a direction having a component of the axial direction Da. The suction-side passage 178n has a circumferential passage portion 173n that extends from the first vane air passage 175a toward the circumferential suction side Dcn, up to a point near the suction-side end surface 163n, and an axial passage portion 174n that extends from the end of the circumferential passage portion 173n on the circumferential suction side Dcn along the suction-side end surface 163n in a direction having a component of the axial direction Da. The back-side passage 190 is formed farther on the axially downstream side Dad than the trailing edge 153 of the vane body 151, and extends along the back end surface 162b of the platform body 161 in the circumferential direction Dc. The end of the back-side passage 190 on the circumferential pressure side Dcp communicates with the end of the pressure-side passage 178p on the axially downstream side Dad. The end of the back-side passage 190 on the circumferential suction side Dcn communicates with the end of the suction-side passage 178n on the axially downstream side Dad. Each back end surface blow-out passage 171 communicates with the back-side passage 190. Each back end surface blow-out passage 171 extends from the back-side passage 190 toward the axially downstream aide Dad and opens in the back end surface 162b of the platform body 161. The back end surface blow-out passages 171 are arrayed in the circumferential direction Dc. The passage cross-sectional area of the back-side passage 190 is larger than the passage cross-sectional area of the back end surface blow-out passage 171.

The cross-sectional shape of the back-side passage 190 is basically the same as the cross-sectional shape of the back-side passage 90i of the inner shroud 60i in the stator vane 50 having been described using FIG. 7. Specifically, the cross-section of the back-side passage 190 has an irregular quadrangular shape. Of the plurality of passage forming surfaces defining the back-side passage 190, one passage forming surface is a first forming surface 191 (see FIG. 23) that faces the radially inner side Dri (opposite-flow-path side) and extends gradually farther away from the gas path surface 164p while extending toward the axially downstream side Dad (end surface side). The back end surface blow-out passages 171 open in the first forming surface 191.

Accordingly, also in the rotor vane 150 of this embodiment, the back end surface blow-out passages 171 having a high cooling effect have a long passage length. Moreover, in this embodiment, there is a part where the back-side passage 190 and the back end surface blow-out passages 171 overlap each other as seen from the radial direction Dr. Thus, also in the rotor vane 150 of this embodiment, it is possible to effectively cool the part of the gas path surface 164p on the axially downstream side Dad without increasing the flow rate of the cooling air Ac.

In this embodiment, the pressure-side passage 178p and the suction-side passage 178n communicate with the first vane air passage 175a located farthest on the axially upstream side Dau of the vane air passages 175, and the back-side passage 190 communicates with the pressure-side passage 178p and the suction side passage 178n. However, the pressure-side passage and the suction-side passage may instead communicate with the second vane air passage 175b or the third vane air passage 175c of the vane air passages 175, and the back-side passage 190 may communicate with these pressure-side passage and suction-side passage.

As described above, the cross-sectional shape of the back-side passage 190 in the rotor vane 150 of this embodiment is the same as the cross-sectional shape of the back-side passage 90i of the inner shroud 60i in the stator vane 50 having been described using FIG. 7. However, the cross-section of the back-side passage 190 of the rotor vane 150 may instead have various shapes like the cross-sectional shapes of the back-side passage of the stator vane 50 having been described using FIG. 8 to FIG. 13.

As in the inner shroud 60ia shown in FIG. 18 and FIG. 19, the first gas path surface blow-out passages may communicate with the back-side passage 190 of the rotor vane 150. Specifically, the first gas path surface blow-out passages that communicate with the back-side passage 190 and open in the gas path surface 164p of the platform 160 may be provided. Moreover, as in the inner shroud 60ic shown in FIG. 21, the density of the openings of the back end surface blow-out passages 171 of the rotor vane 150 may be varied among a middle region MP, a suction-side region NP, and a pressure-side region PP of the back end surface 162b of the platform body 161.

All the above examples are examples of the case where the back-side passage 190 is provided and the back end surface blow-out passages 171 communicate with the back-side passage 190. However, the above modifications may be similarly applied to a case where, for example, a plurality of side end surface blow-out passages opening in the circumferential end surfaces communicates with the pressure-side passage 178p and the suction-side passage 178n. Specifically, the openings of these side end surface blow-out passages may be formed in the first forming surface, among the passage forming surfaces forming the pressure-side passage 178p or the suction-side passage 178n, that faces the opposite-flow-path side and extends gradually farther away from the opposite-gas-path surface 164i while extending toward the circumferential end surface.

Embodiment of Ring Segment and Various Modified Examples Thereof

In the following, an embodiment of a ring segment according to the present invention and various modified examples thereof will be described with reference to FIG. 25 to FIG. 29. Each ring segment to be described below is a specific example of the ring segment described above in "Embodiment of Gas Turbine."

Figure 25:
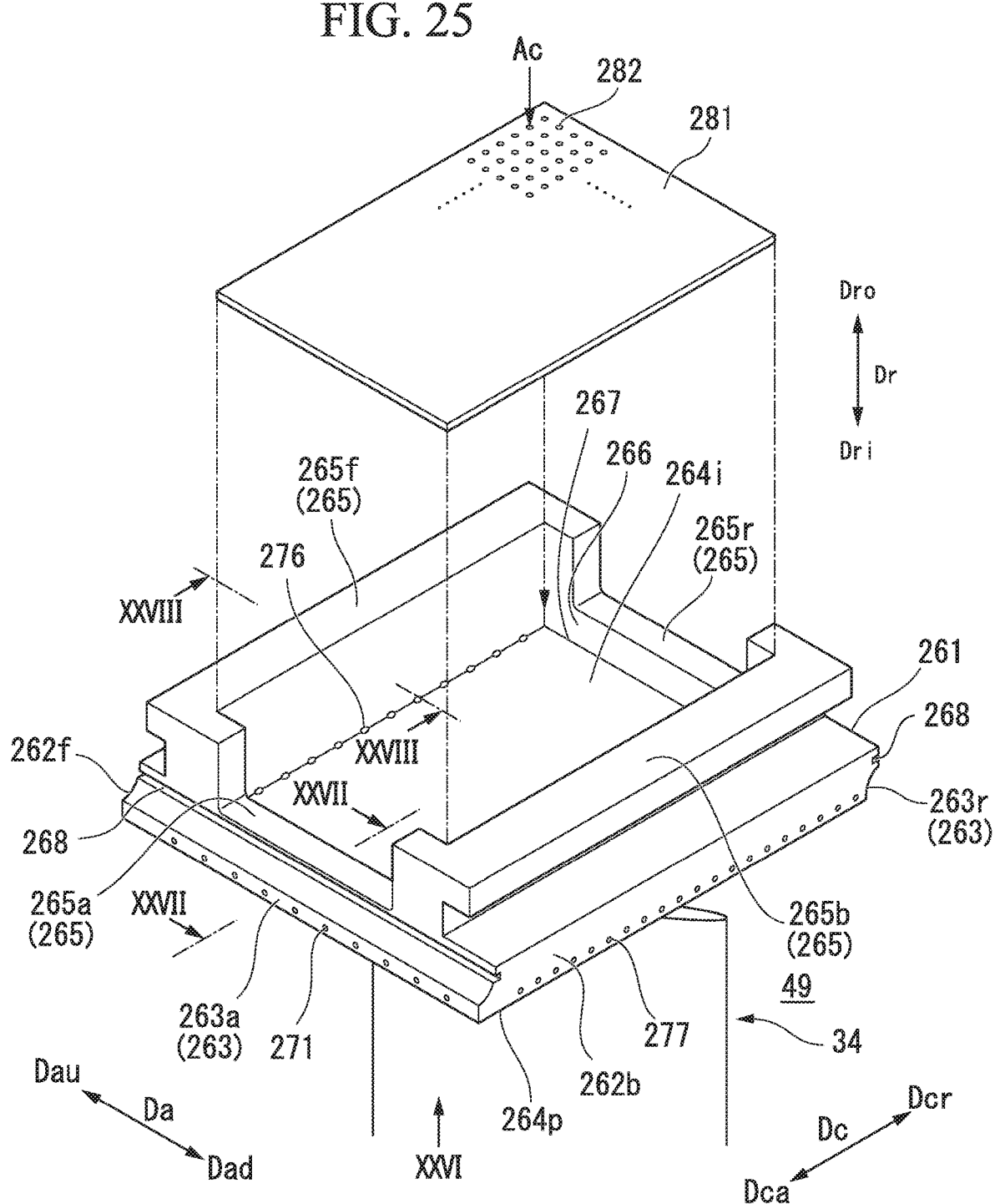
FIG. 25 is a perspective view of a ring segment in the embodiment according to the present invention.

As shown in FIG. 25, a ring segment 250 is located on the radially outer side Dro of the rotor vane 34 and faces the rotor vane 34 in the radial direction Dr. The ring segments 250 are arrayed in the circumferential direction Dc and form an annular shape around the axis Ar. The ring segments 250 define the perimeter of the annular combustion gas flow path 49 on the radially outer side Dro. Thus, the ring segment 250 constitutes a flow path forming plate.

The ring segment 250 has a plate-shaped ring segment body 261 and a peripheral wall 265. Like the inner shroud body 61$i$ of the stator vane 50, the ring segment body 261 has a front end surface 262$f$, a back end surface 262$b$, a pair of circumferential end surfaces 263, a gas path surface 264$p$, and an opposite-gas-path surface 264$i$. The ring segment body 261 has a rectangular shape or a square shape when seen from the radial direction Dr. Here, in the circumferential direction Dc, the front side in the rotation direction of the turbine rotor 31 will be referred to as a rotational front side Dca, and the back side in the rotation direction of the turbine rotor 31 will be referred to as a rotational back side Dcr. Of the pair of circumferential end surfaces 263, the circumferential end surface on the rotational front side Dca will be referred to as a rotation front-side end surface 263$a$, and the circumferential end surface on the rotational back side Dcr will be referred to as a rotation back-side end surface 263$r$.

Figure 27:
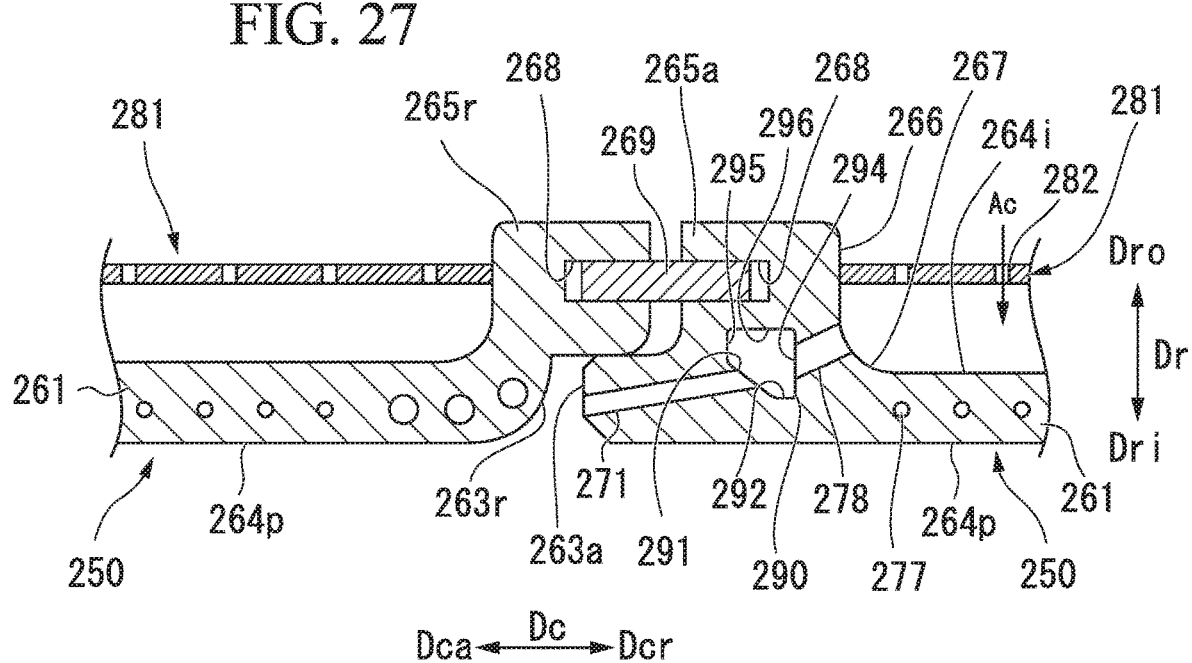
FIG. 27 is a sectional view taken along line XXVII-XXVII in FIG. 26.

The peripheral wall 265 protrudes from the opposite-gas-path surface 264$i$ of the ring segment body 261 toward the radially outer side Dro. The peripheral wall 265 is provided along the end surfaces of the ring segment body 261. The peripheral wall 265 has a front wall 265$f$ and a back wall 265$b$ facing each other in the axial direction Da, and a pair of side walls 265$a$, 265$r$ facing each other in the circumferential direction Dc. The front wall 265$f$ is provided along the front end surface 262$f$ of the ring segment body 261. The back wall 265$b$ is provided along the back end surface 262$b$ of the ring segment body 261. Of the pair of side walls 265$a$, 265$r$, one side wall forms a rotation front-side wall 265$a$ provided along the rotation front-side end surface 263$a$, and the other side wall forms a rotation back-side wall 265$r$ provided along the rotation back-side end surface 263$r$. Each of the front wall 265$f$ and the back wall 265$b$ protrudes relative to the ring segment body 261 farther toward the radially outer side Dro than the pair of side walls 265$a$, 265$r$ and forms a hook. These hooks are mounted on the isolation ring 43 having been described using FIG. 2. As shown in FIG. 27, the rotation front-side wall 265$a$ has a seal groove 268 that is recessed toward the rotational back side Dcr and extends in the axial direction Da. The rotation back-side wall 265$r$ has a seal groove 268 that is recessed toward the rotational front side Dca and extends in the axial direction Da. A seal plate 269 is fitted into the seal grooves 268. In the ring segment 250, a recess 266 recessed toward the radially inner side Dri is formed by the ring segment body 261 and the peripheral wall 265.

The ring segment 250 further includes an impingement plate 281. The impingement plate 281 partitions a space inside the recess 266 into a region on the radially outer side Dro and an inner cavity 267 that is a region on the radially inner side Dri. The impingement plate 281 has a plurality of through-holes 282 that are formed therethrough in the radial direction Dr. Part of the cooling air Ac present on the radially outer side Dro of the ring segment 250 flows into the inner cavity 267 through the through-holes 282 of the impingement plate 281.

Figure 26:
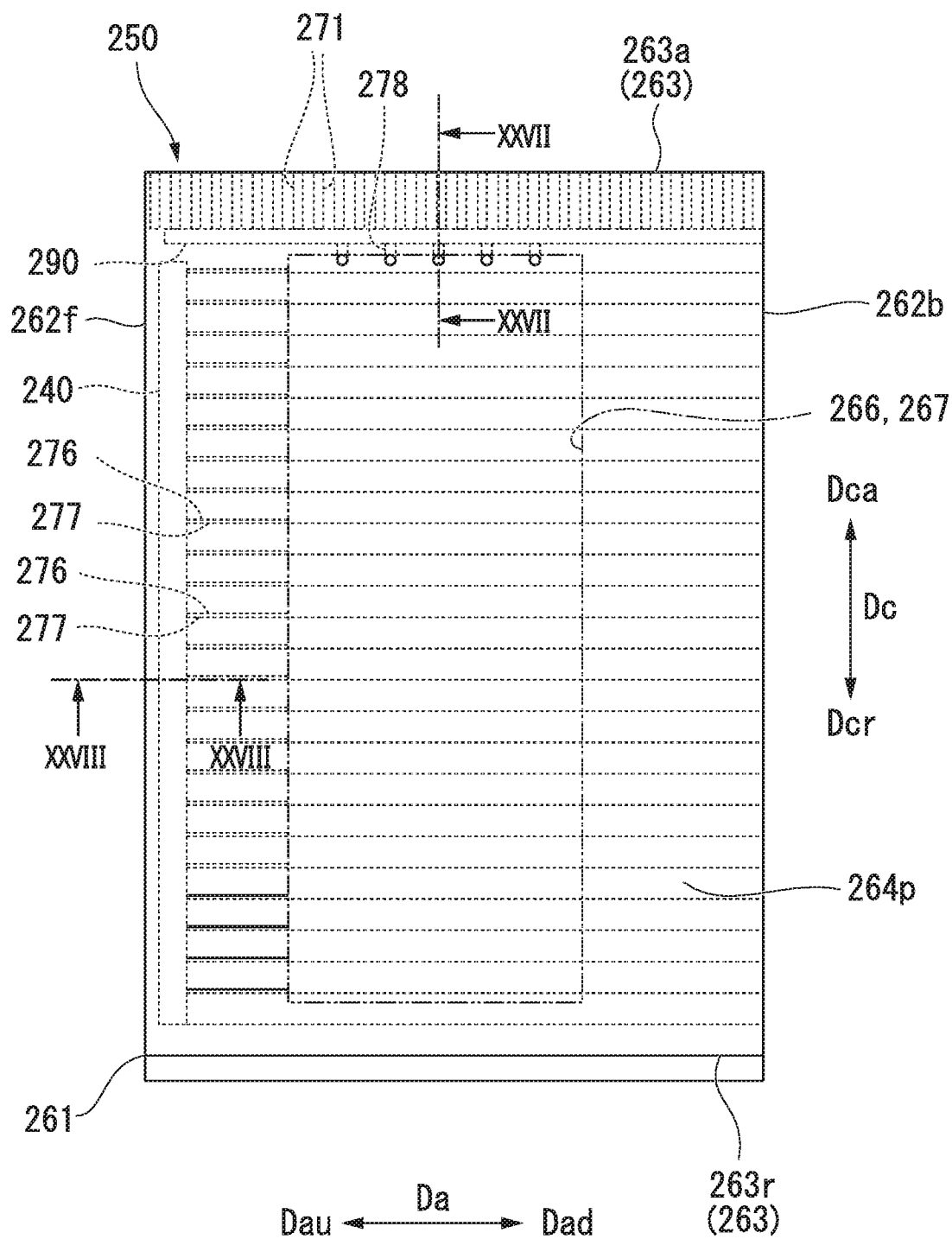
FIG. 26 is a view taken along arrow XXVI in FIG. 25.

As shown in FIG. 26, the ring segment body 261 has a front-side passage 240, a plurality of front-side communication passages 276, a rotation front-side passage 290, a plurality of rotation front-side communication passages 278, a plurality of back end surface blow-out passages 277, and a plurality of side end surface blow-out passages 271.

Figure 28:
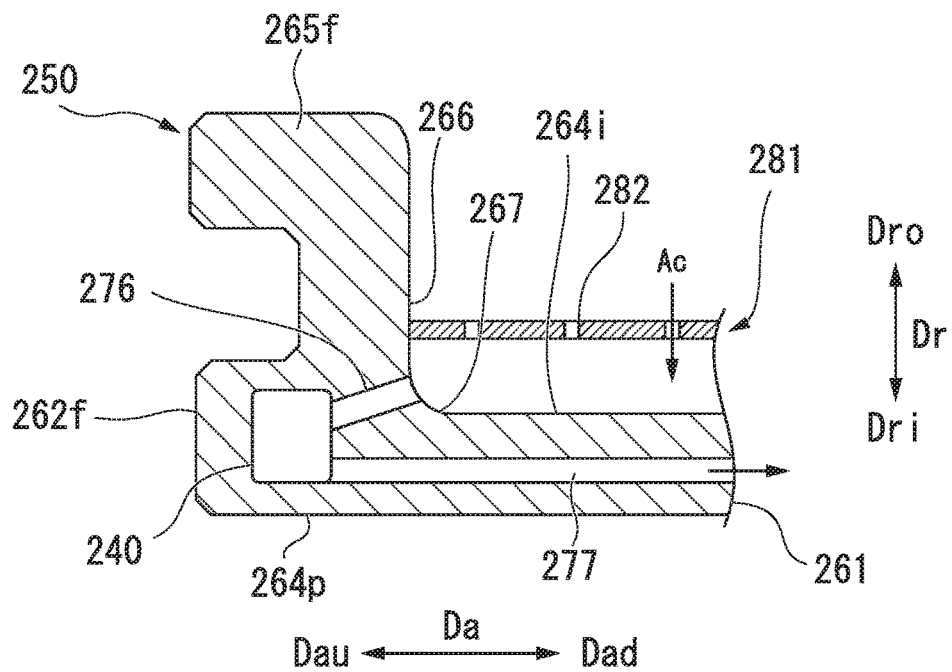
FIG. 28 is a sectional view taken along line XXVIII-XXVIII in FIG. 26.

As shown in FIG. 26 and FIG. 28, the front-side passage 240 extends in the circumferential direction Dc along the front end surface 262$f$ of the ring segment body 261. The front-side communication passages 276 provide communication between the inner cavity 267 and the front-side passage 240. The front-side communication passages 276 extend in the axial direction Da. The ends of the front-side communication passages 276 on the axially upstream side Dau join the front-side passage 240. The ends of the front-side communication passages 276 on the axially downstream side Dad communicate with the inner cavity 267. Specifically, the ends of the front-side communication passages 276 on the axially downstream side Dad open near the corner between the surface of the front wall 265$f$ that is the inner surface thereof facing the recess 266 and the bottom surface of the recess 266. The back end surface blow-out passages 277 extend in the axial direction Da. The ends of the back end surface blow-out passages 277 on the axially upstream side Dau communicate with the front-side passage 240. The ends of the back end surface blow-out passages 277 on the axially downstream side Dad open in the back end surface 262$b$ of the ring segment body 261. The passage cross-sectional area of the front-side passage 240 is larger than the passage cross-sectional area of the back end surface blow-out passage 277.

Part of the cooling air Ac having flowed into the inner cavity 267 flows into the front-side passage 240 through the front-side communication passages 276. In this process, the cooling air Ac from the front-side communication passages 276 impinges on a part of the passage forming surface forming the front-side passage 240 and thereby performs impingement cooling on this part of the passage forming surface. The cooling air Ac flows from the front-side passage 240 into the back end surface blow-out passages 277. In the process of flowing through the back end surface blow-out passages 277, the cooling air Ac performs convective cooling on a part of the ring segment body 261 extending along the gas path surface 264$p$. The cooling air Ac flows out from the openings in the back end surface 262$b$.

As shown in FIG. 26 and FIG. 27, the rotation front-side passage 290 extends in the axial direction Da along the rotation front-side end surface 263$a$ of the ring segment body 261. The rotation front-side communication passages 278 provide communication between the inner cavity 267 and the rotation front-side passage 290. The rotation front-side communication passages 278 extend in the circumferential direction Dc. The ends of the rotation front-side communication passages 278 on the rotational front side Dca join the rotation front-side passage 290. The ends of the rotation front side communication passages 278 on the rotational back side Dcr communicate with the inner cavity 267. Specifically, the ends of the rotation front-side communication passages 278 on the rotational back side Dcr open near the corner between the surface of the rotation front-side wall 265$a$ that is the inner surface thereof facing the recess 266 and the bottom surface of the recess 266. The side end surface blow-out passages 271 extend in the circumferential direction Dc. The ends of the side end surface blow-out passages 271 on the rotational back side Dcr communicate with the rotation front-side passage 290. The ends of the side end surface blow-out passages 271 on the rotational front side Dca open in the rotation front-side end surface 263a of the ring segment body 261. The passage cross-sectional area of the rotation front-side passage 290 is larger than the passage cross-sectional area of the rotation front-side communication passage 278 and the passage cross-sectional area of the side end surface blow-out passage 271.

The cross-section of the rotation front-side passage 290 has an irregular pentagonal shape. Thus, the rotation front-side passage 290 is defined by a plurality of passage forming surfaces including a first forming surface 291, a second forming surface 292, a fourth forming surface 294, a fifth forming surface 295, and a sixth forming surface 296. Of the plurality of edges forming the passage cross-section of the rotation front-side passage 290, the edge included in the first forming surface 291, the edge included in the second forming surface 292, the edge included in the fourth forming surface 294, the edge included in the fifth forming surface 295, and the edge included in the sixth forming surface 296 are all substantially straight lines. The first forming surface 291, the second forming surface 292, the fourth forming surface 294, the fifth forming surface 295, and the sixth forming surface 296 are all flat surfaces extending in the axial direction Da. The first forming surface 291 faces the radially outer side Dro (opposite-flow-path side) and extends gradually farther away from the gas path surface 264p while extending toward the end surface side that is the side toward the rotation front-side end surface 263a being the first end surface. The second forming surface 292 spreads from the end of the first forming surface 291 on the rotational back side Dcr toward the rotational back side Dcr. The second forming surface 292 is substantially parallel to the gas path surface 264p. The fourth forming surface 294 spreads from the end of the second forming surface 292 on the rotational back side Dcr toward the radially outer side Dro. The fourth forming surface 294 is parallel to the surface of the rotation front-side wall 265a that is the inner surface thereof facing the recess 266. The sixth forming surface 296 spreads from the end of the fourth forming surface 294 on the radially outer side Dro toward the rotational front side Dca. The sixth forming surface 296 is substantially parallel to the gas path surface 264p and the second forming surface 292. The fifth forming surface 295 spreads from the end of the sixth forming surface 296 on the rotational front side Dca toward the radially inner side Dri. The fifth forming surface 295 is substantially parallel to the fourth forming surface 294. The end of the fifth forming surface 295 on the radially inner side Dri joins the end of the first forming surface 291 on the rotational front side Dca.

The rotation front-side communication passages 278 open in the fourth forming surface 294 among the passage forming surfaces forming the rotation front-side passage 290. The side end surface blow-out passages 271 open in the first forming surface 291 among the passage forming surfaces forming the rotation front-side passage 290.

Part of the cooling air Ac having flowed into the inner cavity 267 flows into the rotation front-side passage 290 through the rotation front-side communication passages 278. In the process of flowing through the rotation front-side passage 290, the cooling air Ac cools a part of the ring segment body 261 extending along the rotation front-side passage 290. The cooling air Ac flows from the rotation front-side passage 290 into the side end surface blow-out passages 271. In the process of flowing through the side end surface blow-out passages 271, the cooling air Ac performs convective cooling on a part of the gas path surface 264p of the ring segment body 261 located on the rotational front side Dca. The cooling air Ac flows out from the openings in the rotation front-side end surface 263a of the ring segment body 261. The cooling air Ac flowing through the side end surface blow-out passages 271 has a higher cooling effect than the cooling air Ac flowing through the rotation front-side passage 290.

The side end surface blow-out passages 271 open in the first forming surface 291 that faces the radially outer side Dro (opposite-flow-path side) and extends gradually farther away from the gas path surface 264p while extending toward the rotational front side Dca (end surface side). Accordingly, in this embodiment, the side end surface blow-out passages 271 having a high cooling effect have a long passage length. Thus, in the ring segment 250 of this embodiment, as in the inner shroud 60i described above, it is possible to effectively cool the part of the gas path surface 264p on the rotational front side Dca without increasing the flow rate of the cooling air Ac.

The cross-section of the rotation front-side passage 290 in the ring segment 250 of this embodiment may have various shapes like the cross-sectional shapes of the back-side passage 90i in the stator vane 50 shown in FIG. 7 to FIG. 13.

Like the inner shroud 60ia shown in FIG. 18 and FIG. 19, the ring segment 250 of this embodiment may include, for the rotation front-side passage 290 thereof, first gas path surface blow-out passages that each communicate at one end with the rotation front-side passage 290 and open at the other end in the gas path surface 264p.

Figure 29:
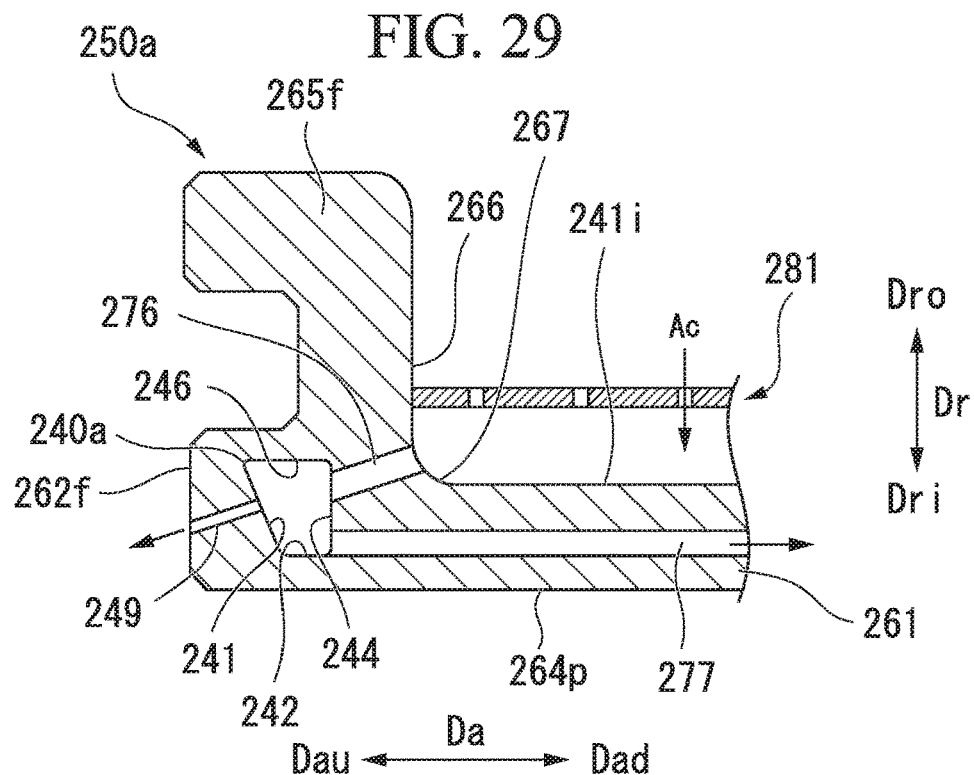
FIG. 29 is a sectional view of main parts of a ring segment in a modified example according to the present invention.

Next, a modified example of the ring segment 250 will be described with reference to FIG. 29.

Like the ring segment 250 of the above embodiment, a ring segment 250a of this modified example has a front-side passage 240a and the front-side communication passages 276. The ring segment 250a of this modified example further includes a plurality of front end surface blow-out passages 249. The front end surface blow-out passages 249 extend in the axial direction Da. The ends of the front end surface blow-out passages 249 on the axially downstream side Dad communicate with the front-side passage 240a. The ends of the front end surface blow-out passages 249 on the axially upstream side Dau open in the front end surface 262f of the ring segment body 261. The passage cross-sectional area of the front-side passage 240a is larger than the cross-sectional area of the front end surface blow-out passage 249.

The cross-section of the front-side passage 240a of this modified example has a trapezoidal shape. Thus, the front-side passage 240a is defined by a plurality of passage forming surfaces including a first forming surface 241, a second forming surface 242, a fourth forming surface 244, and a sixth forming surface 246. Of the plurality of edges forming the passage cross-section of the front-side passage 240a, the edge included in the first forming surface 241, the edge included in the second forming surface 242, the edge included in the fourth forming surface 244, and the edge included in the sixth forming surface 246 are all substantially straight lines. The first forming surface 241, the second forming surface 242, the fourth forming surface 244, and the sixth forming surface 246 are all curved surfaces that extend in the circumferential direction Dc and curve gradually as they extend in the circumferential direction Dc. The first forming surface 241 faces the radially outer side Dro (opposite-flow-path side) and extends gradually farther away from the gas path surface 264p while extending toward the end surface side that is the side toward the front end surface 262f being the first end surface. The second forming surface 242 spreads from the end of the first forming surface 241 on the axially downstream side Dad toward the axially downstream side Dad. The second forming surface 242 is substantially parallel to the gas path surface 264p. The fourth forming surface 244 spreads from the end of the second forming surface 242 on the axially downstream side Dad toward the radially outer side Dro. The fourth forming surface 244 is parallel to the surface of the front wall 265f that is the inner surface thereof facing the recess 266. The sixth forming surface 246 spreads from the end of the fourth forming surface 244 on the radially outer side Dro toward the axially upstream side Dau. The sixth forming surface 246 is substantially parallel to the gas path surface 264p and the second forming surface 242. The end of the sixth forming surface 246 on the axially upstream side Dau joins the end of the first forming surface 241 on the axially upstream side Dau.

The front-side communication passages 276 open in the fourth forming surface 244 among the passage forming surfaces forming the front-side passage 240a. The back end surface blow-out passages 277 also open in the fourth forming surface 244 among the passage forming surfaces forming the front-side passage 240a. The front end surface blow-out passages 249 open in the first forming surface 241 among the passage forming surfaces forming the front-side passage 240a.

Part of the cooling air Ac having flowed into the front-side passage 240a flows into the back end surface blow-out passages 277 as in the above embodiment. Another part of the cooling air Ac having flowed into the front-side passage 240a flows into the front end surface blow-out passages 249. In the process of flowing through the front end surface blow-out passages 249, the cooling air Ac performs convective cooling on a part of the gas path surface 264p of the ring segment body 261 located on the axially upstream side Dau. The cooling air Ac flows out from the openings in the front end surface 262f of the ring segment body 261.

The front end surface blow-out passages 249 open in the first forming surface 241 that faces the radially outer side Dro (opposite-flow-path side) and extends gradually farther away from the gas path surface 264p while extending toward the axially upstream side Dau (end surface side). Accordingly, in this modified example, the front end surface blow-out passages 249 having a high cooling effect have a long passage length. Thus, in the ring segment 250a of this modified example, it is possible to effectively cool the part of the gas path surface 264p on the axially upstream side Dau without increasing the flow rate of the cooling air Ac.

The cross-section of the front-side passage 240a in the ring segment 250a of this modified example may have various shapes like the cross-sectional shapes of the back-side passage 90i in the stator vane 50 shown in FIG. 7 to FIG. 13.

Like the first modified example of the inner shroud 60ia shown in FIG. 18 and FIG. 19, the ring segment 250a of this modified example may include, for the front-side passage 240a thereof, first gas path surface blow-out passages that each communicate at one end with the rotation front-side passage 290 and open at the other end in the gas path surface 264p.

Figure 30:
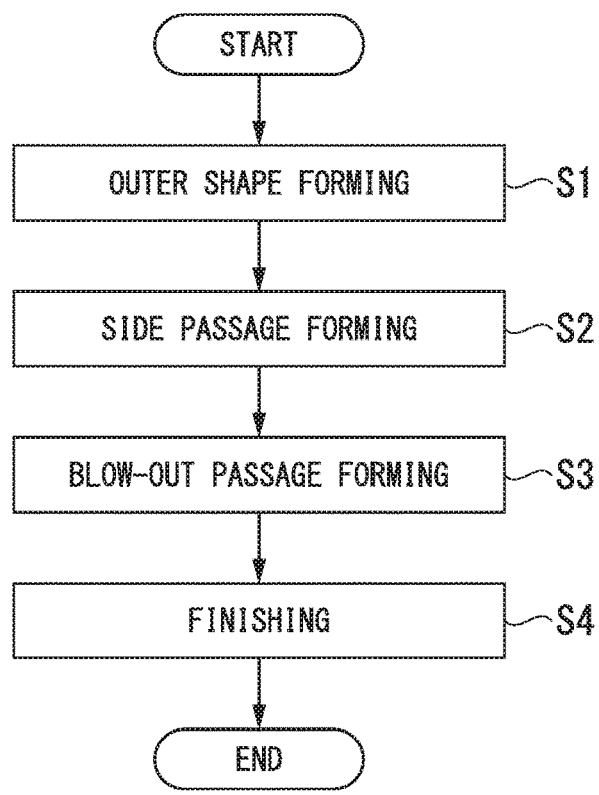
FIG. 30 is a flowchart showing the sequence of a manufacturing method of a flow path forming plate in the embodiment according to the present invention.

Embodiment of Manufacturing Method of Flow Path Forming Plate and Various Modified Examples Thereof A manufacturing method of the flow path forming plates having been described above will be described in accordance with the flowchart shown in FIG. 30. The flow path forming plates having been described above are namely the inner shroud 60i and the outer shroud 60o in the stator vane 50, the platform 160 in the rotor vane 150, and the ring segment 250

First, an intermediate product matching the outer shape of the flow path forming plate is formed (S1: outer shape forming step). In this outer shape forming step (S1), first, a casting mold having an internal space matching the outer shape of the flow path forming plate is formed. For example, the casting mold is formed by a lost-wax process. Next, a molten metal is poured into the casting mold. Here, when it is necessary to form a space inside the intermediate product, a core matching the shape of that space is placed inside the casting mold before the molten metal is poured. When the molten metal hardens, the intermediate product is completed. In the case where a core has been placed inside the casting mold, this core is melted with a chemical agent after the molten metal hardens. This intermediate product has a gas path surface, an opposite-gas-path surface, end surfaces, etc. forming the outer surface of the flow path forming plate.

Next, a first side passage which extends in a direction along the first end surface that is one of the end surfaces and through which the cooling air Ac flows is formed between the gas path surface and the opposite-gas-path surface of the intermediate product (S2: side passage forming step). Here, the first end surface refers to, for example, the back end surface 62b of the inner shroud 60i in the above embodiment. The first side passage refers to, for example, the back-side passage 90i of the inner shroud 60i in the above embodiment. In this side passage forming step (S2), as one of the passage forming surfaces forming the first side passage, a first forming surface is formed that faces the opposite-flow-path side that is the side of the opposite-gas-path surface with the gas path surface as a reference point, and that extends gradually away from the gas path surface while extending toward the first end surface.

This first side passage can be formed, for example, by performing electrical discharge machining, electrochemical machining, machining, etc. on the intermediate product. It is also possible to form the first side passage in the casting process of the intermediate product by placing a core matching the shape of the first side passage inside the casting mold when casting the intermediate product. In this case, the side passage forming step (S2) is performed during the outer shape forming step (S1). Other passages may also be formed in the side passage forming step (S2).

Next, a plurality of end surface blow-out passages communicating with the first side passage and opening in the first end surface is formed in the intermediate product (S3: blow-out passage forming step). Here, the end surface blow-out passages refer to the back end surface blow-out passages 71 of the inner shroud 60i in the above embodiment. In this blow-out passage forming step (S3), the end surface blow-out passages are formed such that the passage cross-sectional area of the end surface blow-out passage becomes smaller than the passage cross-sectional area of the first side passage. Moreover, the openings of these end surface blow-out passages are formed in the first forming surface of the first side passage.

These end surface blow-out passages can be formed, for example, by performing electrical discharge machining, electrochemical machining, machining, etc. on the intermediate product. Other passages may also be formed in the blow-out passage forming step (S3).

Next, a finishing process is performed on the intermediate product having undergone the side passage forming step (S2) and the blow-out passage forming step (S3), to complete the flow path forming plate (S4: finishing step). In the finishing step (S4), for example, the outer surface of the intermediate product is polished by machining etc. As necessary, a thermal barrier coating is applied to the outer surface of the intermediate product.

INDUSTRIAL APPLICABILITY

According to an aspect of the present invention, it is possible to effectively cool a part of a gas path surface of a flow path forming plate on the side of a first end surface.

REFERENCE SIGNS LIST

1 Gas turbine
2 Gas turbine rotor
3 Gas turbine casing
5 Intermediate casing
6 Exhaust chamber
10 Compressor
11 Compressor rotor
12 Rotor shaft
13 Rotor vane row
14 Rotor vane
16 Stator vane row
17 Stator vane
15 Compressor casing
20 Combustor
30 Turbine
31 Turbine rotor
32 Rotor shaft
33 Rotor vane row
34 Rotor vane
41 Turbine casing
42 Ring segment
43 Isolation ring
44 Vane ring
45 Casing body
46 Stator vane row
47 Stator vane
49 Combustion gas flow path
50 Stator vane
51 Vane body
52 Leading edge
53 Trailing edge
54 Suction-side surface (negative pressure surface)
55 Pressure-side surface (positive pressure surface)
60$i$ Inner shroud
60$o$ Outer shroud
61$i$ Inner shroud body
61$o$ Outer shroud body
62$f$ Front end surface
62$b$ Back end surface (first end surface)
63 Circumferential end surface
63$n$ Suction-side end surface
63$p$ Pressure-side end surface
64$i$ Opposite-gas-path surface
64$io$ Outer opposite-gas-path surface
64$p$ Gas path surface
65$i$, 65$o$ Peripheral wall
65$f$ Front wall
65$b$ Back wall (first wall)
65$n$ Suction-side wall
65$p$ Pressure-side wall
66 Recess
67 Inner cavity
71 Back end surface blow-out passage (end surface blow-out passage)
72 First gas path surface blow-out passage
73 Second gas path surface blow-out passage
74$n$ Suction-side communication passage
74$p$ Pressure-side communication passage
75 Vane air passage
76 Vane surface blow-out passage
78$n$ Suction-side passage
78$p$ Pressure-side passage
81 Impingement plate
90$i$, 90$ia$, 90$ib$, 90$ic$, 90$id$, 90$ie$, 90$if$, 90$o$, 90$oh$, 90$oi$ Back-side passage (first side passage)
91 First forming surface
92 Second forming surface
93 Third forming surface
94 Fourth forming surface
150 Rotor vane
151 Vane body
152 Leading edge
153 Trailing edge
154 Suction-side surface (negative pressure surface)
155 Pressure-side surface (positive pressure surface)
160 Platform
161 Platform body
162$f$ Front end surface
162$b$ Back end surface (first end surface)
163 Circumferential end surface
163$n$ Suction-side end surface
163$p$ Pressure-side end surface
164$i$ Opposite-gas-path surface
164$p$ Gas path surface
171 Back end surface blow-out passage (end surface blow-out passage)
175 Vane air passage
176 Vane surface blow-out passage
178$n$ Suction-side passage
178$p$ Pressure-side passage
190 Back-side passage (first side passage)
191 First forming surface
240 Front-side passage
240$a$ Front-side passage (first side passage)
241 First forming surface
242 Second forming surface
244 Fourth forming surface
246 Sixth forming surface
249 Front end surface blow-out passage
250, 250$a$ Ring segment
261 Ring segment body
262$f$ Front end surface (first end surface)
262$b$ Back end surface
263 Circumferential end surface
263$a$ Rotation front-side end surface (first end surface)
263$r$ Rotation back-side end surface
264$i$ Opposite-gas-path surface
264$p$ Gas path surface
265 Peripheral wall
265$f$ Front wall
265$b$ Back wall
265$a$ Rotation front-side wall
265$r$ Rotation back-side wall
266 Recess
267 Inner cavity
271 Side end surface blow-out passage (end surface blow-out passage)
276 Front-side communication passage
277 Back end surface blow-out passage 278 Rotation front-side communication passage
281 Impingement plate
290 Rotation front-side passage (first side passage)
291 First forming surface
292 Second forming surface
294 Fourth forming surface
295 Fifth forming surface
296 Sixth forming surface
Da Axial direction
Dau Axially upstream side
Dad Axially downstream side
Dc Circumferential direction
Dcp Circumferential pressure side
Dcn Circumferential suction side
Dca Rotational front side
Dcr Rotational back side
Dr Radial direction
Dri Radially inner side
Dro Radially outer side
Ac Cooling air
G Combustion gas
MP Middle region
PP Pressure-side region
NP Suction-side region

The invention claimed is:

1. A flow path forming plate that defines a combustion gas flow path through which combustion gas flows, the flow path forming plate comprising:
a gas path surface that comes in contact with the combustion gas;
an opposite-gas-path surface that faces the opposite side from the gas path surface;
end surfaces that are formed at peripheral edges of the gas path surface;
a first side passage which is formed between the gas path surface and the opposite-gas-path surface and extends in a direction along a first end surface that is one of the end surfaces, and through which cooling air flows; and
a plurality of end surface blow-out passages that communicates with the first side passage and opens in the first end surface,
wherein a passage cross-sectional area of the end surface blow-out passage is smaller than a passage cross-sectional area of the first side passage,
wherein the first side passage is defined by a plurality of passage forming surfaces,
wherein, of the passage forming surfaces, a first forming surface faces an opposite-flow-path side that is the opposite side from a flow path side that is a side of the gas path surface with the opposite-gas-path surface as a reference point, and extends gradually farther away from the gas path surface while extending toward an end surface side that is a side toward the first end surface, and
wherein the end surface blow-out passages open at a position between a position closest to the gas path surface and a position farthest from the gas path surface in the first surface.

2. The flow path forming plate according to claim 1, wherein at least one edge of a plurality of edges forming a passage cross-section of the first side passage is a straight line.

3. The flow path forming plate according to claim 1, wherein an internal angle of each corner formed by adjacent edges of a plurality of edges forming a passage cross-section of the first side passage is not larger than 180°.

4. The flow path forming plate according to claim 1, wherein:
of the passage forming surfaces, a second forming surface faces the opposite-flow-path side, and spreads from a border of the first forming surface on an opposite-end-surface side that is the opposite side from the end surface side, toward the opposite-end-surface side; and
the second forming surface is parallel to the gas path surface.

5. The flow path forming plate according to claim 1, wherein, of the passage forming surfaces, a third forming surface faces the flow path side and spreads along the opposite-gas-path surface.

6. The flow path forming plate according to claim 1, further comprising a plurality of first gas path surface blow-out passages that communicates with the first side passage and opens in the gas path surface.

7. The flow path forming plate according to claim 4, further comprising a plurality of first gas path surface blow-out passages that communicates with the first side passage and opens in the gas path surface, wherein the first gas path surface blow-out passages open in the second forming surface.

8. The flow path forming plate according to claim 6, wherein the first gas path surface blow-out passages extend gradually toward the flow path side while extending toward the end surface side.

9. The flow path forming plate according to claim 1, further comprising a peripheral wall that is provided along the end surfaces and protrudes from the opposite-gas-path surface toward the opposite-flow-path side, wherein a recess which is recessed toward the flow path side and into which cooling air flows is formed by the opposite-gas-path surface and the peripheral wall.

10. The flow path forming plate according to claim 9, further comprising a plurality of second gas path surface blow-out passages that communicates with a space inside the recess and opens in the gas path surface.

11. The flow path forming plate according to claim 10, wherein the second gas path surface blow-out passages extend gradually toward the flow path side while extending toward the end surface side.

12. The flow path forming plate according to claim 9, further comprising a communication passage that communicates with a space inside the recess and with the first side passage.

13. The flow path forming plate according to claim 12, wherein:
the peripheral wall has a first wall that is provided along the first end surface; and
the communication passage opens in a surface of the first wall that defines the space or in a bottom surface of the recess.

14. The flow path forming plate according to claim 1, wherein:
the end surfaces include a second end surface that extends in a direction intersecting the first end surface, from a first end of the first end surface in an extension direction of the first side passage, and a third end surface that extends in a direction intersecting the first end surface, from a second end of the first end surface on the opposite side from the first end in the extension direction of the first side passage;
the flow path forming plate further comprises a second side passage which is formed between the gas path surface and the opposite-gas-path surface and extends in a direction along the second end surface, and through which cooling air flows, and a third side passage which is formed between the gas path surface and the opposite-gas-path surface and extends in a direction along the third end surface, and through which cooling air flows; and the first side passage communicates with the second side passage and the third side passage.

15. A vane comprising:
the flow path forming plate according to claim 1; and
a vane body that forms an airfoil and extends from the gas path surface of the flow path forming plate toward the flow path side.

16. The vane according to claim 15, wherein the first end surface is a back end surface facing a downstream side in an axial direction in which the combustion gas flows.

17. A vane comprising:
the flow path forming plate according to claim 6; and
a vane body that forms an airfoil and extends from the gas path surface of the flow path forming plate toward the flow path side,
wherein the first end surface is a back end surface facing a downstream side in an axial direction in which the combustion gas flows, and
wherein openings of the first gas path surface blow-out passages in the gas path surface are located farther on the downstream side in the axial direction than the vane body.

18. The vane according to claim 16, wherein:
the end surfaces of the flow path forming plate include a pressure-side end surface that extends in a direction intersecting the back end surface, from a first end of the back end surface in a first direction in which the first side passage extends, and a suction-side end surface that extends in a direction intersecting the back end surface, from a second end of the back end surface on the opposite side from the first end in the first direction;
openings of the end surface blow-out passages are formed so as to be arrayed in the first direction in each of a middle region of the back end surface that does not include a border with the suction-side end surface and a border with the pressure-side end surface, a suction-side region of the back end surface that includes the border with the suction-side end surface and adjoins the middle region in the first direction, and a pressure-side region of the back end surface that includes the border with the pressure-side end surface and adjoins the middle region in the first direction; and
a density of the openings of the end surface blow-out passages is higher in the middle region than in at least one of the suction-side region and the pressure-side region, the density of the openings being a ratio of a length of wetted perimeter of the end surface blow-out passages to an interval of the openings of the end surface blow-out passages.

19. The vane according to claim 18, wherein at least three openings of the end surface blow-out passages arrayed in the first direction are formed in each of the suction-side region and the pressure-side region.

20. A gas turbine comprising:
the flow path forming plate according to claim 1; and
a combustor that generates the combustion gas.

21. A gas turbine comprising:
the vane according to claim 15; and
a combustor that generates the combustion gas.

22. A manufacturing method of a flow path forming plate that defines a combustion gas flow path through which combustion gas flows, the manufacturing method comprising:
an outer shape forming step of forming a gas path surface that comes in contact with the combustion gas, an opposite-gas-path surface that faces the opposite side from the gas path surface, and end surfaces that are formed at peripheral edges of the gas path surface;
a side passage forming step of forming, between the gas path surface and the opposite-gas-path surface, a first side passage which extends along a first end surface that is one of the end surfaces and through which cooling air flows; and
a blow-out passage forming step of forming a plurality of end surface blow-out passages that communicates with the first side passage and opens in the first end surface,
wherein, in the side passage forming step, a plurality of passage forming surfaces defining the first side passage is formed, and of the passage forming surfaces, a first forming surface faces a side of the opposite-gas-path surface with the gas path surface as a reference point and extends gradually farther away from the gas path surface while extending toward the first end surface, and
wherein, in the blow-out passage forming step, the end surface blow-out passages are formed such that a passage cross-sectional area of the end surface blow-out passage is smaller than a passage cross-sectional area of the first side passage, and openings of the end surface blow-out passages are formed at a position between a position closest to the gas path surface and a position farthest from the gas path surface in the first surface.

* * * * *